United States Patent
Bratianu-Badea et al.

(10) Patent No.: US 12,522,363 B2
(45) Date of Patent: Jan. 13, 2026

(54) DE-ICING SYSTEMS AND CONTROL

(71) Applicant: DE-ICE TECHNOLOGIES, INC., Somerville, MA (US)

(72) Inventors: Alexandru Bratianu-Badea, Boston, MA (US); Ruben Toubiana, Cambridge, MA (US); Christopher Buenrostro, Lexington, MA (US); Nathan Fritz, Cambridge, MA (US); Curtis Serrano, Somerville, MA (US)

(73) Assignee: De-Ice Technologies, Inc., Somerville, MA (US)

( * ) Notice: Subject to any disclaimer, the term of this patent is extended or adjusted under 35 U.S.C. 154(b) by 319 days.

(21) Appl. No.: 18/018,407

(22) PCT Filed: Jul. 28, 2021

(86) PCT No.: PCT/US2021/043545
§ 371 (c)(1),
(2) Date: Jan. 27, 2023

(87) PCT Pub. No.: WO2022/026604
PCT Pub. Date: Feb. 3, 2022

(65) Prior Publication Data
US 2023/0348074 A1    Nov. 2, 2023

Related U.S. Application Data

(60) Provisional application No. 63/057,881, filed on Jul. 28, 2020.

(51) Int. Cl.
*B64D 15/12* (2006.01)
*B64D 15/22* (2006.01)

(52) U.S. Cl.
CPC ............. *B64D 15/12* (2013.01); *B64D 15/22* (2013.01)

(58) Field of Classification Search
CPC ... B64D 15/12; H05B 3/0023; H05B 2214/02
See application file for complete search history.

(56) References Cited

U.S. PATENT DOCUMENTS 3,612,744 A * 10/1971 Thomas ............... H01B 7/0838
174/117 FF
6,227,492 B1 * 5/2001 Schellhase ............. B64D 15/14
244/134 D (Continued)

FOREIGN PATENT DOCUMENTS

| EP | 3680653 | 7/2020 |
| JP | 6466198 | 2/2019 |

(Continued)

OTHER PUBLICATIONS

International Search Report and Written Opinion in International Appln. No. PCT/US2021/043545, mailed Dec. 27, 2021, 13 pages.

(Continued)

*Primary Examiner* — Brian M O'Hara
(74) *Attorney, Agent, or Firm* — Fish & Richardson P.C.

(57) ABSTRACT

The present disclosure is generally directed to methods and systems for heating the exterior surface of a bulk medium such as an aircraft. An exemplary system includes a series of individual heating elements, a sensor, and a control system. The heating elements are arranged on a skin of the an aircraft. The sensor is positioned on the skin in a location that corresponds with a region of relatively low temperature within a heating pattern produced by the heating elements. The control system is connected to the heating elements and the sensor. The control system configured to control power supplied to the heating elements responsive to output from the sensor.

41 Claims, 52 Drawing Sheets

(56) References Cited

U.S. PATENT DOCUMENTS

| | | |
|---|---|---|
| 6,723,971 B1 | 4/2004 | Petrenko et al. |
| 8,746,622 B2 | 6/2014 | Gallman et al. |
| 8,993,940 B2 * | 3/2015 | Winter .................... H05B 3/36 |
| | | 219/202 |
| 9,221,544 B2 * | 12/2015 | Armatorio ................ B64F 5/20 |
| 9,462,700 B2 * | 10/2016 | Frankenberger .......... B64C 1/12 |
| 9,919,812 B2 | 3/2018 | Shi |
| 10,167,550 B2 * | 1/2019 | Wen .................... H01B 7/0823 |
| 10,473,381 B2 | 11/2019 | Petrenko et al. |
| 10,714,785 B2 | 7/2020 | Gottlieb et al. |
| 2011/0277443 A1 | 11/2011 | Pereira et al. |
| 2014/0070054 A1 * | 3/2014 | Burton .................. B64D 15/12 |
| | | 219/202 |
| 2016/0343467 A1 | 11/2016 | Wen et al. |
| 2018/0037338 A1 | 2/2018 | Shi |
| 2018/0175429 A1 | 6/2018 | Gottlieb et al. |
| 2020/0022222 A1 | 1/2020 | Bratianu-Badea et al. |
| 2020/0062408 A1 | 2/2020 | Bratianu-Badea et al. |

FOREIGN PATENT DOCUMENTS

| | | |
|---|---|---|
| RU | 2583111 C1 | 5/2016 |
| WO | WO 2019/089434 A1 | 5/2019 |

OTHER PUBLICATIONS

International Preliminary Search Report in International on Patentability (Chapter II of The Patent Cooperation Treaty) Appn No. PCT/US2021/043545, mailed Feb. 17, 2023, 16 pages.
Extended European Search Report in European Appln No. 21849201.5, dated Dec. 19, 2023, 9 pages.

* cited by examiner

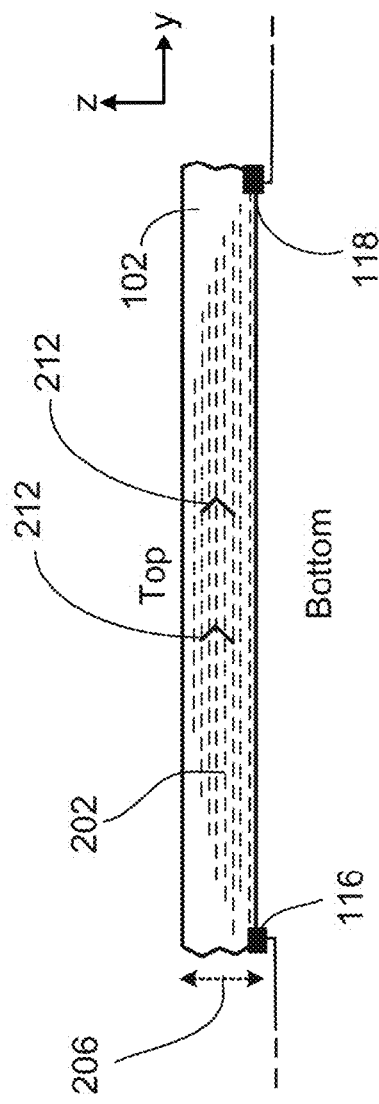
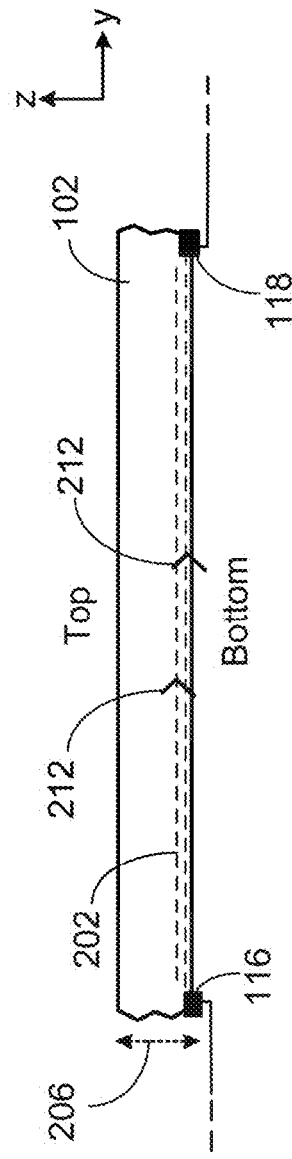

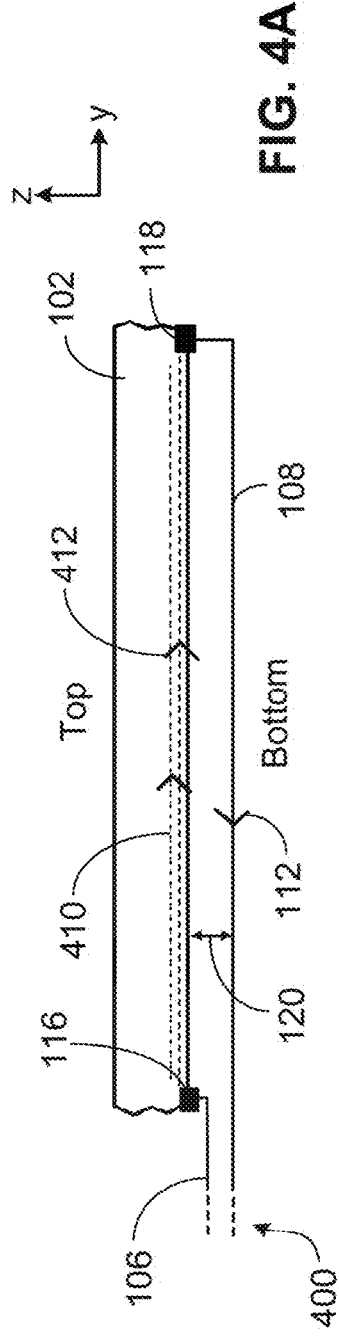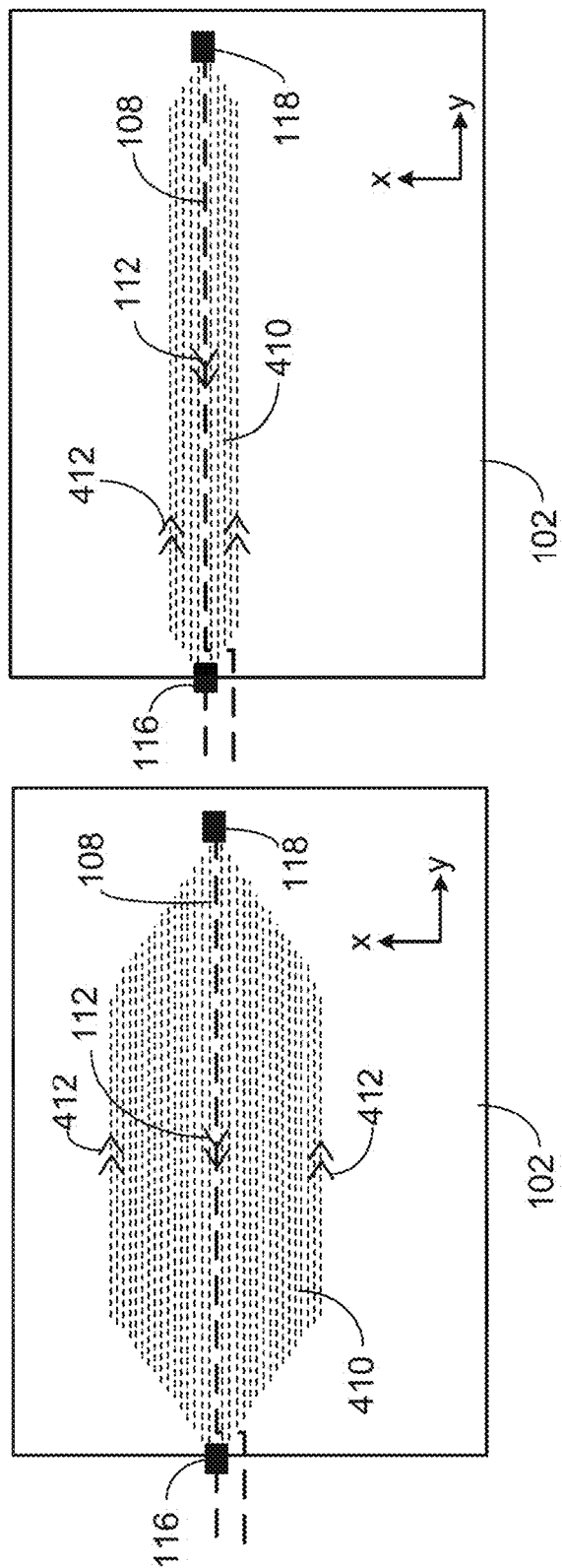

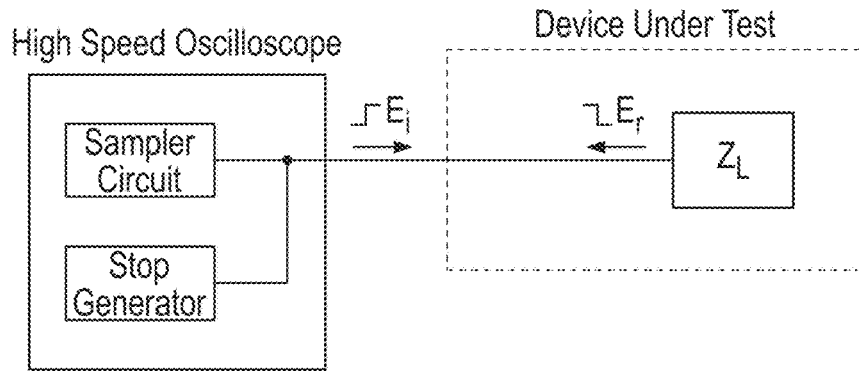

Figure 3. Functional Block Diagram for a Time Domain Reflectometer

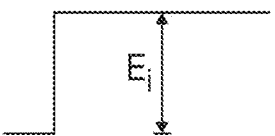

Figure 4. Oscilloscope Display when $E_r = 0$

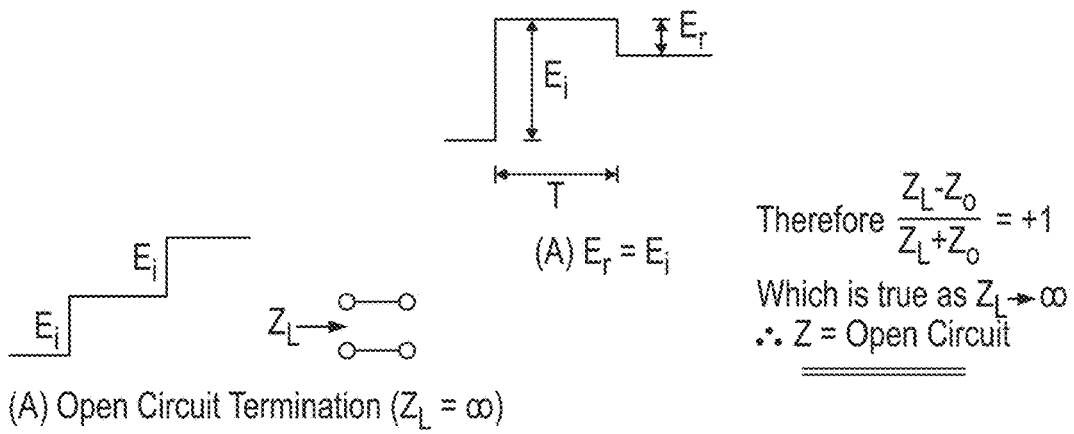

(A) $E_r = E_i$

Therefore $\dfrac{Z_L - Z_0}{Z_L + Z_0} = +1$

Which is true as $Z_L \to \infty$

∴ Z = Open Circuit (A) Open Circuit Termination ($Z_L = \infty$)

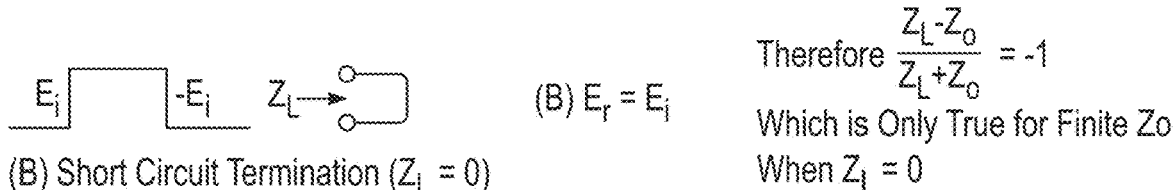

(B) $E_r = E_i$

Therefore $\dfrac{Z_L - Z_0}{Z_L + Z_0} = -1$

Which is Only True for Finite Zo When $Z_L = 0$

∴ Z = Open Circuit (B) Short Circuit Termination ($Z_L = 0$)

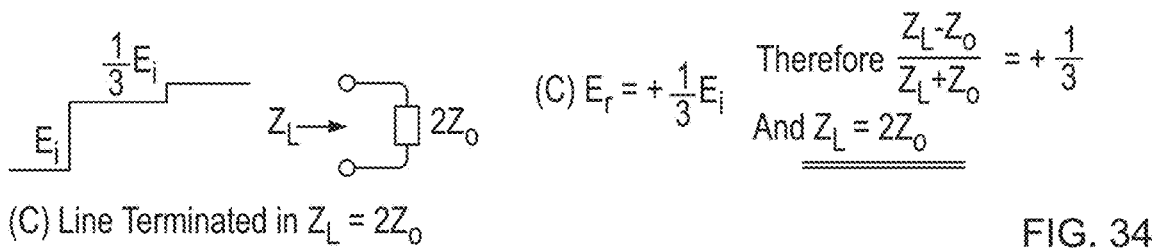

(C) $E_r = +\dfrac{1}{3} E_i$

Therefore $\dfrac{Z_L - Z_0}{Z_L + Z_0} = +\dfrac{1}{3}$

And $Z_L = 2Z_0$ (C) Line Terminated in $Z_L = 2Z_0$

FIG. 34

| Annunciation rules - Wings-only system - Dummy temperature and timing values |
|---|
| • [ON] Illuminates when the system switch is in the ON position or when the system is powered<br>• [WARM] Illuminates when all $T_{cold}$ and $T_{hot}$ sensors are at or above $T_{WARM}$ = 15°C<br>• [OK] Illuminates when all $T_{cold}$ and $T_{hot}$ sensors have been at or above $T_{OK}$ =15°C for a duration of at least $t_{ok}$ = 15 minutes<br>• [OVHT] Illuminates when any $T_{cold}$ and $T_{hot}$ is at or above $T_{OVHT}$ =150°C<br>• [SYSTEM FAIL] Illuminates when any shutdown command has been issued by the control system. This is the case when:<br>    • The system has been [ON] without reaching the [WARM] state for $T_{FAIL}$ = 25 minutes<br>    • [OVHT] is on and [ON] has been on for $t_{FAIL2}$ =10 seconds<br>    • Any other shutdown command is issued as part of the temperature control rules and electronic control rules (see next slides) |

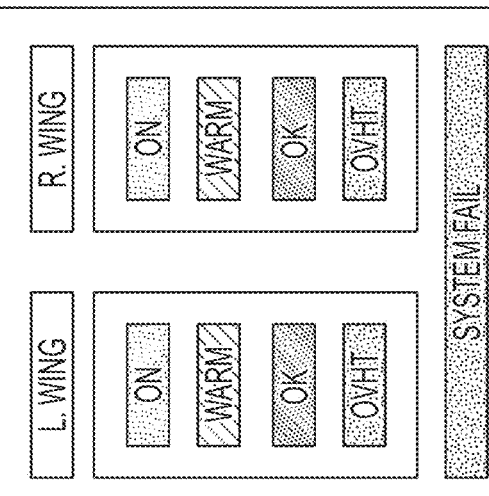

FIG. 37A

GROUND ICE

| MASTER | MODE | System Function | Description |
|---|---|---|---|
| ☐ | ☐ | OFF | Dark cockpit when OFF. Night operations, button bezel/heading text illuminated. |
| ON | LO | Anti-ice ON (Low-Heat) | Momentary push of the MASTER button turns system to ON. MODE button defaults to Anti-ice mode (LO) used for preventative ground ice protection. Push of Master button will turn system off. "LO" indications remains on until de-energized, or takeoff is sensed (auto-off). |
| ON | HI | De-ice ON (Max-Heat) | Momentary push of the MODE button toggles to De-ice mode (HI). This mode is used to remove contaminants on the critical surfaces. This mode remains active for a set amount of time, or until the surface temperature reaches a set amount. The system then reverts to Anti-ice mode (LO). |
| FAULT ON | FAULT | FAULT (INOP) | When the system detects a fault. The MASTER button displays FAULT in amber. A single push of the MASTER button will turn the system to OFF by de-powering the system. Aural annunciation associated with FAULT is expected. No indications are present when airborne. |

FIG. 37B

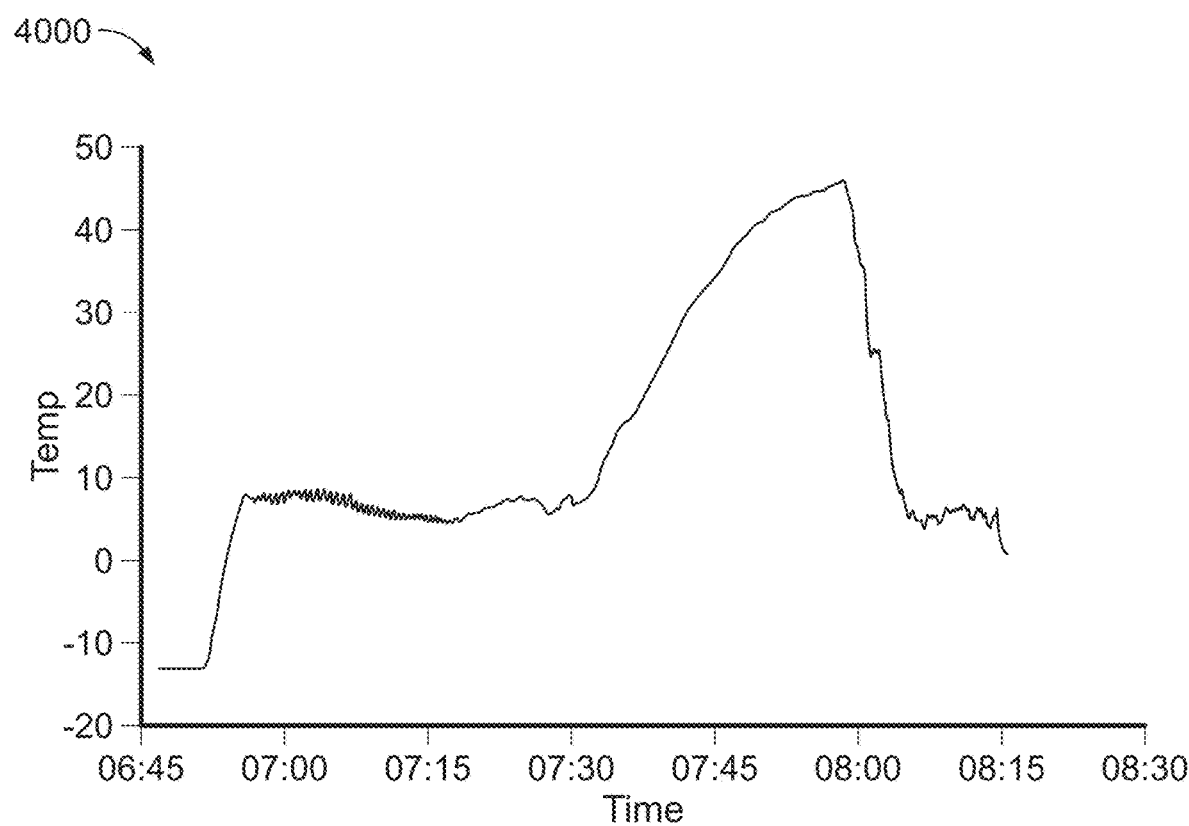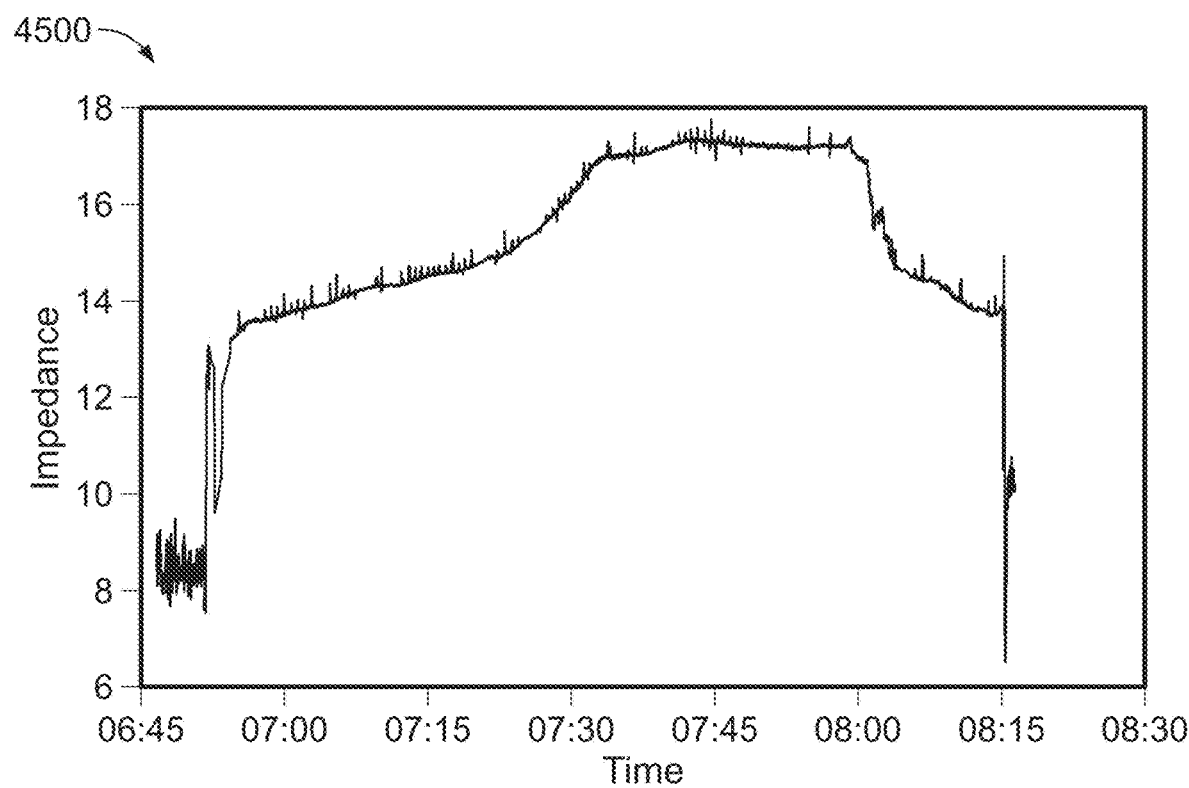
FIG. 40

DE-ICING SYSTEMS AND CONTROL

TECHNICAL FIELD

This specification relates to heating systems for conductive materials.

BACKGROUND

Many conductive surfaces, such as those on cars, aircraft, and satellites encounter cold and icy conditions during everyday use. Ice or water accumulation on the conductive surfaces of these structures may result in inefficient or unsafe operating conditions. For example, ice accumulation on aircraft wings may result in lift degradation and increased drag.

Many of these structures do not have heating systems, or have heating systems that require using bulky electronics or other equipment. The use of such bulky devices poses a challenge for the industry.

SUMMARY

This specification describes technologies for heating a conductive surface. These technologies generally involve using higher frequency alternating electric current ("AC") signals (e.g., above 1 kHz) to shape current density in a target area of a conductive bulk medium (e.g., conductive material), resulting in Joule heating of the medium.

Joule heating, also known as ohmic heating or resistive heating, is the process by which the passage of an electric current through a conductor produces heat. The amount of heat generated by a conducting medium is based on the amount of current passed through the medium and the electrical resistance of the medium. Consequently, the heating can be controlled (e.g., increased or decreased) by adjusting the current, voltage, resistance, or a combination thereof.

The resistance of a given conductor may be increased by constraining the volume within the conductor in which current can flow and by increasing the length along which the current flows. Implementations of the present disclosure can be configured to produce heating in a bulk medium by manipulating mechanisms for shaping (e.g., constricting, lengthening, etc.) current within a conductive medium (e.g., bulk medium, conductor): for example, by using the skin effect and the proximity effect. Both effects rely on running a high frequency AC current through the conductive medium that is to be heated. The skin effect constrains current flow by taking advantage of the tendency of an alternating electric current to become distributed within a conductor such that the current density increases near the surface of the conductor and decreases with greater depths in the conductor. The proximity effect can be used to further constrain current flow in the conductor by placing another AC current path near the existing current flowing in the conductor. The proximity effect can also act to lengthen the current path.

For example, implementations of the present disclosure are configured to increase the resistance of a bulk medium along a current path through the medium by constricting the current flow along the path. Consequently, implementations may provide increased heating performance in conductive mediums while at the same time permitting a reduction in the current required to produce the heat. That is, by increasing the effective resistance of a conductive medium along a particular current path, less current may be required to produce Joule heating in the medium than would be required otherwise.

The subject matter described in this specification may be implemented so as to realize one or more of the following advantages. A lighter, less bulky electrical system may be used to heat a conductor. In addition, heating may be localized to the target area, and not overheat the heating system circuitry. The heating system may be more efficient, for example, by generating heat directly in a bulk medium (e.g., aircraft wing) itself rather than generating heat in a heating element or heating layer attached to the bulk medium. The system may also use less current and voltage for heating, potentially improving safety and reliability. In some implementations, component stress may also be reduced. The system may be easier, faster, or cheaper to install or retrofit. The system may be cheaper or easier to maintain. The system may be non-invasive when retrofitted into existing systems. The system may be faster at deicing.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2B are schematic diagrams illustrating an exemplary setup for heating a bulk medium that utilizes the skin effect to concentrate current density in a first direction in a bulk conductor.

FIGS. 4A-D are schematic diagrams illustrating exemplary setups for heating a bulk medium that utilize the proximity effect to concentrate current density in a second direction in a bulk conductor.

FIG. OB is a schematic diagram of an exemplary Class-D switch-mode Amplifier.

Figure 10A:
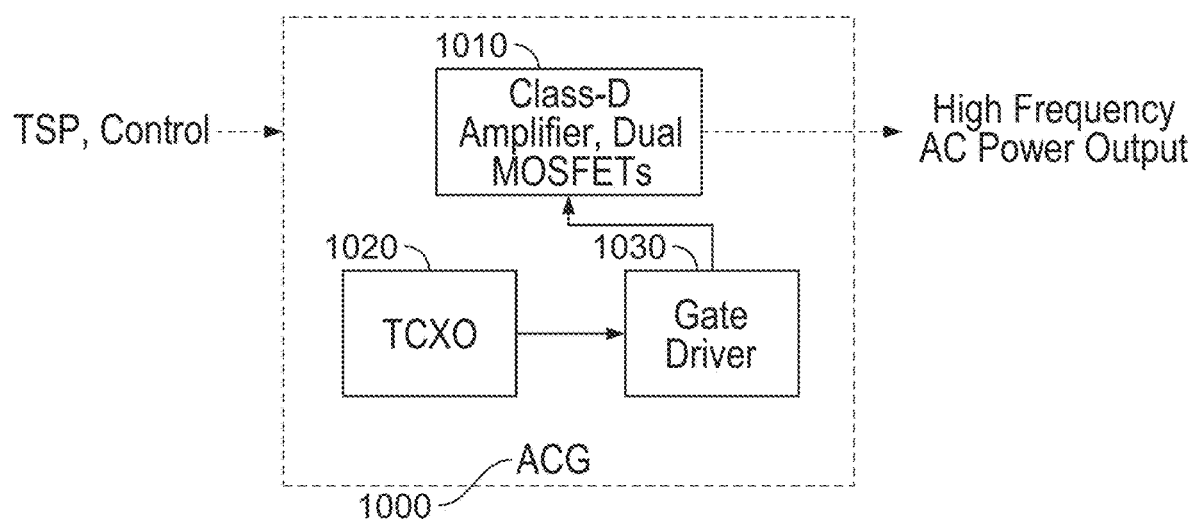
FIG. 10A is a schematic diagram of an exemplary ACG sub-unit, including a class-D amplifier with dual MOSFETs transistors, a temperature-controlled quartz oscillator ("TCXO"), and a gate driver.
Figure 10B:
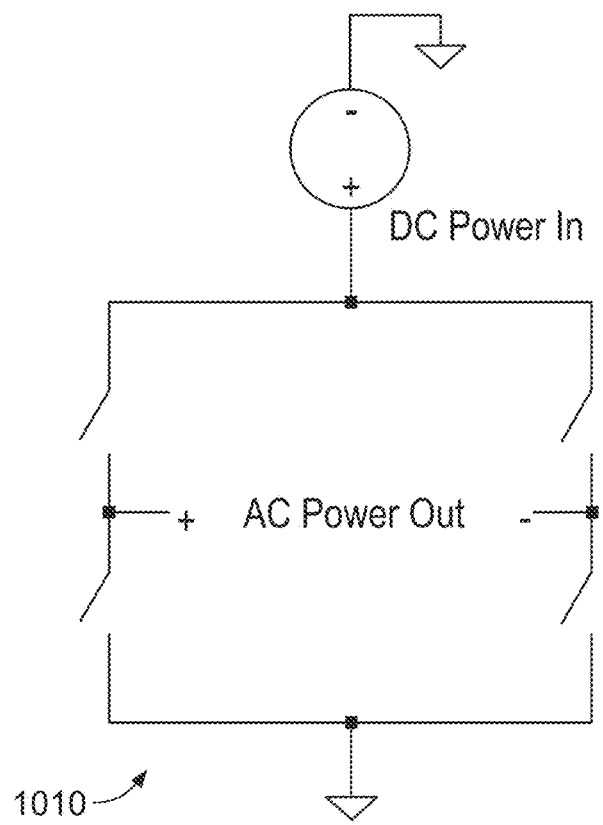
Figure 10C:
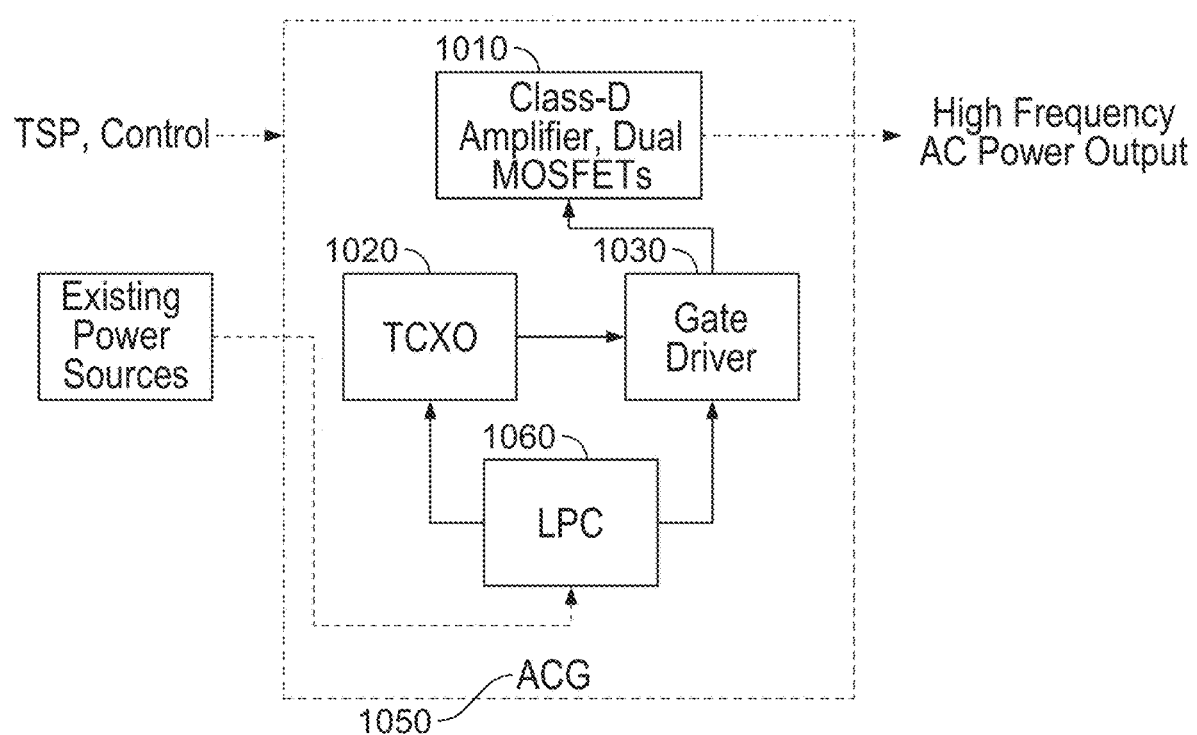

FIG. 10C is a schematic diagram of an exemplary ACG sub-unit, including a class-D amplifier with dual MOSFETs transistors, a TCXO, a Gate driver, and a Low Power Conversion stage ("LPC").

Figure 11:
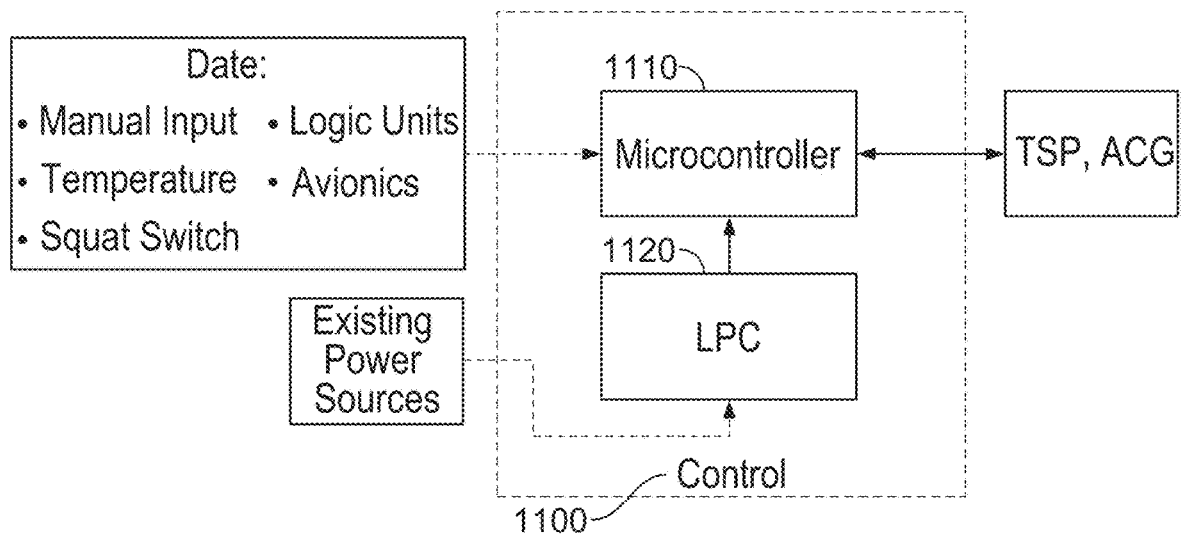

FIG. 11 is a schematic diagram of an exemplary control sub-unit, including a microcontroller and a LPC.

Figure 12:
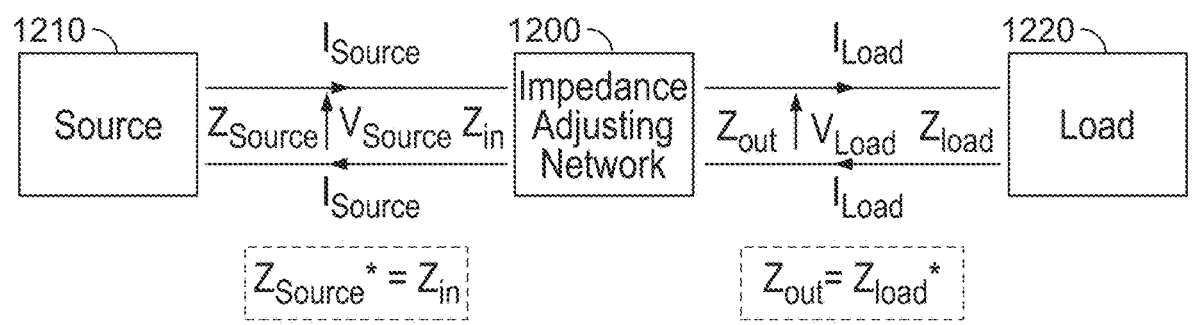

FIG. 12 is a diagram of an impedance adjusting network between a source and a load.

FIGS. 13A-D are schematic diagrams of exemplary impedance adjusting network building blocks.

Figure 14:
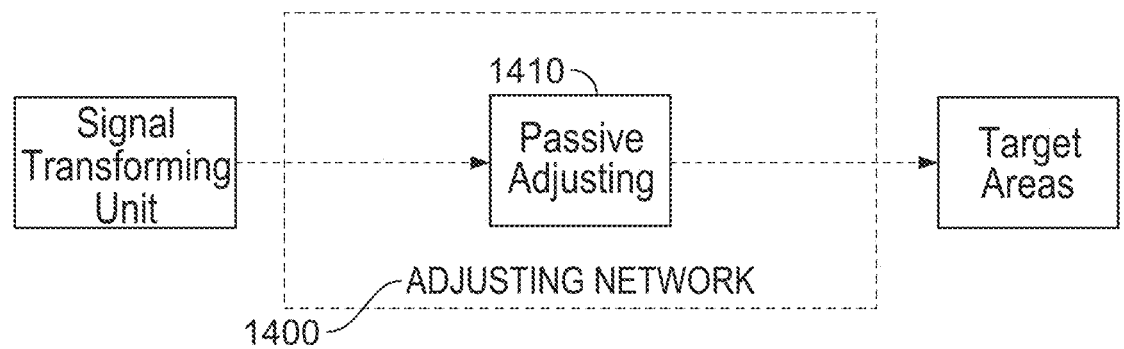

FIG. 14 is a schematic diagram of an exemplary adjusting network unit, including a passive adjusting sub-unit.

Figure 15A:
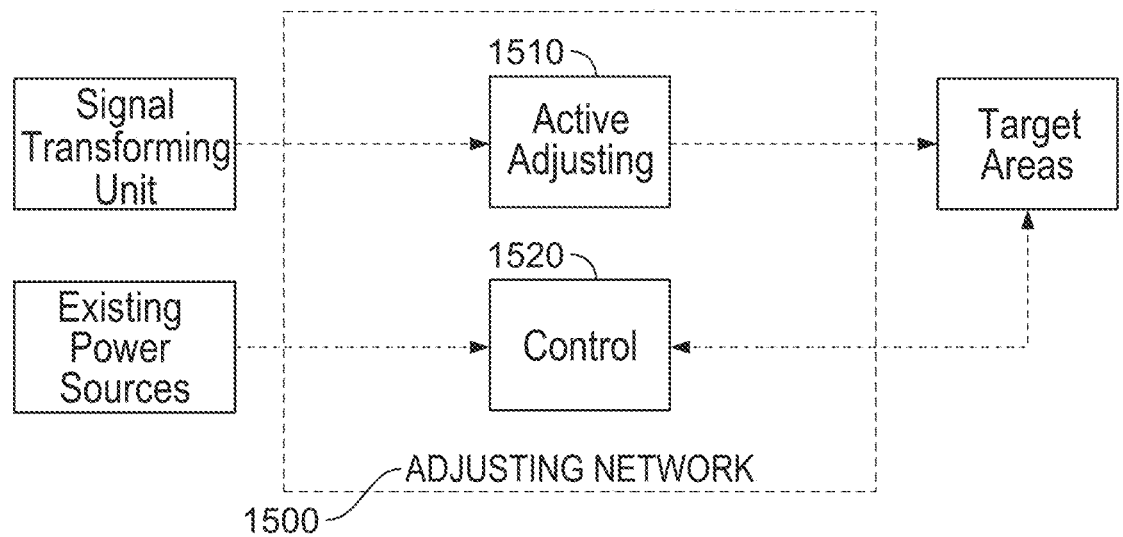

FIG. 15A is a schematic diagram of an exemplary adjusting network unit, including an active adjusting sub-unit and a control sub-unit.

Figure 15B:
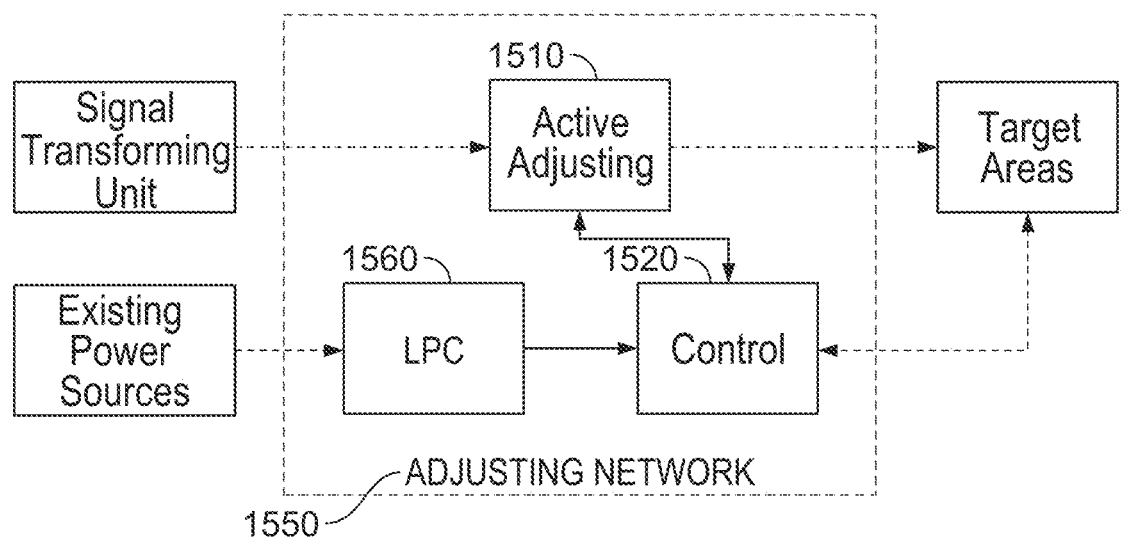

FIG. 15B is a schematic diagram of an exemplary adjusting network unit, including an active adjusting sub-unit, a LPC, and a control sub-unit.

Figure 16:
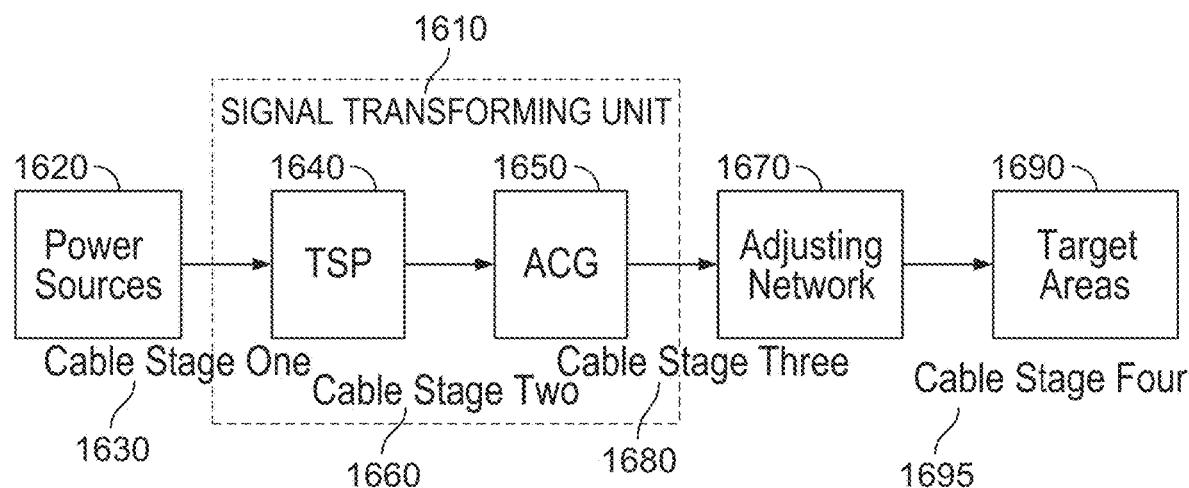

FIG. 16 is a schematic diagram of cable stages in an exemplary heating system.

Figure 17:
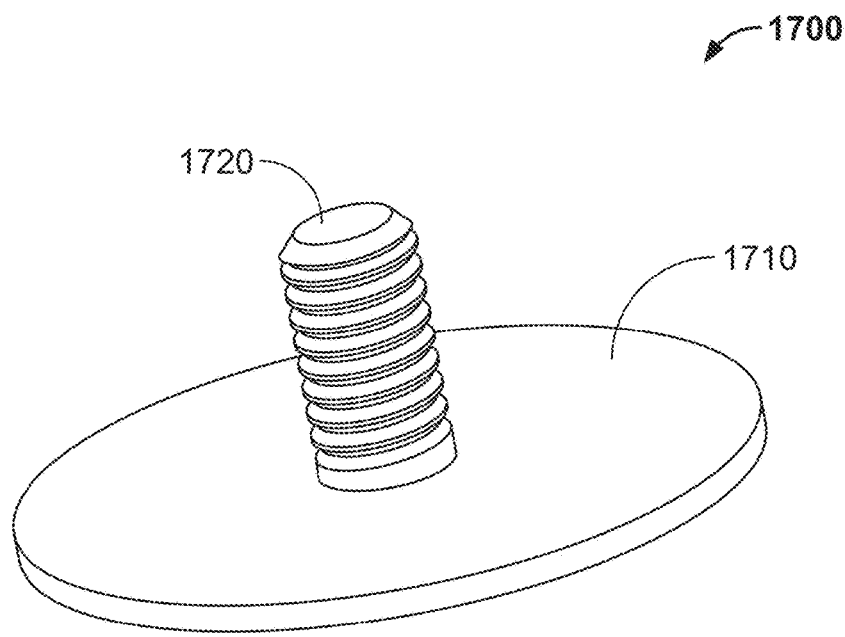

FIG. 17 is a schematic of an exemplary electrode for a heating system.

Figure 18A:
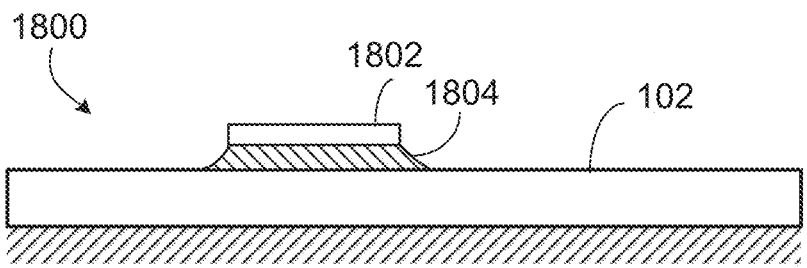

FIG. 18A is a schematic of an exemplary brazed joint attachment between the electrode and the bulk medium.

Figure 18B:
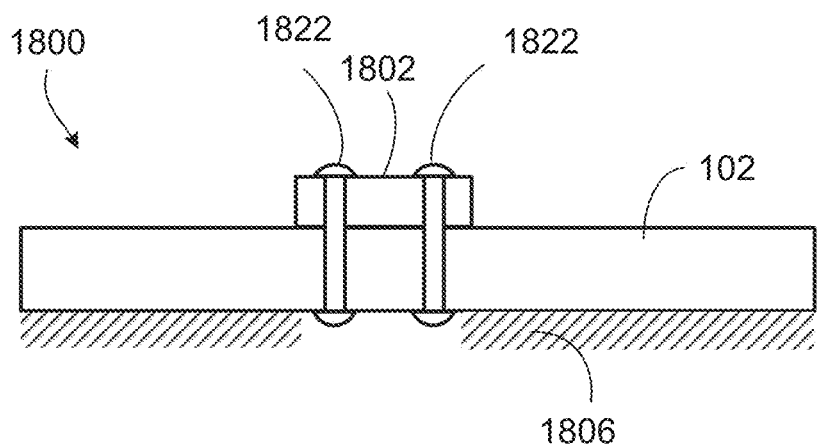

FIG. 18B is a schematic of an exemplary rivet fastener attachment between the electrode and the bulk medium.

Figure 18C:
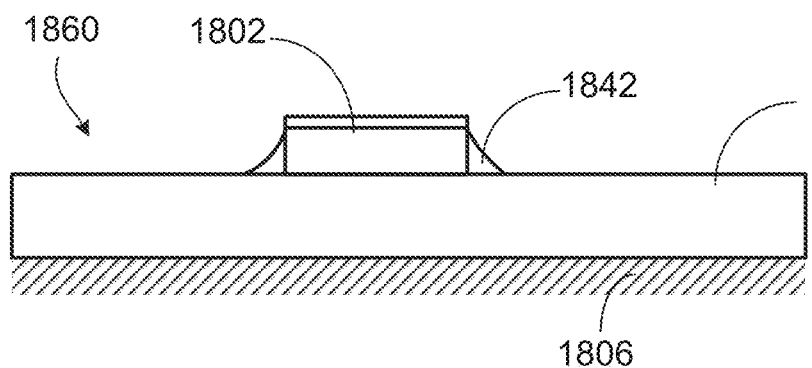

FIG. 18C is a schematic of an exemplary air sealing tape attachment between the electrode and the bulk medium.

Figure 18D:
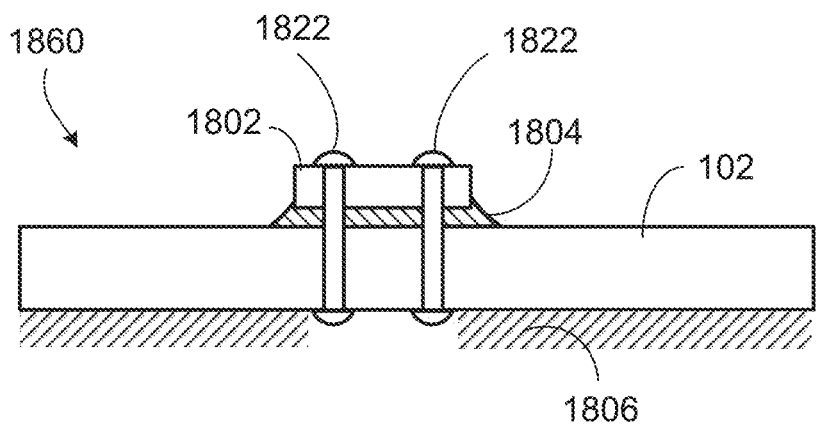

FIG. 18D is a schematic of an exemplary combinatorial attachment between the electrode and the bulk medium.

Figure 19:
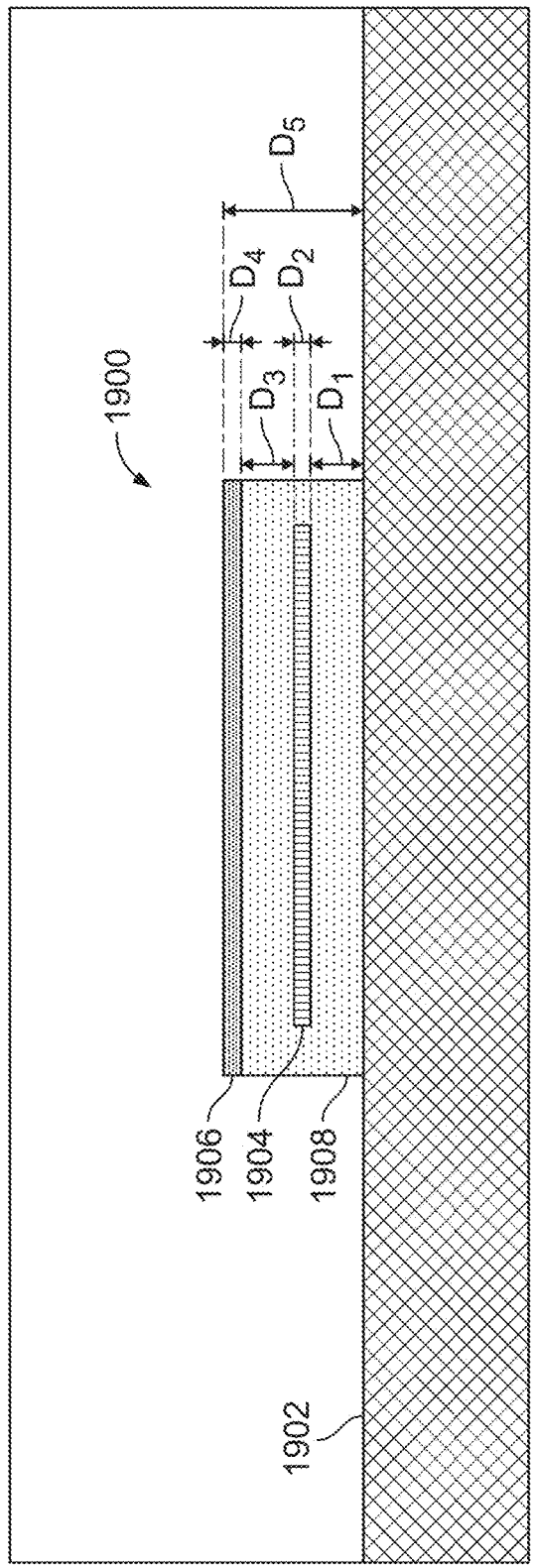

FIG. 19 is a cross-sectional view of an exemplary coupling strip for providing high frequency heating signals to a bulk medium according to implementations of the present disclosure.

Figure 20:
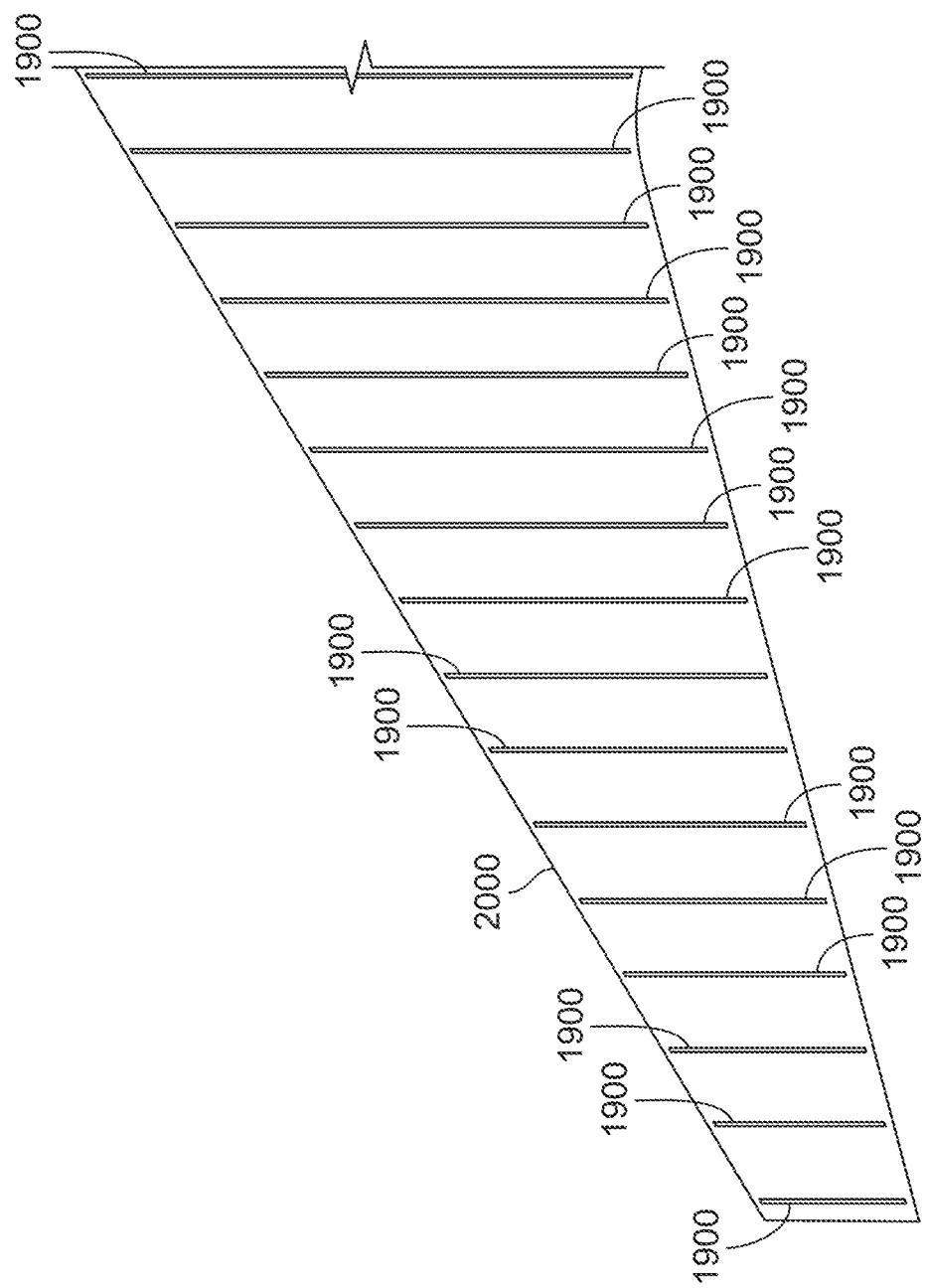

FIG. 20 depicts an exemplary layout of coupling strips of FIG. 19 on an aircraft wing.

Figure 21:
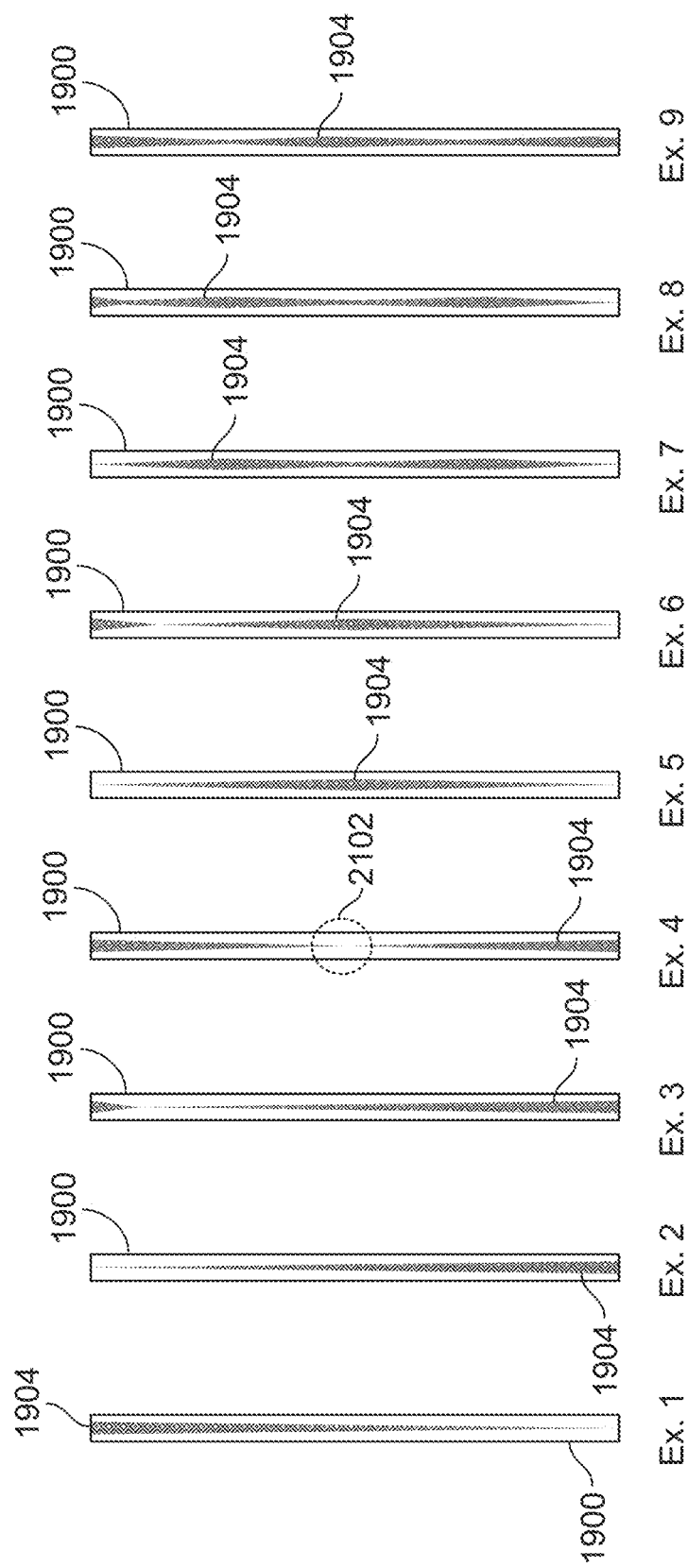

FIG. 21 depicts a top view of several exemplary coupling strips to illustrate various configurations of the conductive layer within a coupling strip.

Figure 22A:
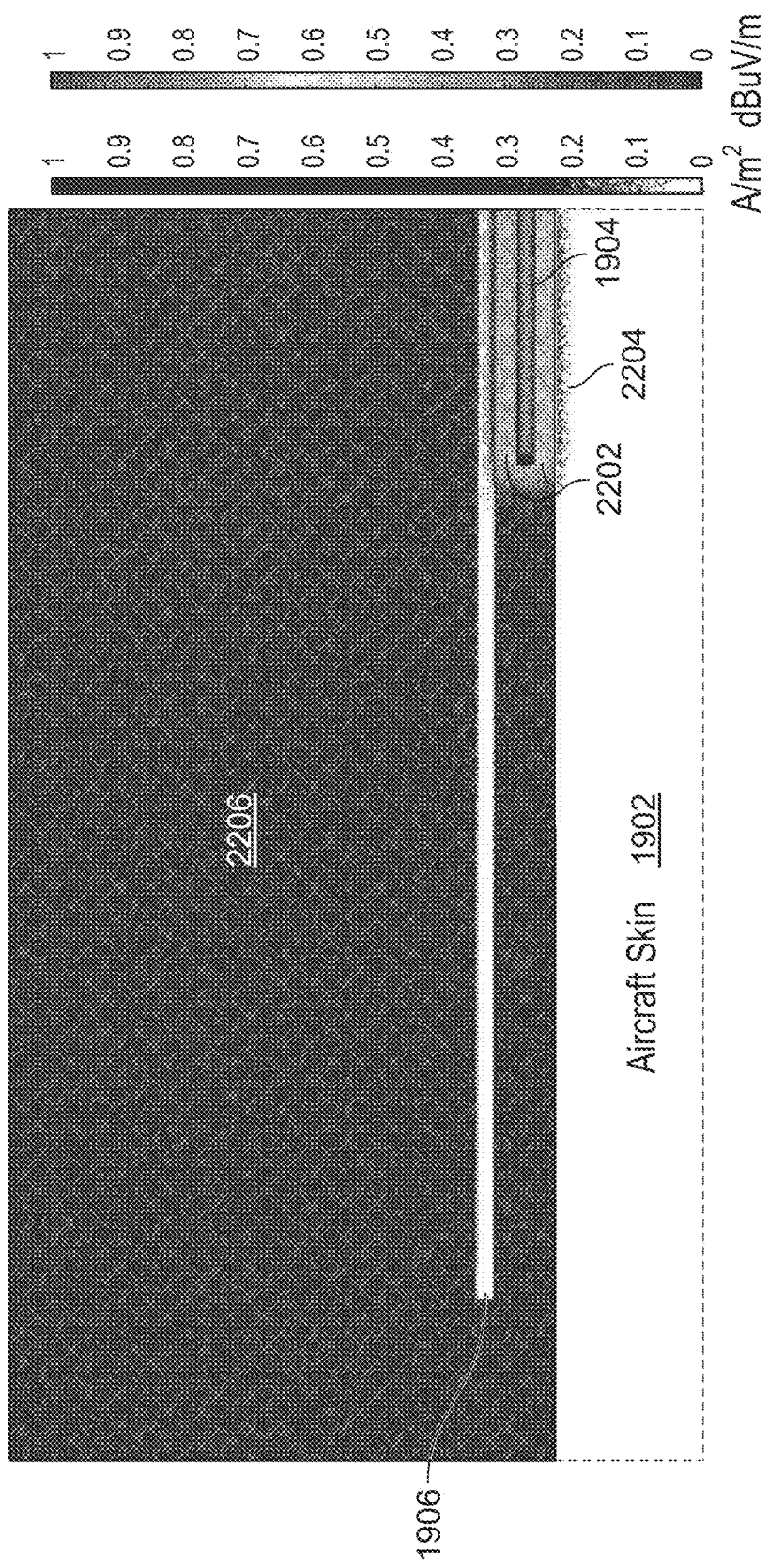

FIG. 22A depicts a plot of the simulated current density generated in an aircraft skin by an exemplary coupling strip and the electric field density between the coupling strip and the aircraft skin.

Figure 22B:
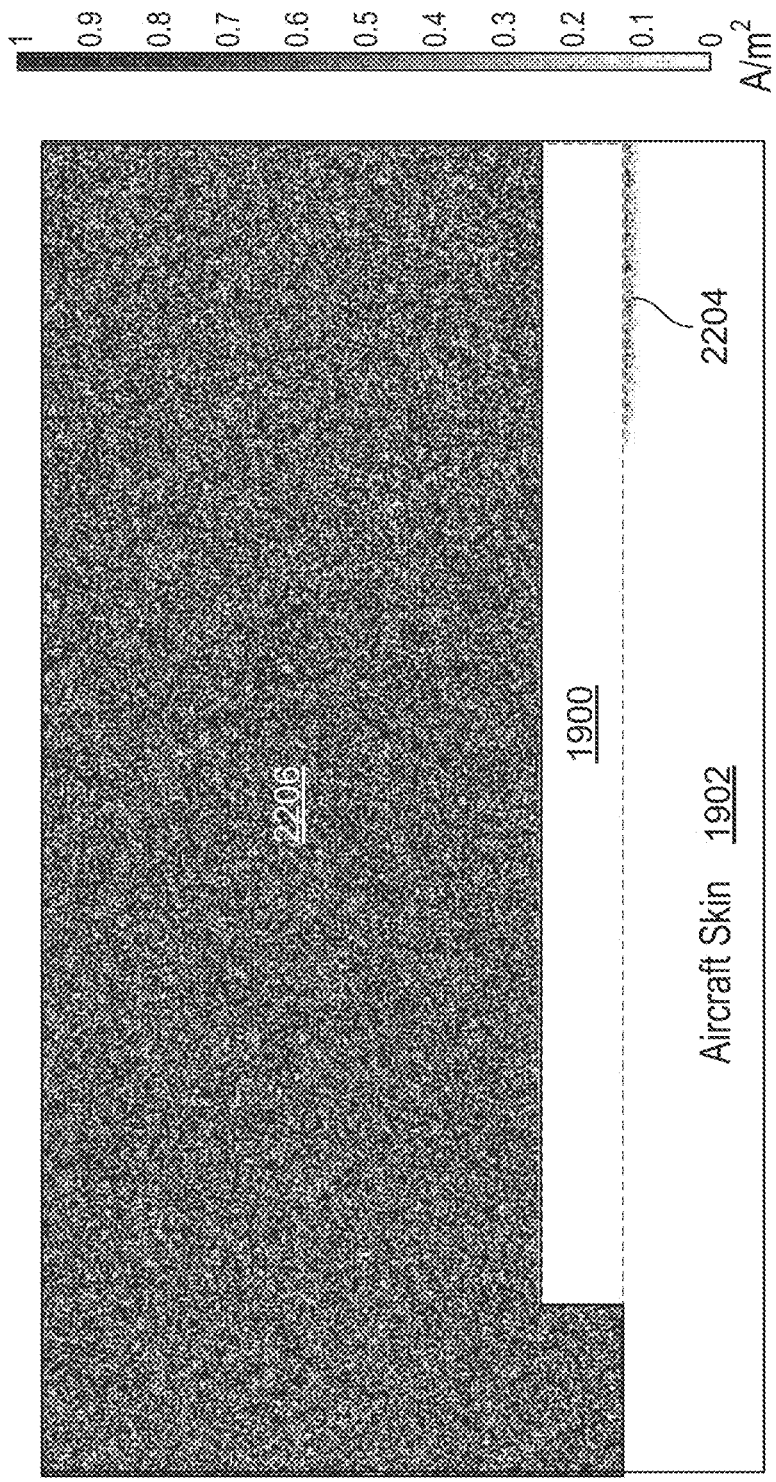

FIG. 22B depicts a plot of the simulated current density generated in the aircraft skin depicted in FIG. 22A.

Figure 23:
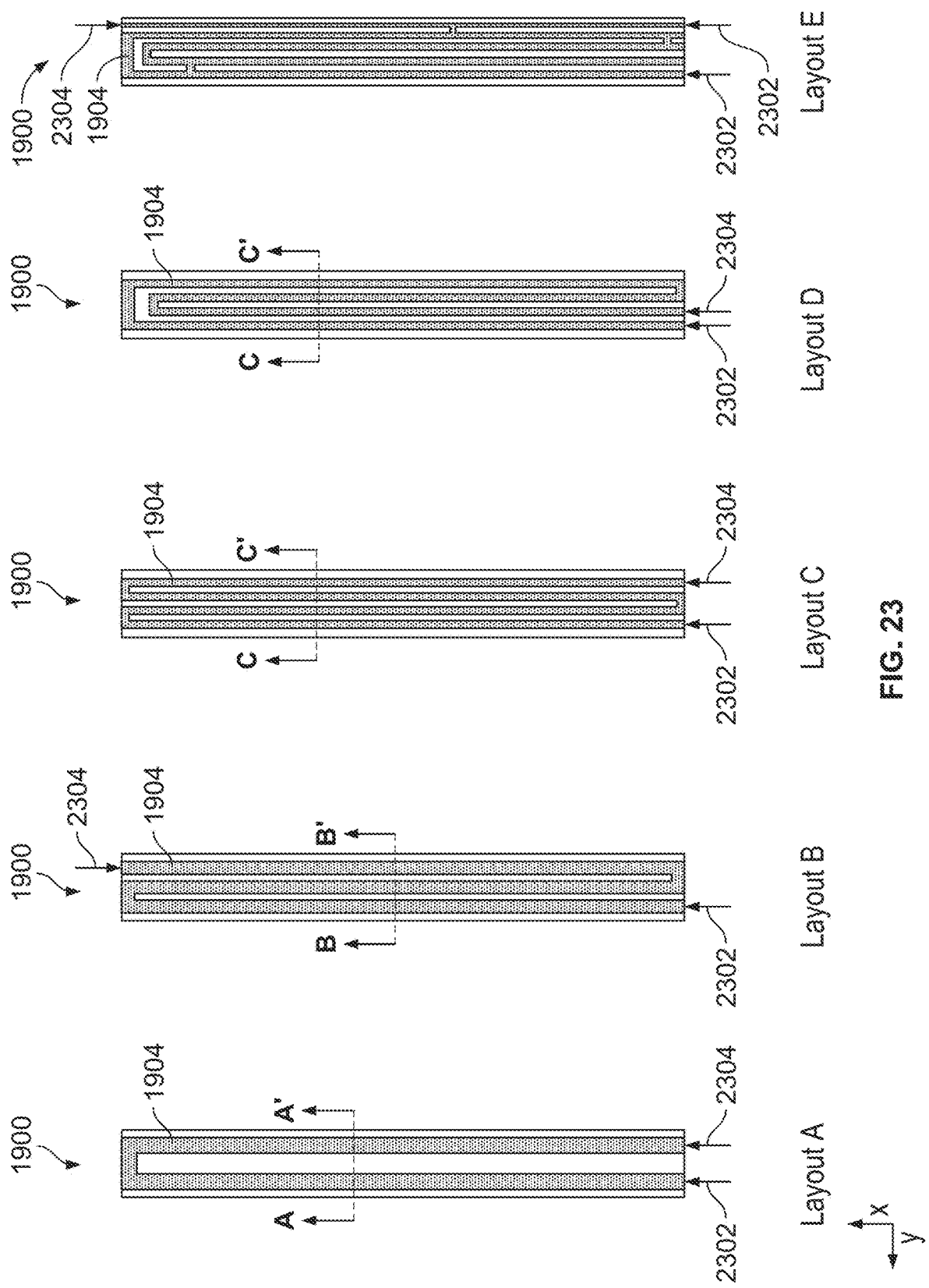

FIG. 23 depicts layout diagrams of several exemplary conductive layer arrangements within a coupling strip.

Figure 24A:
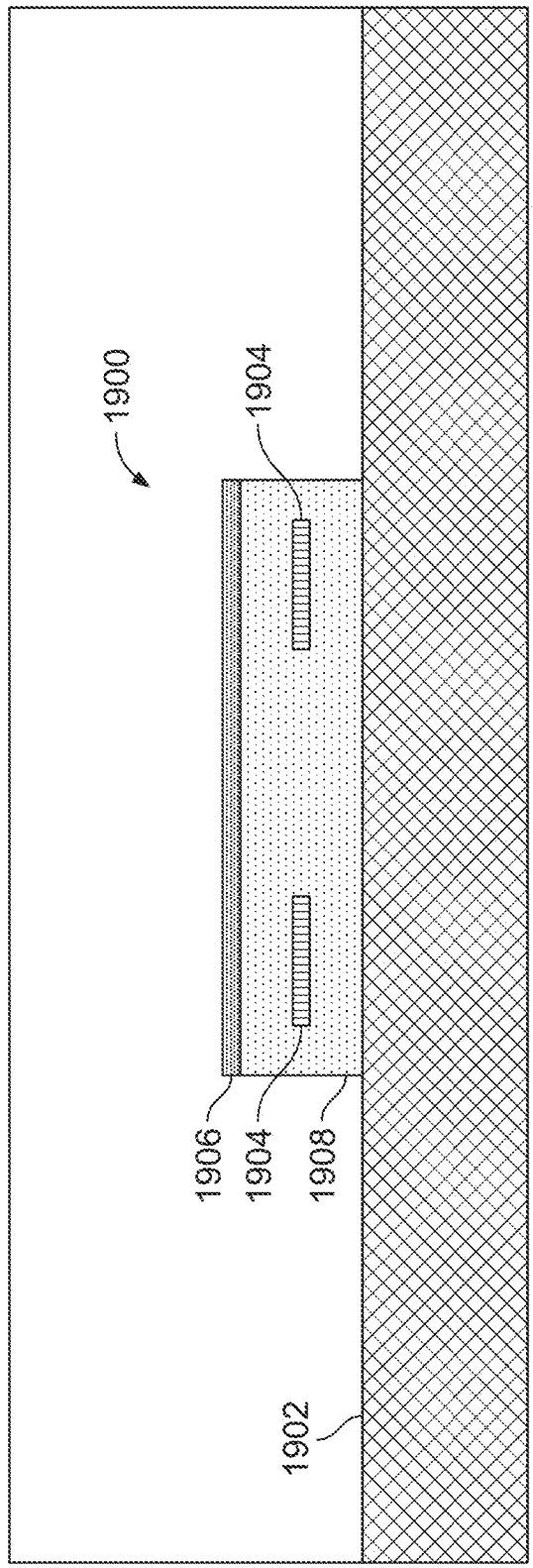

FIG. 24A depicts a cross-sectional view of a coupling strip according to Layout A of FIG. 23 taken at A-A'.

Figure 24B:
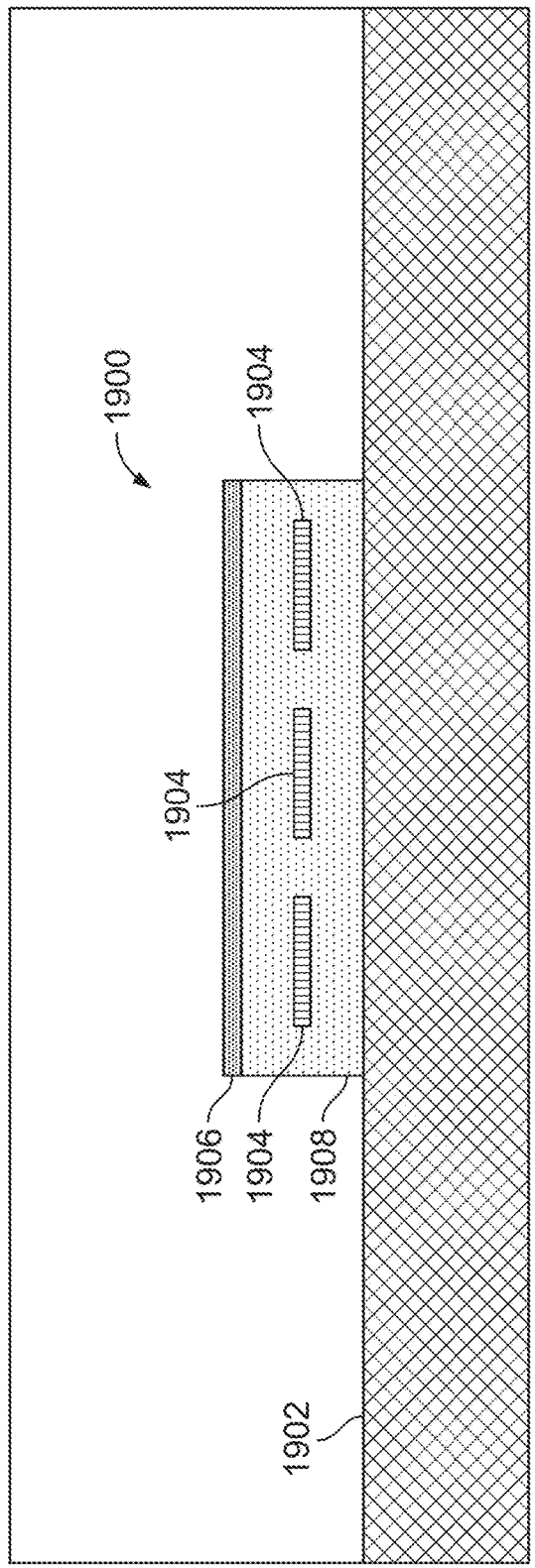

FIG. 24B depicts a cross-sectional view of a coupling strip according to Layout B of FIG. 23 taken at B-B'.

Figure 24C:
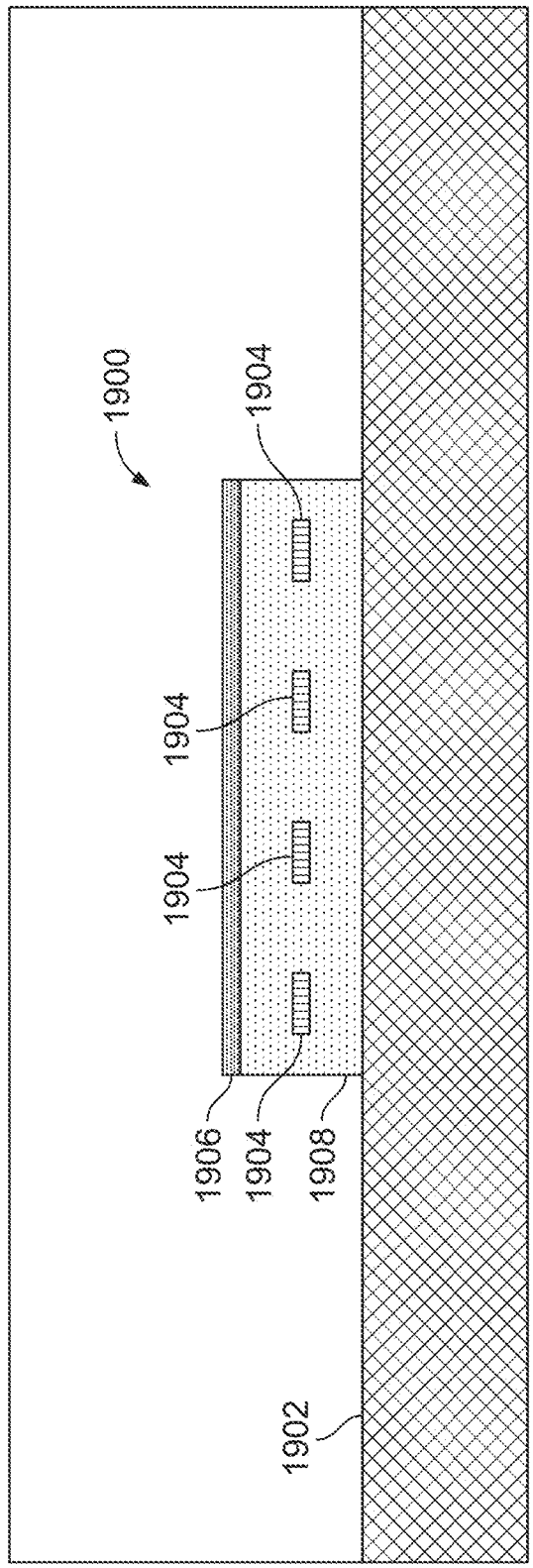

FIG. 24C depicts a cross-sectional view of a coupling strip according to Layout C and Layout D of FIG. 23 taken at C-C'.

Figure 25A:
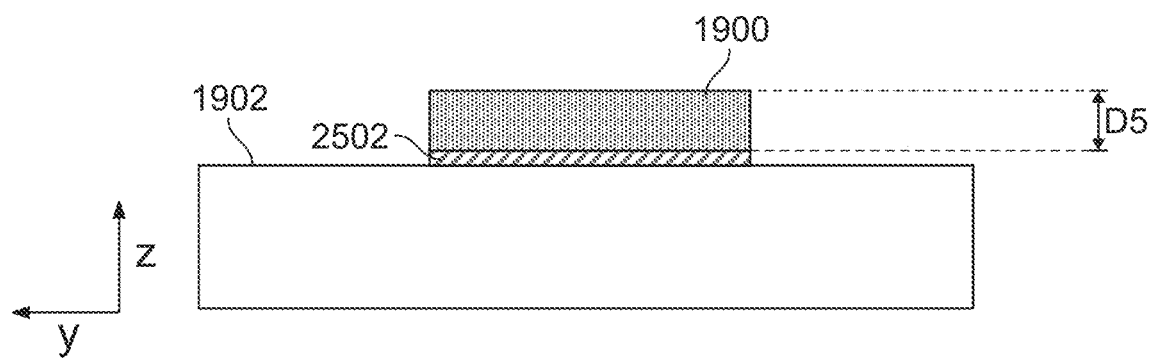

FIG. 25A depicts a cross-sectional view of an exemplary configuration for attaching a coupling strip to a bulk medium.

Figure 25B:
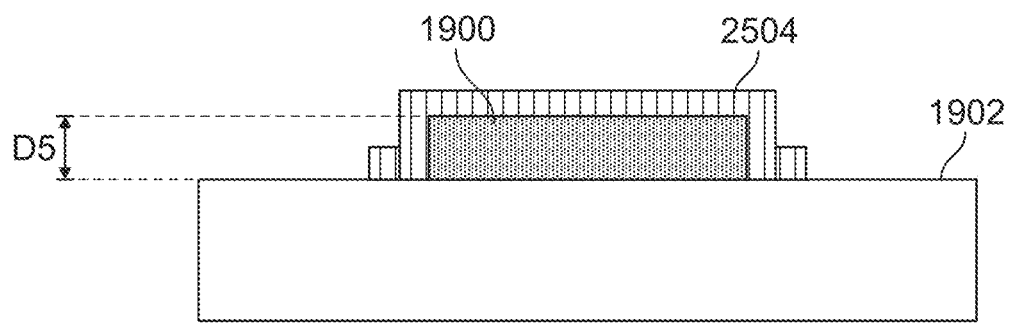

FIG. 25B depicts a cross-sectional view of another exemplary configuration for attaching a coupling strip to a bulk medium.

Figure 26A:
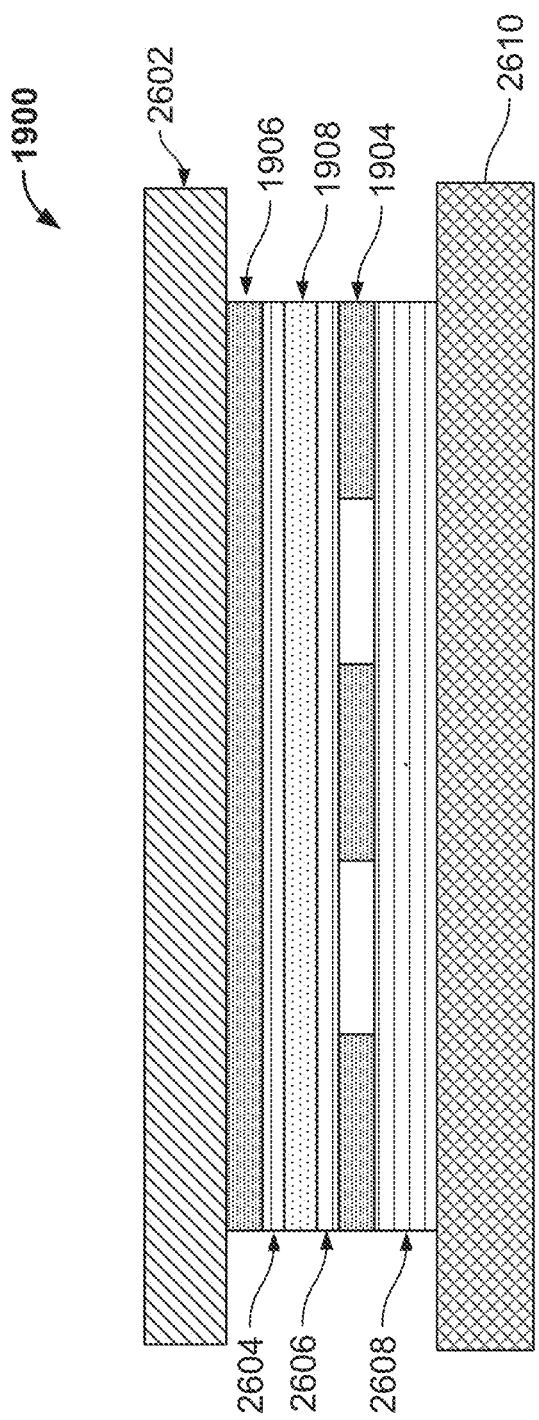
Figure 26B:
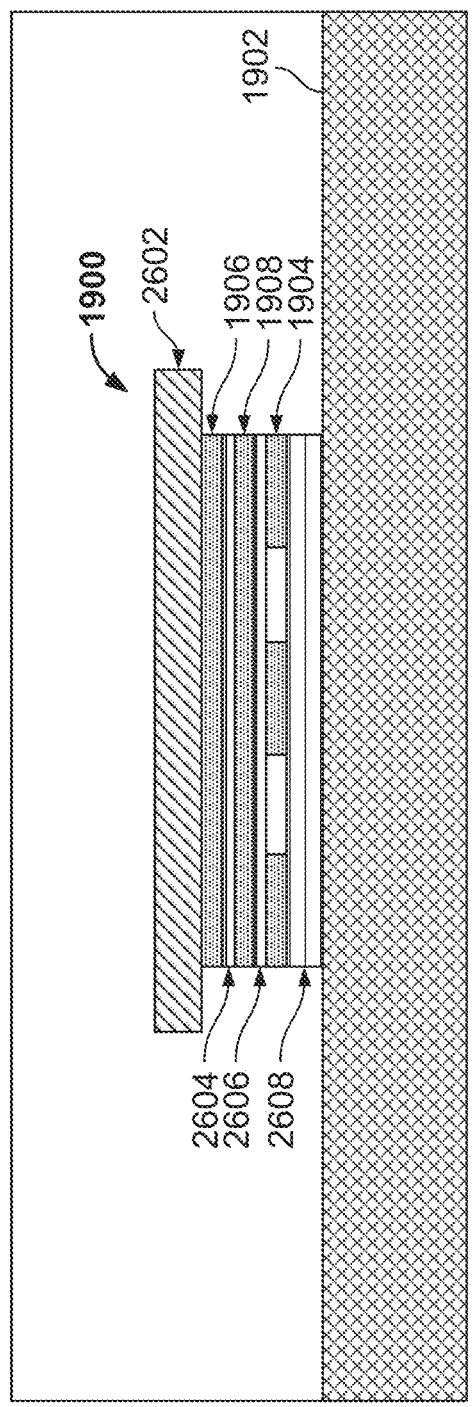

FIG. 26A is a cross-sectional view of a coupling strip with a double-sided adhesive bottom layer before installation on a bulk medium; FIG. 26B is a cross-sectional view of the coupling strip of FIG. 26A installed on a bulk medium.

FIGS. 27A-27F depict cross-sectional views of various implementations of embedded coupling strips.

Figure 28:
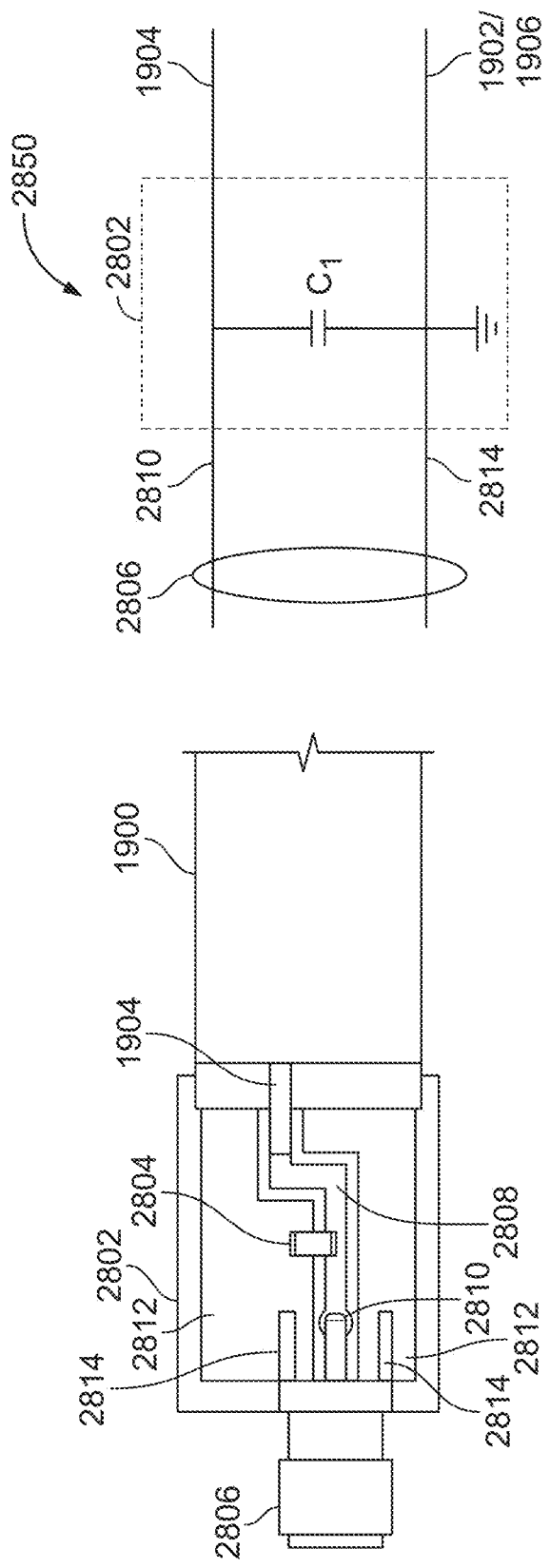

FIG. 28 depicts diagrams of an implementations of coupling strip connector.

Figure 29:
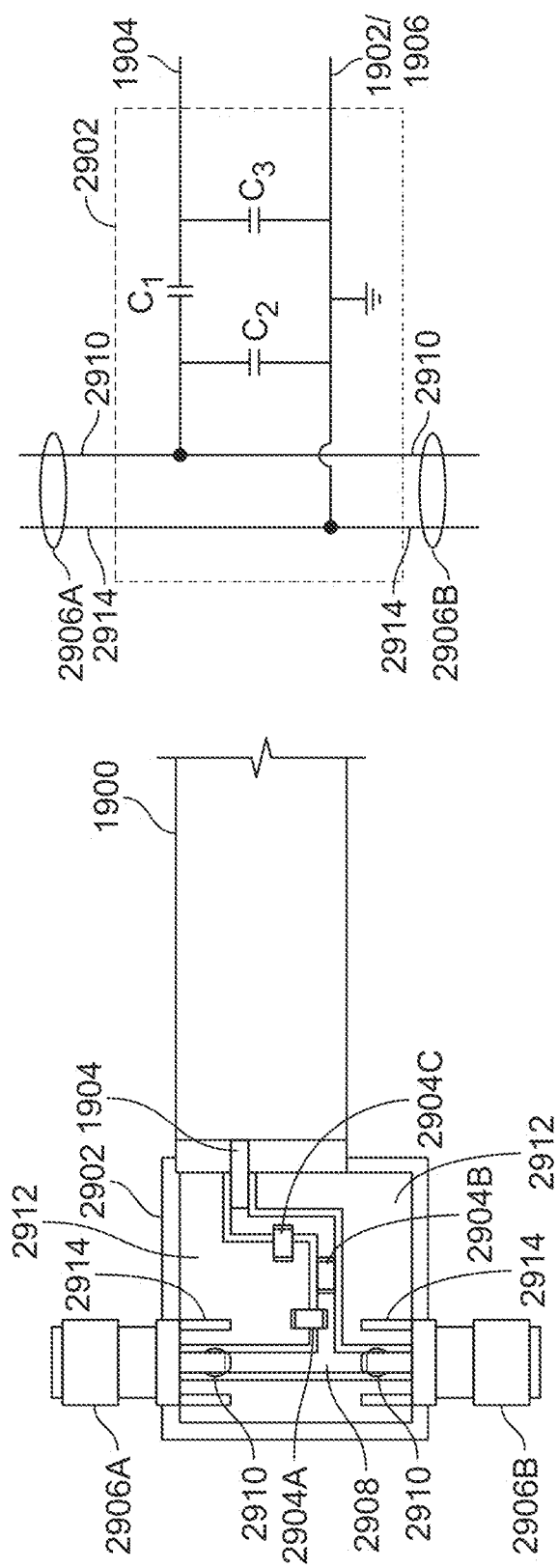

FIG. 29 depicts diagrams of another implementation of a coupling strip connector.

Figure 30:
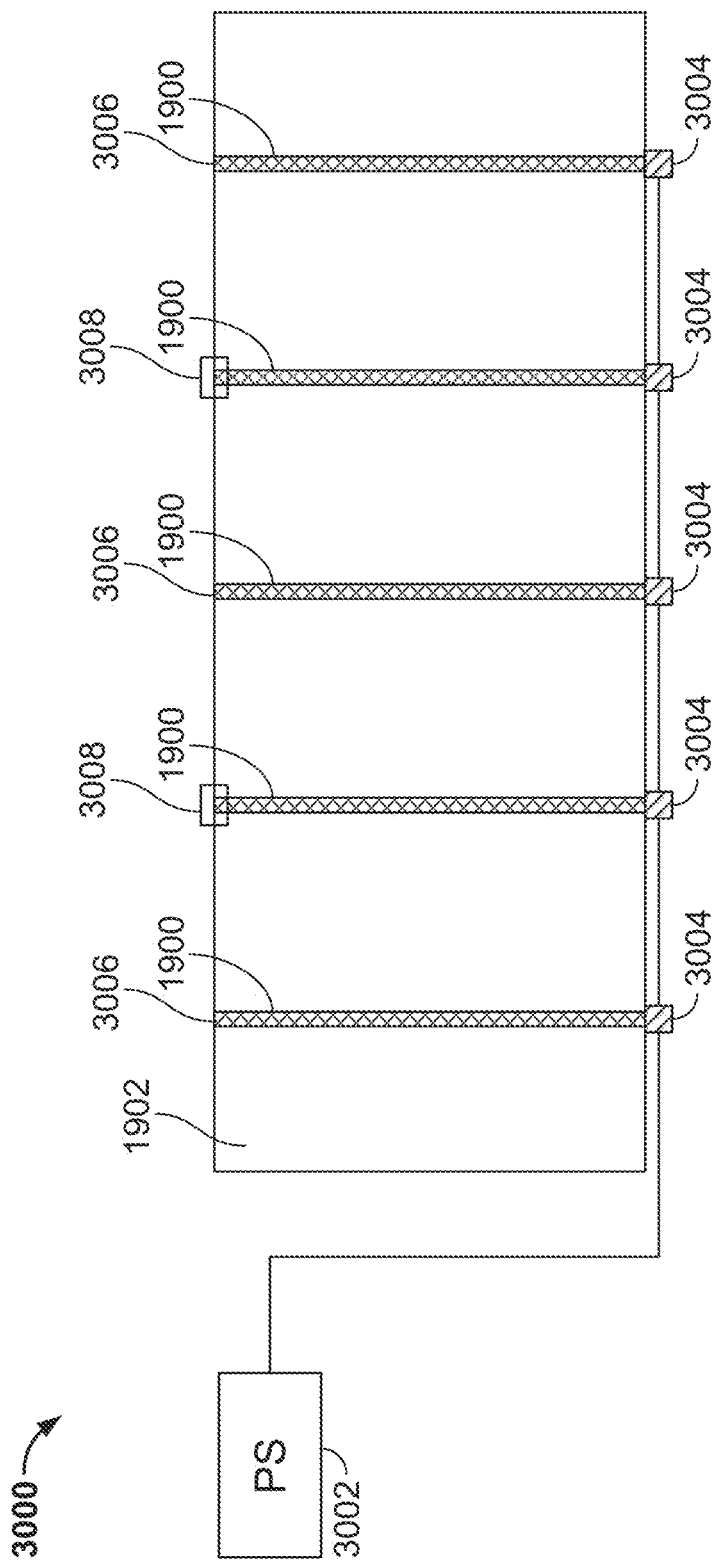

FIG. 30 is a block diagram of a first exemplary bulk medium heating system utilizing coupling strips according to implementations of the present disclosure.

Figure 31:
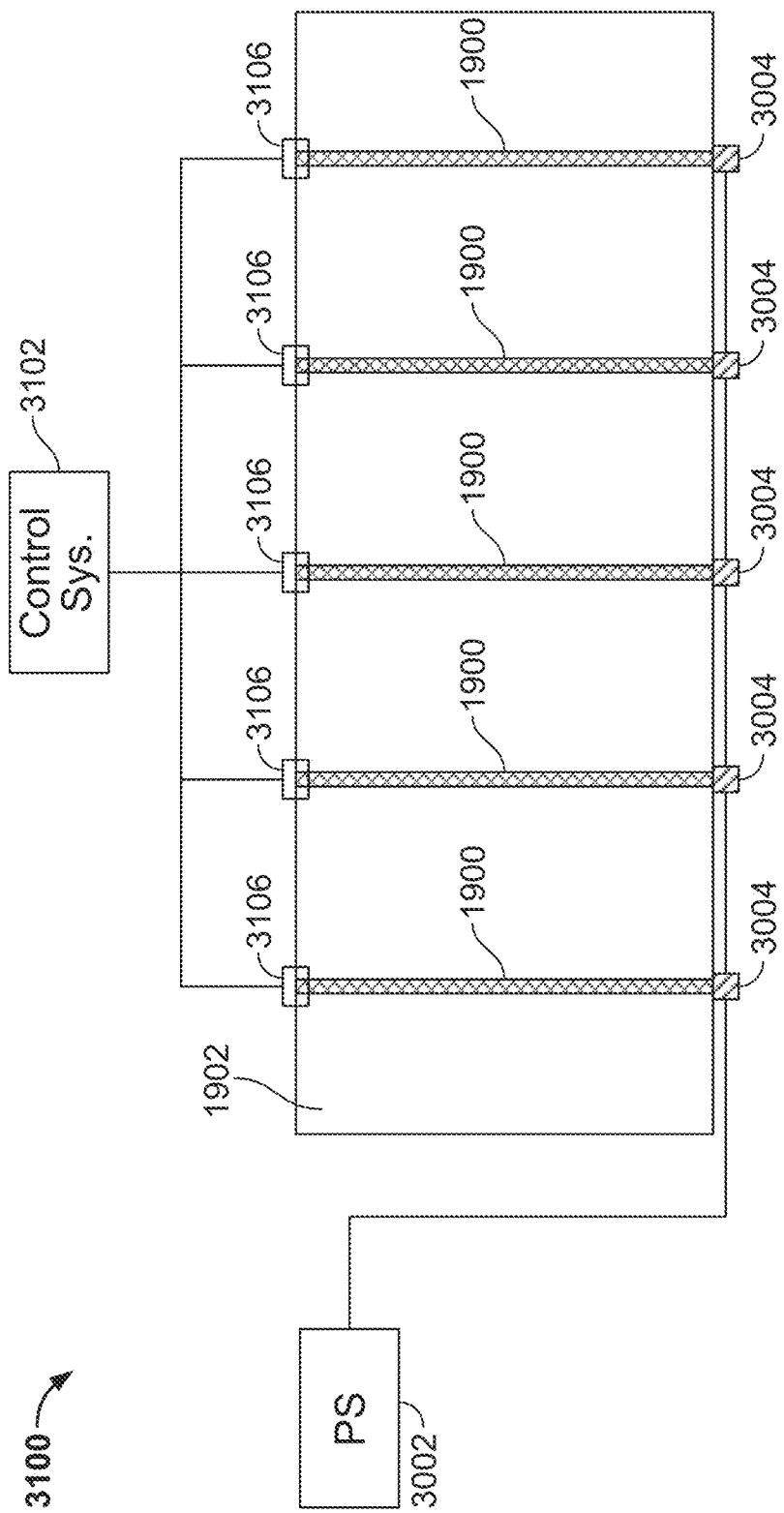

FIG. 31 is a block diagram of a second exemplary bulk medium heating system utilizing coupling strips according to implementations of the present disclosure.

Figure 32:
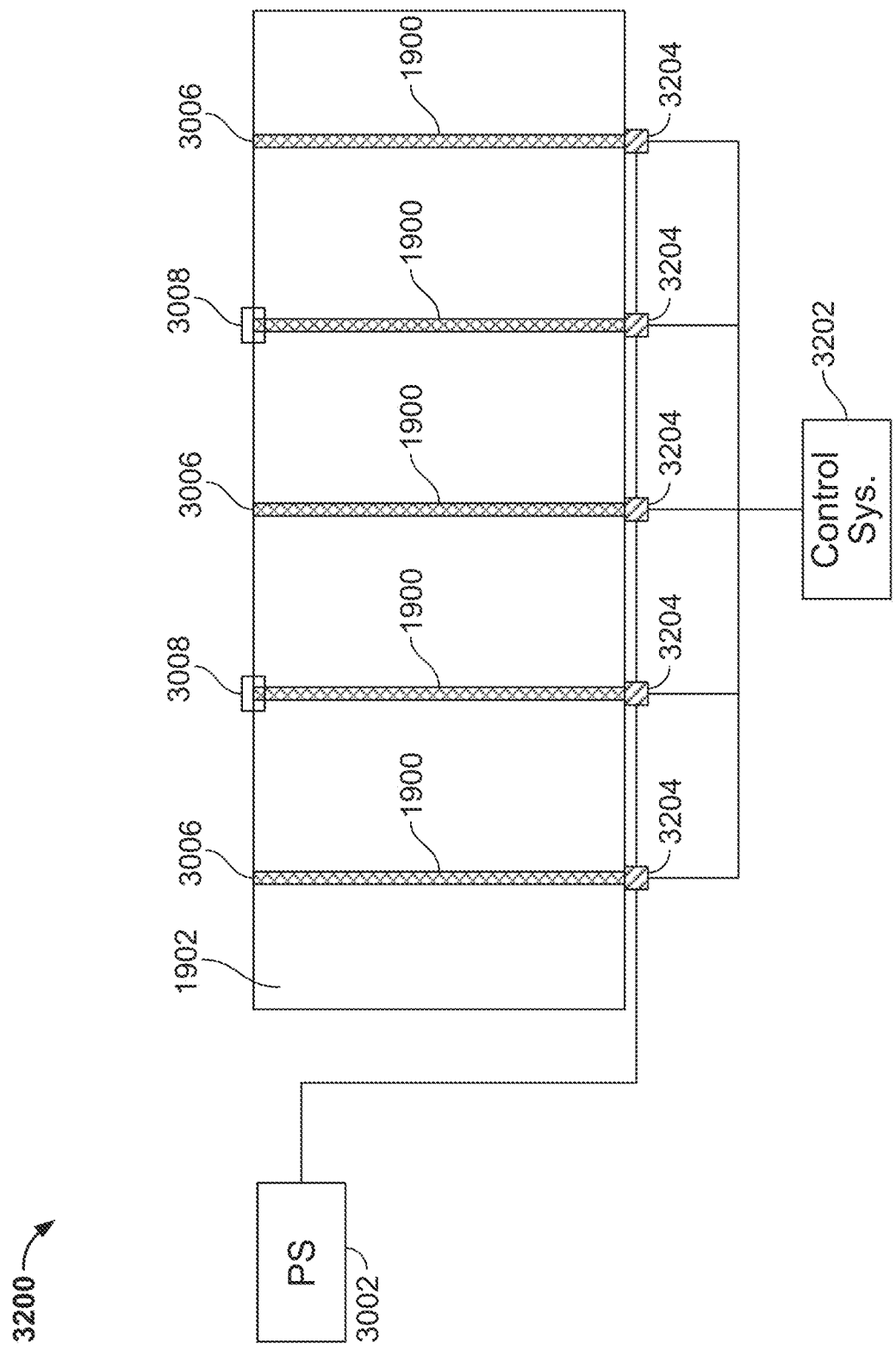

FIG. 32 is a block diagram of a third exemplary bulk medium heating system utilizing coupling strips according to implementations of the present disclosure.

Figure 33:
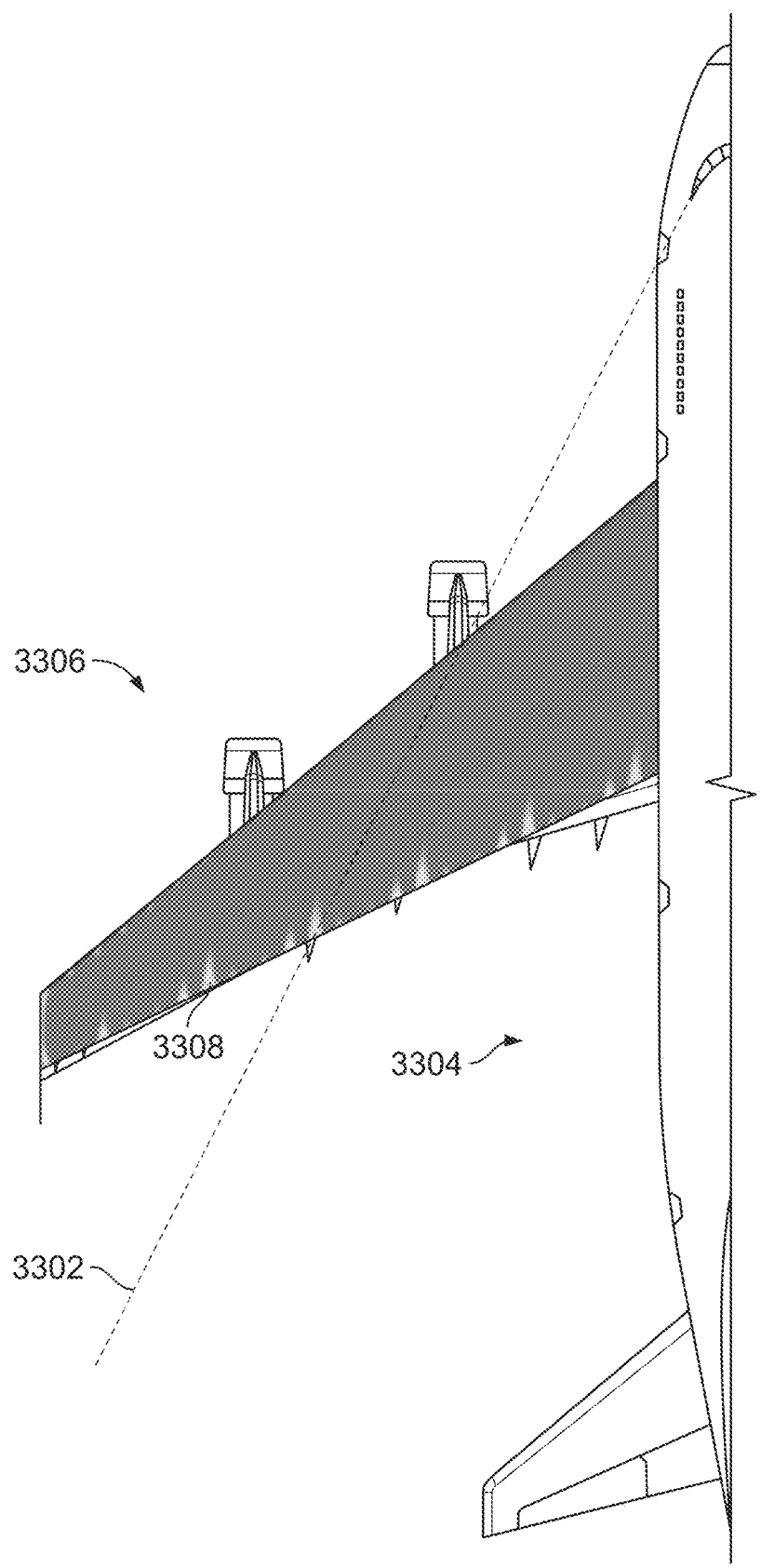

FIG. 33 is an illustration depicting an example portion of a pilot's field of view in on an aircraft with a temperature overlay of the wing.

FIG. 34 is a diagram depicting time domain reflectometry (TDR) techniques.

Figure 35A:
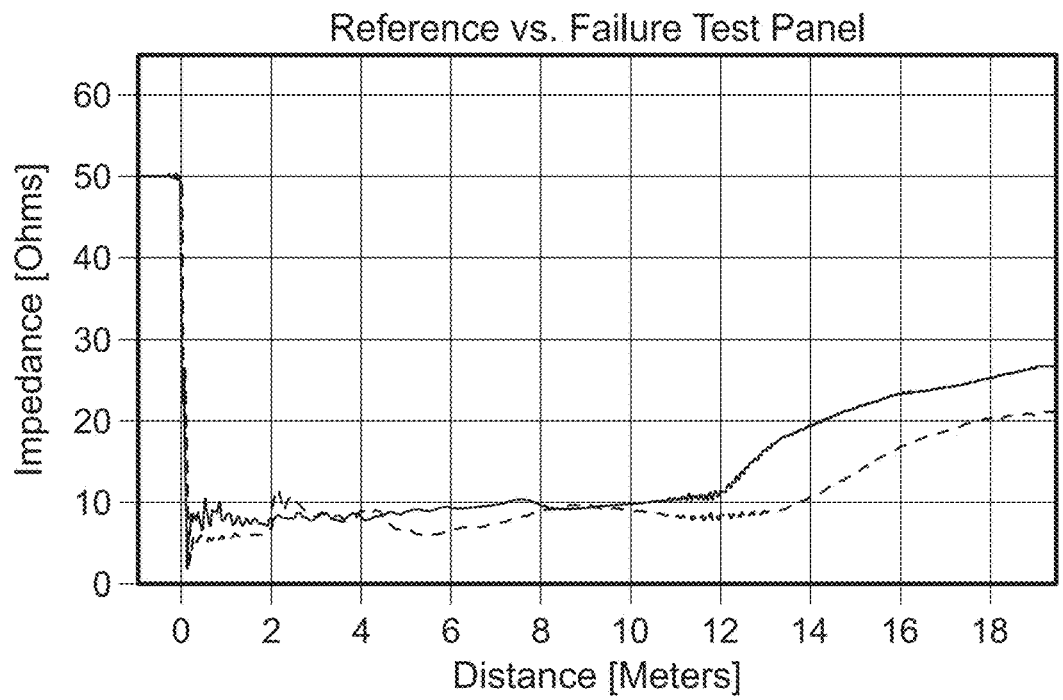

FIG. 35A is a plot showing a comparison between two transmission lines measured with TDR, one line including a connector at 2 meters.

Figure 35B:
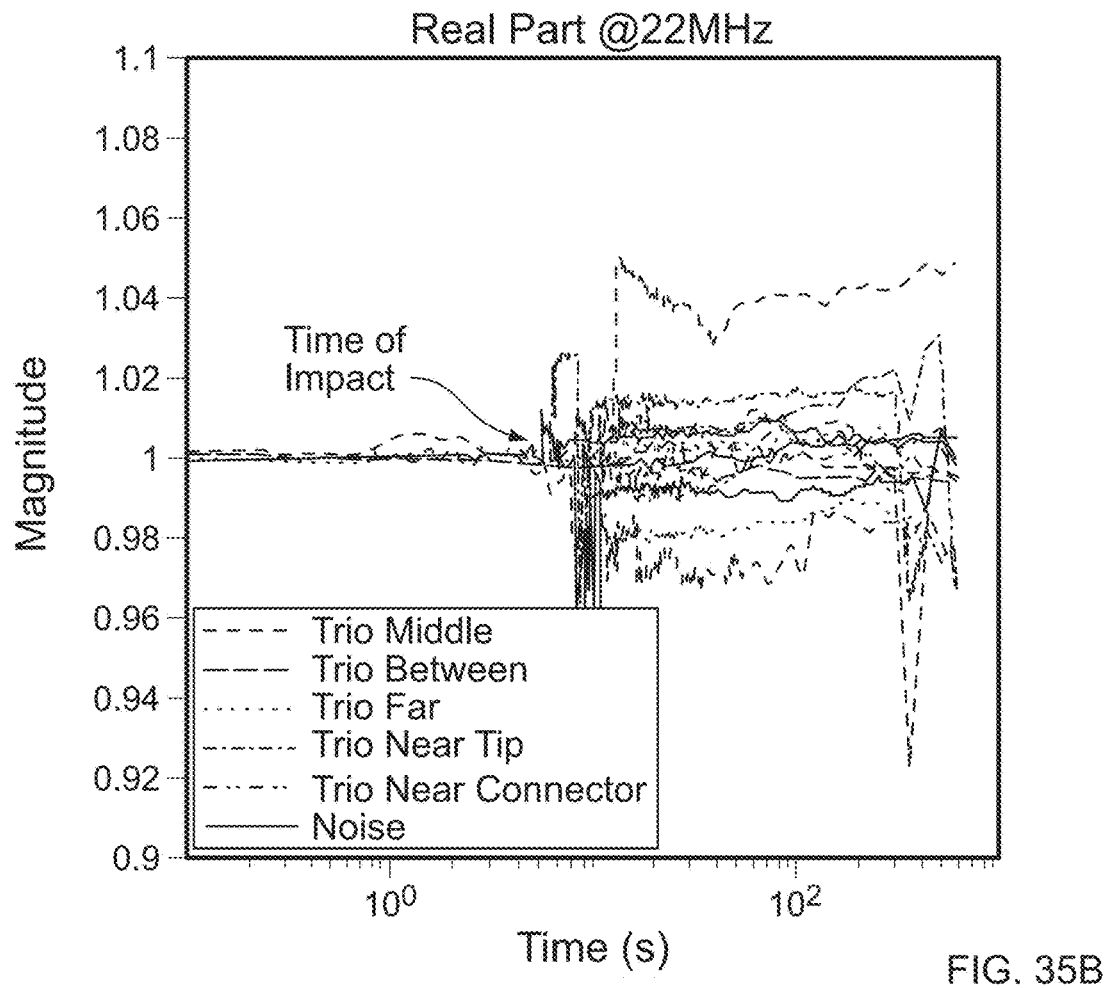

FIG. 35B is a plot showing a frequency domain analysis showing an impedance change following a dent caused by an impact.

Figure 36:
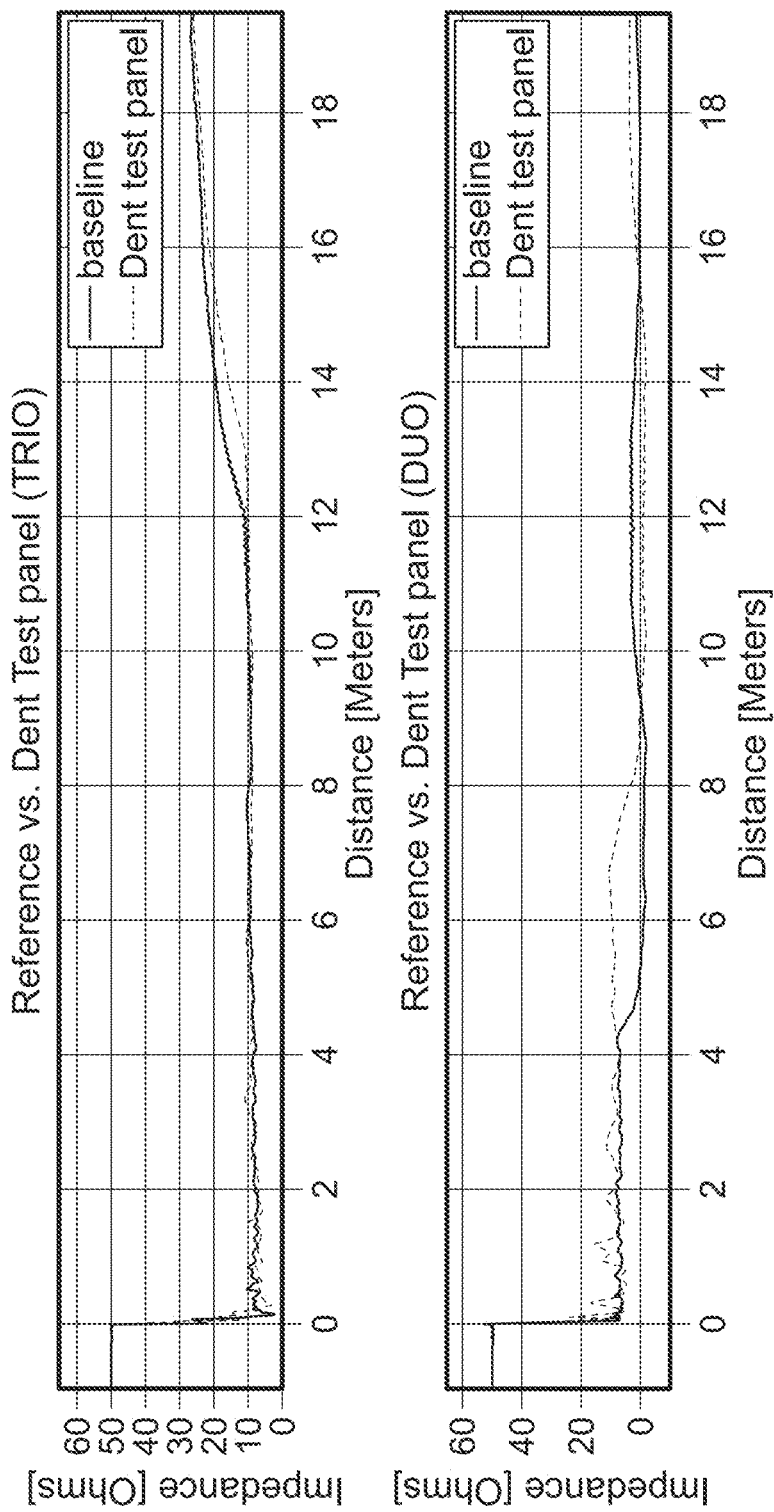

FIG. 36 is a plot depicting a comparison of two transmission lines measured with TDR, one line having a dent in its test panel.

Figure 37C:
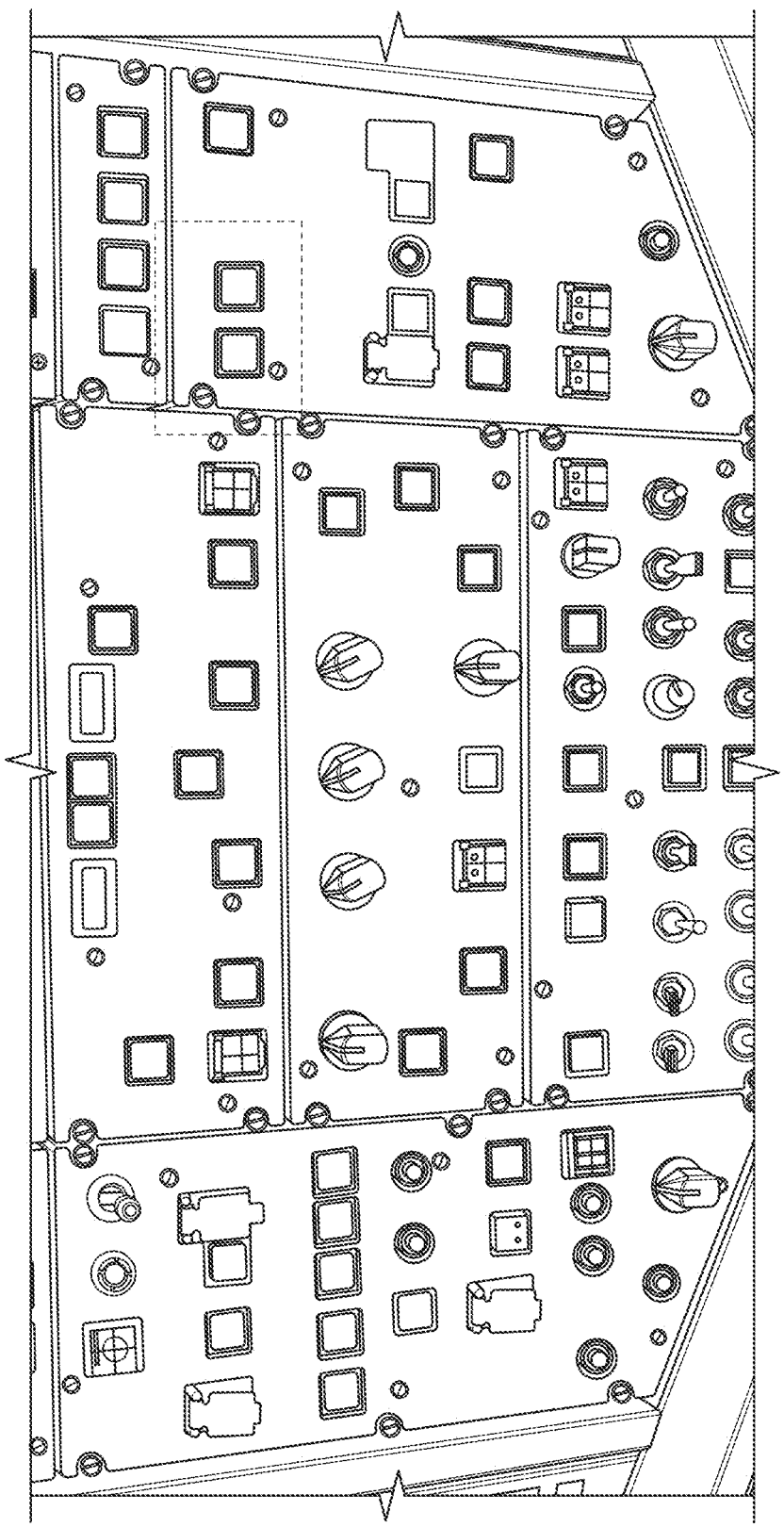
Figure 38:
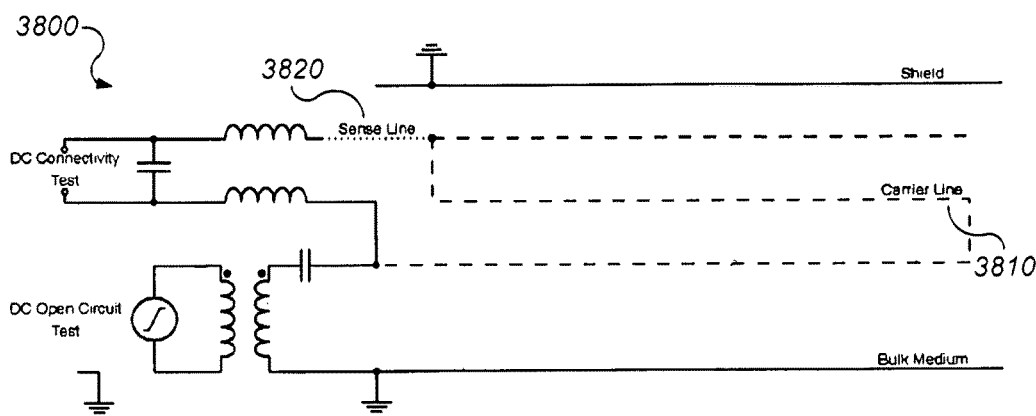
Figure 39A:
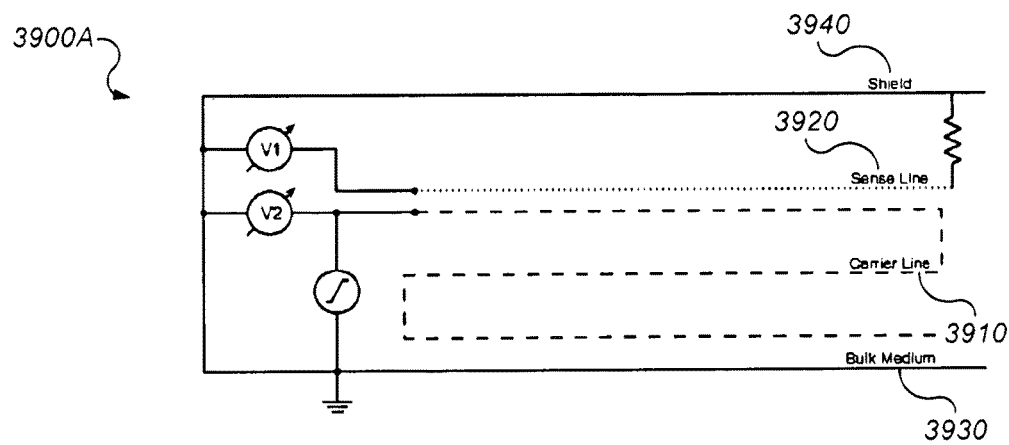
Figure 39B:
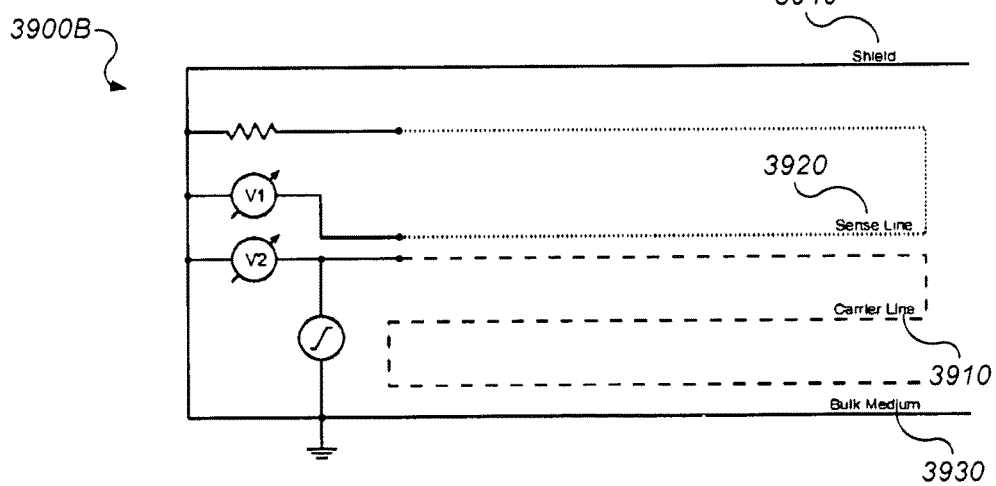

FIGS. 37A, 37B, and 37C depict example flight-deck annunciation displays.

Figure 41:
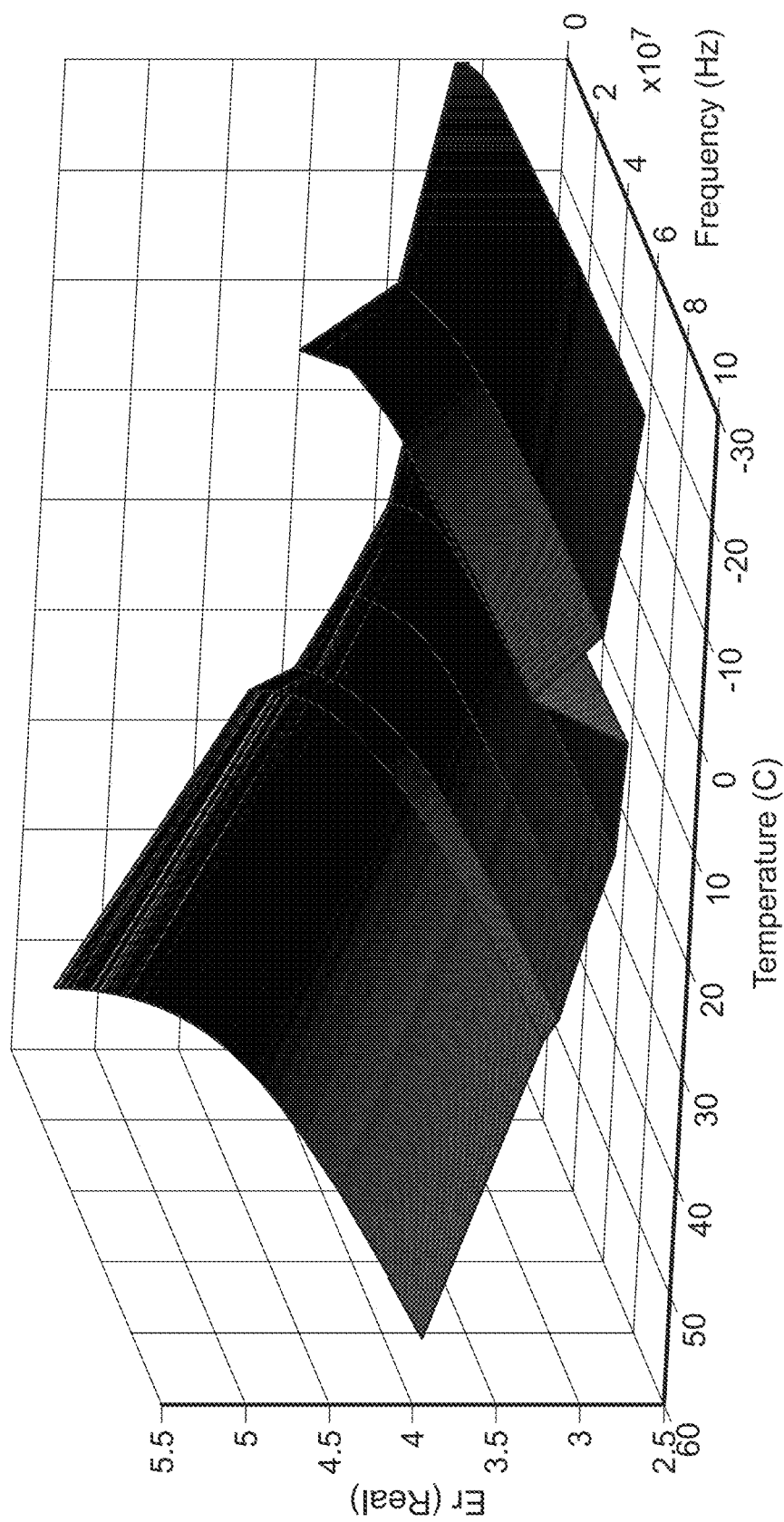

FIG. 41 is a 3D plot of a dielectric constant of an example acrylic adhesive material for a range of operating temperatures for a range of operating temperatures.

Figure 42:
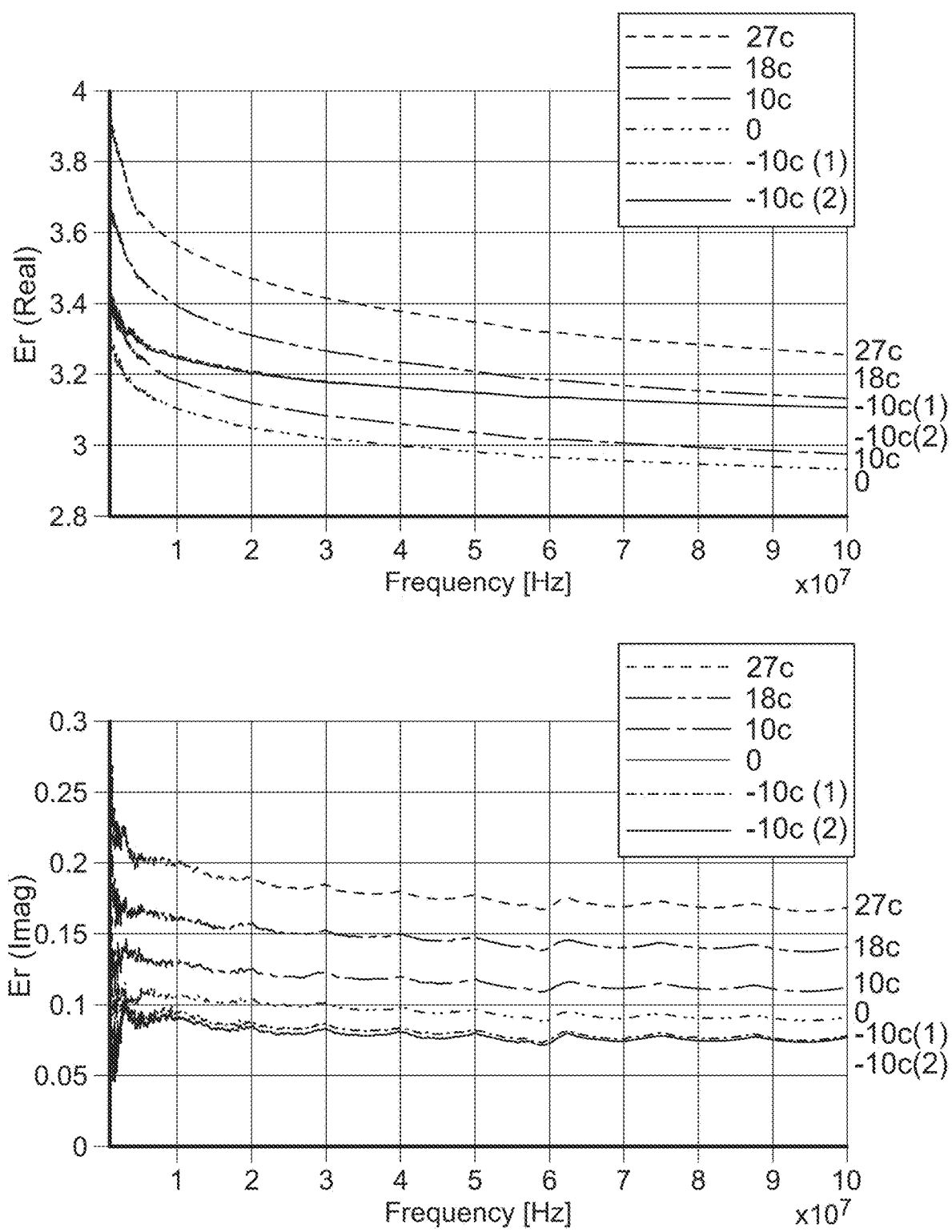

FIG. 42 is a plot of a dielectric constant of an example acrylic adhesive material for a range of operating temperatures for a range of operating temperatures.

Figure 43:
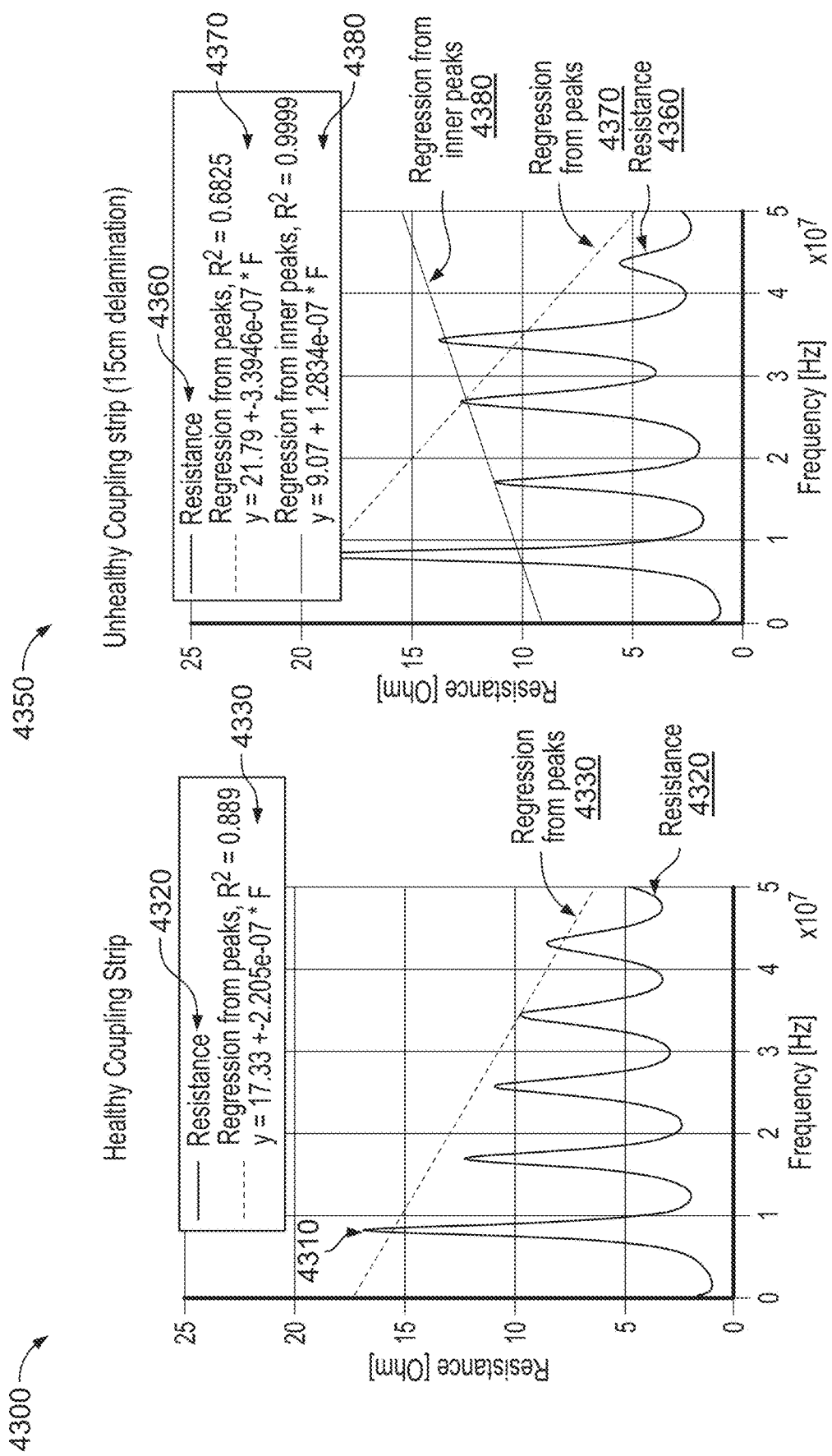

FIG. 43 depicts plots of frequency responses of a non-faulty line and a faulty line.

Like reference numbers and designations in the various drawings indicate like elements.

DETAILED DESCRIPTION

The heating system of the present specification uses AC currents in order to increase the effective electrical resistance of conductive materials (e.g., aluminum, carbon fiber composites) in order to more easily heat them. In general, the heat generated in the conductive material can be used to melt ice that has formed on the surface of the conductive material. The heat can also be used to keep conductive materials at an elevated temperature in order to prevent vapor deposition on the surface, or to keep water from freezing on the surface, as well as to prevent freezing precipitation (e.g., snow, ice pellets, fog, freezing rain) from accumulating on the surface. For example, the heat generated in the conductive material may conduct (e.g., spread out) throughout the conductive material. In addition, the heat generated may cause convection across the interface between the conductive material and the any liquid on the surface in order to, for example, heat the liquid and prevent it from freezing.

Alternating currents can be utilized to induce a number of electromagnetic effects that increase the effective resistance of a conductive material, thereby facilitating heat generation using Joule heating in the conductive material. Such effects include the skin effect, the proximity effect, induction, eddy currents, hysteresis losses, and dielectric losses. With the skin effect, if the frequency of the current in a conductor is set to a sufficiently high value, the majority of the current will pass through a skin depth of the conductive material that is significantly less than the conductive material's geometric thickness. In addition, specific device geometries can be used to generate the proximity effect within the conductive material, which will further constrain the width of the current density, thereby, further increasing the effective resistance along a current path within the conductive material. Taken together, these two effects can be used to increase the electrical resistance of the conductive material and result in Joule heating.

For example, Joule heating generally refers to heat produced by passing an electric current through a conductor. The heat generated in a given current carrying conductor is proportional to the resistance of the material times the root mean square of the amplitude of the current squared:

$$P \propto I^2 R$$

Heat output from a heating element is generally increased by increasing the current passed through a conductor and by having relatively higher resistance heating elements. However, implementations of the present disclosure generate Joule heating by leveraging particular electromagnetic phenomena (e.g., skin effect and proximity effect) to constrict the current density of a localized current within a bulk medium. This constriction in current density produces an increased effective resistance along the current's path within the bulk medium. While specific effects may vary in different materials and with different geometries, the effective resistance for a given length along the current path through a bulk medium can generally be represented as:

$$R_{\it{eff}} \propto \rho \frac{l}{A_{\it{eff}}},$$

where $\rho$ represents the resistivity of the material through which the current flows, l represents the length of the current path, and A f represents the constricted cross-sectional area of the current density. Implementations of the present disclosure use the electromagnetic phenomena to reduce $A_{\it{eff}}$ to an area less than the cross-section of the bulk medium along the current's path, thereby, increasing the effective resistance of the bulk medium above that of the bulk medium to a DC current.

Some implementations of the present disclosure can use these electromagnetic phenomena to increase the length of a current path through the bulk medium. For example, as described in reference to FIG. 4D below, techniques described herein can be used to "steer" the current path along a non-direct route (e.g., a serpentine path) between two electrodes attached to the bulk medium. The non-direct route may create a current path that has an effective length ($l_{\it{eff}}$) that is longer than a substantially straight path that would generally be produced by passing a current between the two electrodes in the absence of electromagnetic effects such as the proximity effect, for example. Thus, systems described herein may increase the current path length 1 to an effective length ($l_{\it{eff}}$) that is longer than a direct path that the current would take in the absence of the various systems and conductor arrangements described herein. Accordingly, such implementations may increase the effective resistance ($R_{\it{eff}}$) by both constricting the effective cross-sectional area ($A_{\it{eff}}$) of a current flowing through a bulk medium and also increasing the effective length ($l_{\it{eff}}$) that the current traverses through the bulk medium, thereby, further increasing the effective resistance of the bulk medium above that of the bulk medium to a DC current. In such implementations, the effective resistance can be generally represented as:

$$R_{\it{eff}} \propto \rho \frac{l_{\it{eff}}}{A_{\it{eff}}}.$$

Through the use of such techniques, implementations of the present disclosure can produce high localized resistances in conductive bulk materials (e.g., aluminum, copper, steel, and alloys thereof).

Skin effect, as used herein, generally refers to the tendency of an alternating electric current to be unevenly distributed in a conductor, such that the current density is larger near the surface of the conductor and decreases as distance to the conductor's surface increases. The intensity of the skin effect increases with the frequency of the current and with the conductivity of the material that carries the current. Some implementations of the present disclosure may tune the skin effect to cause the electric current to flow more at the outer surface of the conductor (e.g., "skin depth") at higher AC frequencies.

In general, the skin effect in a conductor can be represented by the following formula:

$$J = J_s e^{-(1+j)d/\delta} \text{ with } \delta = \sqrt{\frac{2\rho}{\omega\mu}} \sqrt{\sqrt{1+(\rho\omega\varepsilon)^2}+\rho\omega\varepsilon}$$

where J is the current density, $J_s$ is the surface current density, d is the depth of the point where the current density is calculated, $\delta$ is the skin depth, $\rho$ is the resistivity of the conductor, $\omega$ is the angular frequency of the current, $\mu$ is the magnetic permeability of the conductor, $\varepsilon$ is the permittivity of the conductor. In the case of a cylindrical conductor with a base radius R, the current density can be further derived as:

$$J = J_s \frac{J_0\left(\sqrt{\frac{-j\omega\mu}{\rho}}(R-d)\right)}{J_0\left(\sqrt{\frac{-j\omega\mu}{\rho}}R\right)}$$

where $J_0$ is the Bessel function of the first kind and of order 0.

In the case of a rectangular, infinitely long and wide plate on which a surface current flows, the skin effect can be represented by the following formula:

$$J = J_s \frac{sh(\sqrt{j\omega\sigma\mu}\,d)}{sh(\sqrt{j\omega\sigma\mu}\,e)}$$

where $J_s$ is the forced surface current, $\sigma$ is the plate conductivity, e is the plate thickness, and sh is the hyperbolic sine function. For example, the chart shown in FIG. 3, and discussed in more detail below, illustrates an example of current density constriction within the depth of the material (e.g., skin depth) in a cylindrical conductor that is caused by the skin effect. As detailed above, such constriction of the effective cross-section increases the effective resistance of the conductor.

For example, the chart shown in FIG. 3, and discussed in more detail below, illustrates an example of current density constriction within the depth of the material (e.g., skin depth) that is caused by the skin effect.

Figure 5A:
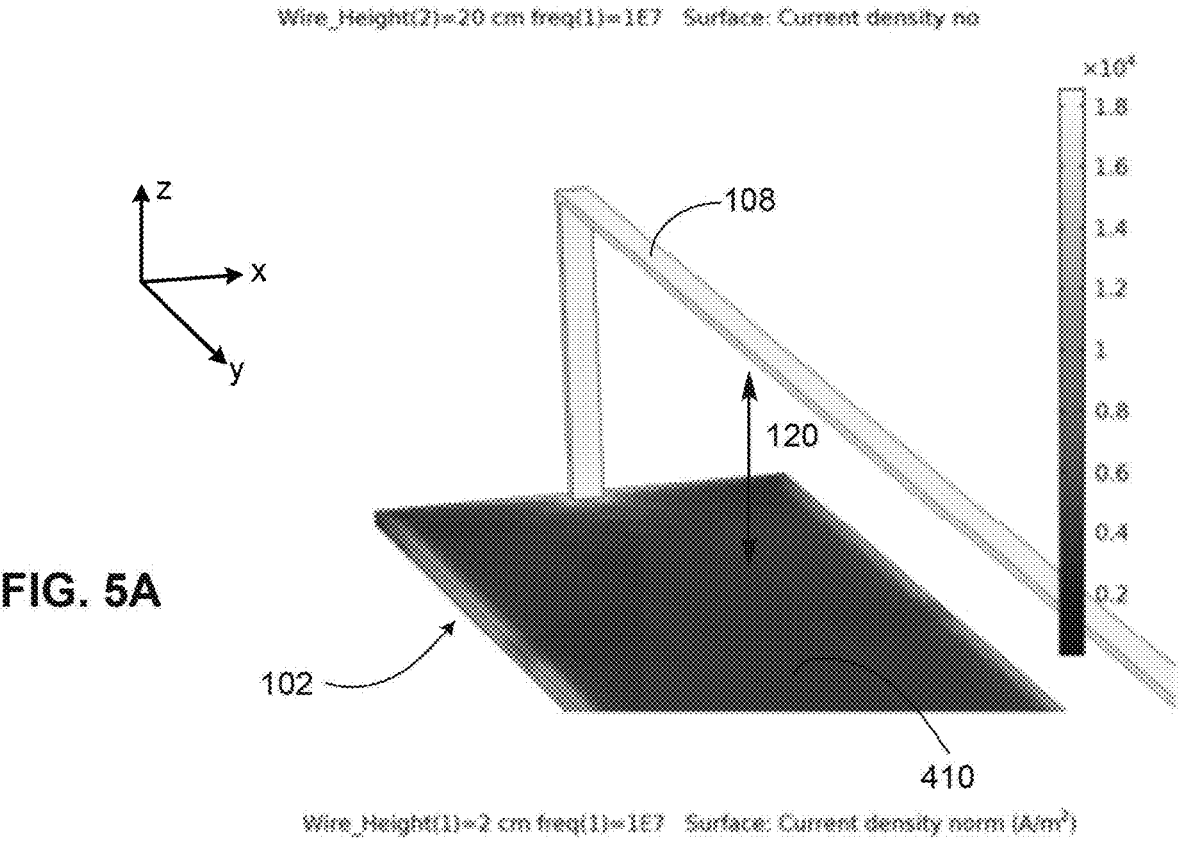
FIGS. 5A-B are simulation graphics showing the increased concentration of current density in a bulk conductor near a second conductor as a function of distance between the conductors due to the proximity effect.

Proximity effect, as used herein, generally refers to the effect of AC current flowing in a first current path (e.g., conductor) on the current density of an AC current flowing in a second, nearby, current path. For example, as shown in FIG. 5A:5B and described in more detail below, the AC current in the first current path causes the density of the AC current in the second current path to "crowd" or constrict around the first current path. In implementations of the present disclosure, for example, the density of a current passing through a bulk medium is "pulled" towards another conductor carrying an AC current when the conductor is placed proximate to current passing through the bulk medium. The degree and direction of current density constriction (e.g., crowding) caused by the proximity effect is dependent on several variables including, for example, the distance between two or more AC current paths, the direction of current travel in the individual current paths relative to each other, the frequencies of the AC currents in the current paths, and the magnitude of the individual currents in the current paths.

For clarity, the heating system of the present disclosure will be described in reference to the example context of a de-icing and anti-icing system for an external surface of an airplane. However, the heating system of the present disclosure can be used in other contexts including, but not limited to, heating the surfaces of other aircraft, drones, wind turbines, units in cryogenic operations, heat pumps, cars, radio towers, railroad tracks, manned or unmanned military vehicles, roofs, or heating other conductive surfaces that may benefit from control of ice or water formation. The heating system can be used for de-icing or anti-icing. In some implementations, the heating system can be used to heat less conductive materials by, for example, applying a conductive layer over or inside a non-conductive material. Such implementations can be used to heat surfaces of roadways (e.g., driveways), building materials, roofs, floors or other low- or non-conductive materials.

De-icing, as used herein, generally refers to removal of snow, ice or frost (collectively referred to as "ice") from a surface. In some implementations, the heating system can melt only a portion of existing ice on a conductive surface. The ice would then be removed from the surface (e.g., by slipping off the surface once the melting process has started and the ice-surface bond has been broken).

Anti-icing, as used herein, generally refers to the prevention of the formation of or the adherence of snow, ice or frost (collectively referred to as "ice") to a surface. In some implementations, the heating system maintains the surface temperature high enough to prevent ice from forming on the surface and prevent ice accumulation or formation (e.g., from freezing precipitations such as snow, frost, ice pellets, freezing rain, etc.).

Figure 1:
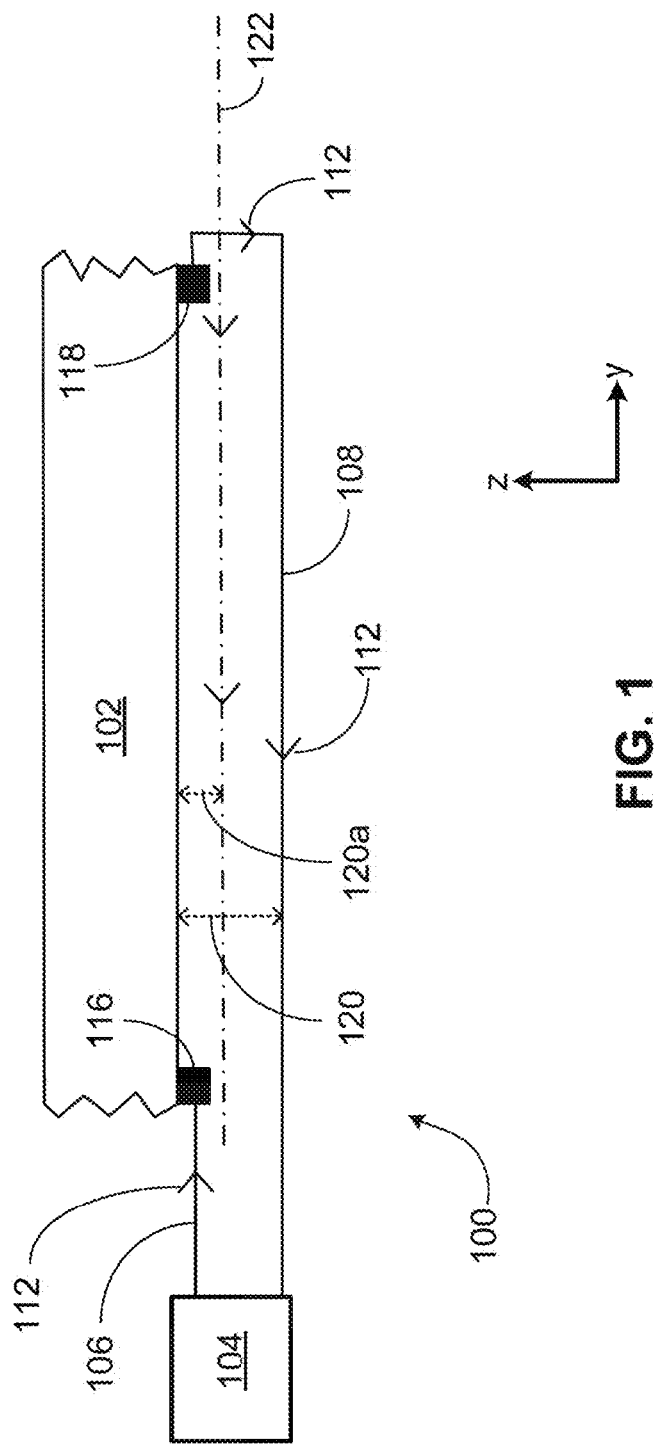
FIG. 1 is a schematic diagram of an exemplary setup for heating a bulk medium.

FIG. 1 shows a block diagram of an example heating system 100 for heating a bulk medium. Heating system 100 includes power control system 104 coupled to electrodes 116 and 118. Electrodes 116 and 118 are coupled to a target area of the bulk medium 102 (e.g., part of an aircraft wing). The power control system 104 generates alternating current (AC current) (e.g., of frequencies 1 kHz or higher) across a closed-circuit through wire (or path or cable) 106, bulk medium 102, and finally wire (or return path) 108. The direction of current 112 through the wires is indicated by a dashed arrow.

In some implementations, the heating system 100 can include, but is not limited to, power control system 104, electrodes 116 and 118, and specialized cables (e.g., wires 108 and 106). In some implementations, the heating system is configured to be coupled to electrodes 116 and 118. In some implementations, the heating system is configured to be coupled to specialized cables (e.g., 108 or 116). In some implementations, power control system 104 can include, but is not limited to, a signal generating unit, power source, a signal transforming unit, an impedance adjusting network, a control unit, and sensors, with specific configurations described in more detail below. As detailed below, in some implementations, the impedance adjusting network is an impedance matching network.

In some implementations, electrodes 116 and 118 are contact electrodes. For example, electrodes 116 and 118 are physically connected to the bulk medium 102 to conduct electrical current from the power control system 104 to the bulk medium. In some implementations, electrodes 116 and 118 can be coupled to the bulk medium 102 but electrically insulated from the bulk medium 102. For example, in such implementations, electrodes 116 and 118 can be the input and output of an induction coil that is positioned proximate to the bulk medium 102 to magnetically induce a current in the bulk medium 102.

Power control system 104 can supply current at a sufficiently high frequency (e.g., above 1 kHz) to constrict current flow in the z-direction between electrodes 116 and 118 by tuning the skin effect, resulting in higher resistance of bulk medium 102. For example, the power control system 104 can provide AC current at a frequency between 1 kHz and 300 GHz. In some implementations, the current frequency is between 10 kHz and 30 GHz. In some implementations, the current frequency is between 100 kHz and 450 MHz. In some implementations, the current frequency is in a range of 1 MHz-50 MHz, 100 MHz-150 MHz, 200 MHz-300 MHz, 400 MHz-500 MHz, or 800 MHz-1 GHz.

In some implementations, the return path 108 is arranged in close proximity to the surface of the bulk medium 102. The proximity of the return path 108 to the surface of the bulk medium can be used to tune the proximity effect of the current flowing between electrodes 116 and 118 and, thereby, further constrict the current and increase the heating within the bulk medium. In order to harness the proximity effect to shape the current flowing between electrodes 116 and 118 it is not necessary to use the return current path 108 from the heating system circuit itself. In some implementations, another current path 122 (e.g., from different circuit) can be placed in close proximity (e.g., distance 120a) to the bulk medium 102. For example, when the distance 120 or 120a of current path 108 or 122 from bulk medium 102 is sufficiently small, the proximity effect can be used to further constrain current through the bulk medium.

For example, the distance 120 (or 120a) between the bulk medium and path 108 (or 122) can be less than 1 m, or less than 50 cm, or less than 10 cm to produce a proximity effect. If closer distances are possible, with due consideration for design constraints (e.g., with an airplane wing as bulk medium, where the rib or spar of airplane is not in the way of the return path 108/122), distance 120 (or 120a) can be less than 25 cm or less than 10 cm.

The bulk medium 102 can include materials such as, but not limited to, aluminum, metal alloys, carbon fiber composites, copper, silver, titanium, or steel. For example, the bulk medium can be any part of an aircraft airframe (e.g., outer-most shell or surface of airplane, also known as airplane's "skin") such as fuselage, wings, undercarriage, empennage, etc.

The electrodes (116 and 118) can include materials such as, but not limited to, aluminum, silver, copper, alloys thereof, or other conductive materials. In some implementations, the electrode material is at least as electrically conductive as bulk medium 102. In some implementations, electrodes 116 and 118 can be arranged in arrays of electrodes. The electrodes may be coupled to the bulk medium in a variety of ways, e.g., to the top or bottom surface of the medium, or embedded inside the medium.

Heating system 100 is configured to produce an effective resistance through bulk medium 102 by shaping the density of the current through the medium. In other words, for airplane applications, the existing airframe of the airplane will be used as part of the electrical circuit of the heating system. Heating system 100 shapes the density of the current by tuning the skin effect, the proximity effect, or a combination thereof to increase the effective resistance of the bulk medium 102 along a current path between the electrodes 116 and 118.

Figure 4D:
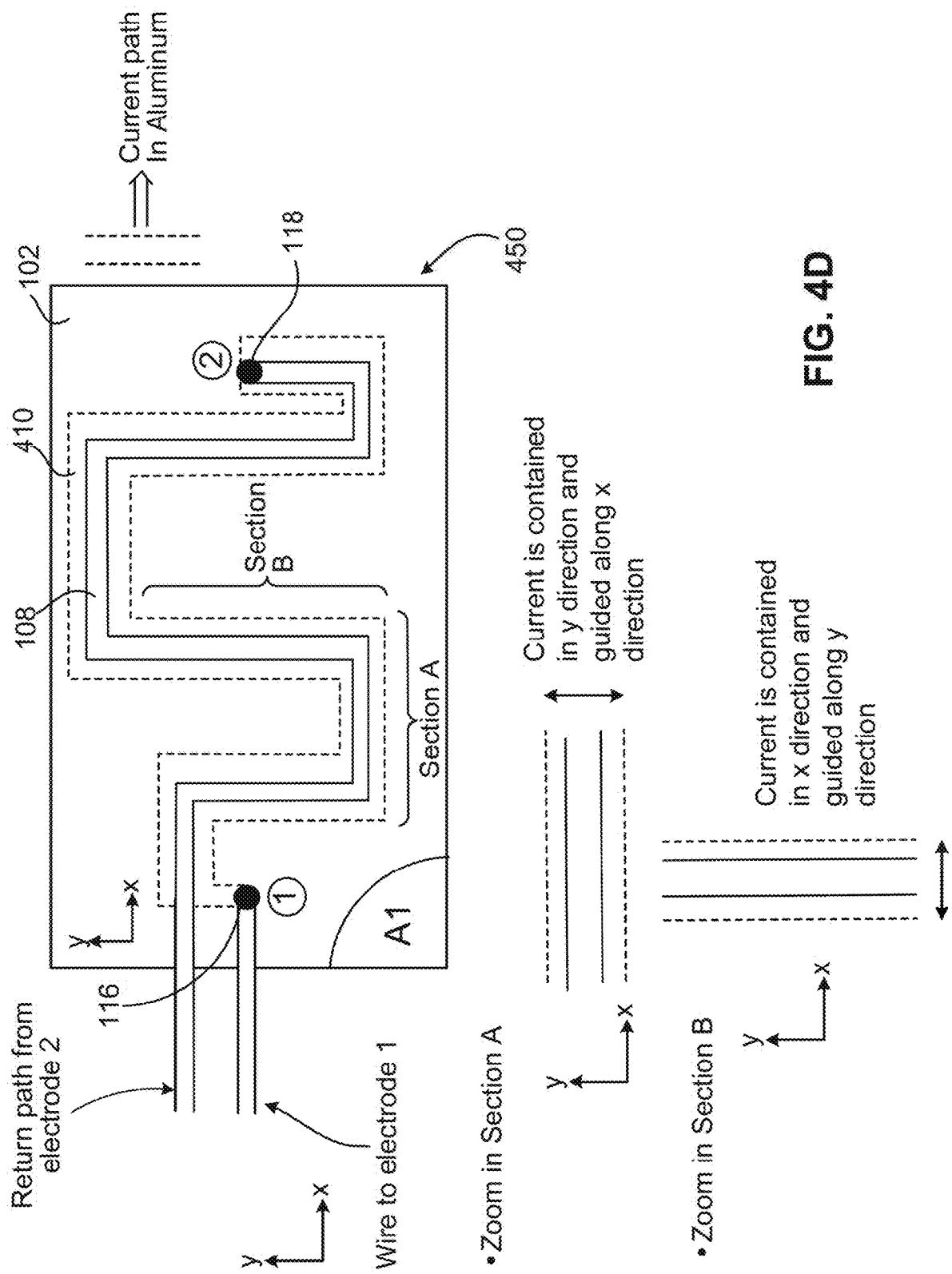

In some cases, the proximity effect is also leveraged to direct the current path, for example as seen in FIG. 4D in order to heat desired sections of the bulk medium. A desired heat section of the bulk medium may be referred to as a "target heating location" or "target location."

In some implementations, an alternating current of frequency 1 kHz or higher can be passed directly through an airframe of the plane. As a result, Joule heating will occur in the portion of the airframe near the surface that has current passing through it. Additionally, heat produced from the current will be spread by conduction throughout the bulk medium 102.

Referring to FIGS. 2A-2B, heating system 100 shapes the current density through medium target area 102 by utilizing the skin effect. As in FIG. 1, an AC current (in direction 212) is applied across electrodes 116 and 118 through a target area of bulk medium 102. FIG. 2A is a schematic diagram illustrating the profile (e.g., side view) of current density 202 through bulk medium 102 target area without the skin effect (e.g., with current frequencies below 1 kHz). The current is running in the y-direction (212), with the majority of the current flowing within the volume of medium 102 indicated by the arrows. For example, the current has a depth 206 of about 2 mm, for example, nearly the entire thickness of the bulk medium. As such, FIG. 2A illustrates an operation of system 100 with little or no shaping of the current density by the skin effect.

FIG. 2B is a schematic of a profile of current density 202 resulting from the application of a higher frequency AC current (e.g., over 1 kHz) across the electrodes. FIG. 2B illustrates an operation of system 100 with shaping of the current density by the skin effect. For example, due to the skin effect produced by operating heating system 100 at high frequencies, the depth of current density 202 flowing through bulk medium 102 is constricted in the z-direction to a narrow region near the surface of the bulk medium 102. Furthermore, the effective resistance of the bulk medium 102 in the region of current flow is sufficiently increased such that Joule heating can be realized in this area without overheating the remainder of the circuit (e.g., wires, power source, inverter, adjusting network, electrodes). The effective resistance of the bulk medium to the AC current in the target area can be greater than the resistance of the bulk medium to a DC current. For example, the effective resistance can be increased by two or more orders of magnitude above the resistance of the bulk medium to a DC current.

Figure 3:
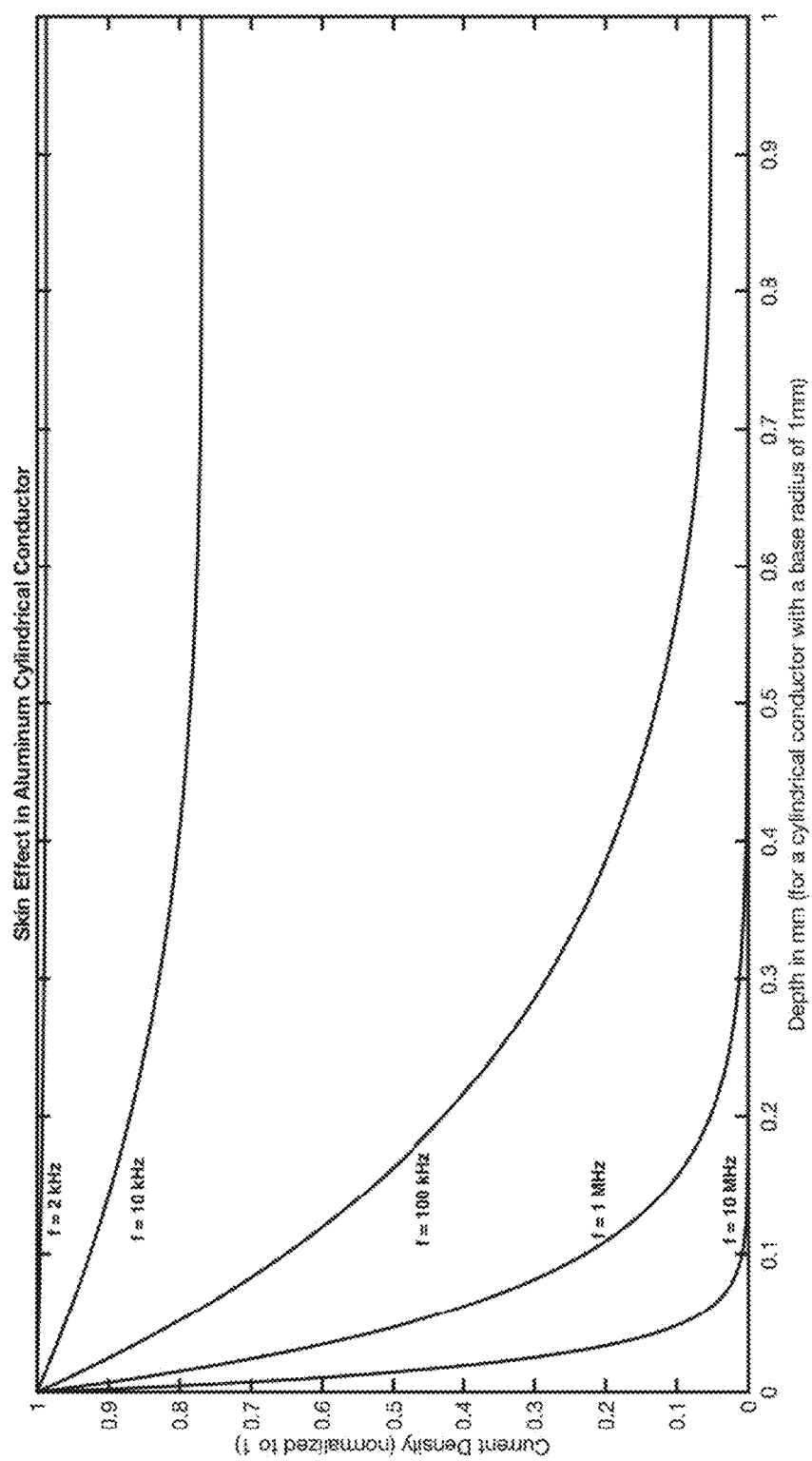
FIG. 3 is a plot showing the increased concentration of current density as a function of applied AC current due to the skin effect.

FIG. 3 is a plot showing the concentration of current density (y-axis, normalized to 1) into the depth of the material (x-axis, normalized to 1) as a function of applied AC current due to the skin effect. The current density decays exponentially along the thickness (z-direction) of the medium. As frequency increases from 1 kHz to 10 MHz, current density becomes more concentrated near the surface of the bulk medium. Thus, the higher the frequency, the more pronounced the decay. In other words, the skin effect constricts the current density causing the current to pass through a thin layer near the surface of the bulk medium. Consequently, Joule heating will occur in this layer as well.

FIG. 4A is a side-view schematic of system 400 for utilizing the proximity effect to further constrain the current density. As in FIG. 1, electrodes 116 and 118 are attached to the bulk medium 102 (e.g., target area on airframe) and pass an AC signal (e.g., over 1 k Hz) to create current density (or path) 410 with direction 412 through the medium. Return path 108 positioned within a distance 120 from current path (or density) 410 in the medium and has a direction 112 different from the direction 412. In some implementations, return path 108 is electrically insulated from the bulk medium 102. For example, return path 108 can be a wire or cable positioned within distance 120 of the bulk medium 102. Return path 108 can be a wire or cable that completes a circuit of system 400.

If the return path 108 is sufficiently close to current path 410 (e.g., less than 50 cm), the AC current in return path 108 constrains the current in current path 410 in directions across the path of the current flow in current path 410. In other words, positioning return path 108 sufficiently close to current path 410 causes the cross-sectional area of the current flow in current path 410 to be constricted. For instance, in reference to FIGS. 4A-4C, current is constricted in two directions (e.g., the x-direction and z-directions as shown) between the electrodes 116 and 118. For example, as shown in FIG. 4D, the proximity effect constricts the current density 410 in either the x- or y-direction depending on the direction of the current flow. For example, where the current flows in the x-direction the proximity effect constricts the current in the y-direction. For example, the proximity effect predominantly constricts the current across the direction of the current flow, whereas the skin effect predominantly constricts the current density within the depth of the bulk medium (e.g., in the z-direction as shown in FIGS. 2A and 2B). In some cases, the proximity effect can also add to the constriction of the current density in the depth (e.g., z-direction) of the bulk medium 102, e.g., enhancing the skin effect in implementations that make use of both the skin effect and proximity effect. In some implementations, the proximity effect can also be used to define the direction of the current flow through the bulk medium (e.g., the route that the current follows through the bulk medium 102).

FIGS. 4B-C are exemplary schematic diagrams of system 400 as seen from the top. Electrodes 116 and 118 are attached to bulk medium target area 102 and pass AC signal (e.g., over 1 kHz) to create current density (or current path) 410 with direction 412 through the medium. Return path 108 is positioned in a different x-y plane (dotted line) from current path (or density) 410 in the bulk medium 102. In some implementations, the current flow in the return path 108 is in a different direction 112 from the direction 412 of the current flow in current path 410 through the bulk medium 102. For example, in some implementations, the direction 112 of current flow in return path 108 is opposite to the direction 412 of current flow in current path 410. When the distance 120 of return path 108 to current path 412 is sufficiently small (e.g., under 50 cm), the current flowing between electrodes 116 and 118 within the bulk medium 102 will crowd close to the return path wire (e.g., constrict in the y- and z-direction) due to the proximity effect, as shown in FIG. 4C. The greater the distance of return path 108 away from the bulk medium 102, the less current path 412 in the bulk medium 102 will be constrained, as shown in FIG. 4B.

FIG. 4D is an exemplary schematic diagram of another implementation of system 450 as seen from the top. As in the previous system 100, electrodes 116 and 118 are attached to a target area of bulk medium 102. Return path 108 is positioned proximate to bulk medium 102 and in a different x-y plane from current path 410 within the bulk medium 102. The implementation shown demonstrates how the return path 108 (or another separate current path) can be used to shape the path that the current 410 follows through the bulk medium 102. For example, by placing a second current path (e.g., a current carrying wire or cable such as return path 108) proximate to the bulk medium 102 the proximity effect can be harnessed to both constrain the width of the current density across the direction of current flow and also to shape current path 410 within the bulk medium 102. FIG. 4D also demonstrates that the proximity effect constrains the current density along current path 410 across the direction of current flow. For example, in FIG. 4D, the current density along current path 410 is constrained in a direction that is substantially perpendicular to the direction of the current flow in each segment of the path 410 and the current path 410 within the bulk medium 102 conforms to follow the shape of the return path 108. More specifically, in section A of current path 410, the current is guided to flow along the x-direction and the current density is constricted in the y- and z-direction. In section B of the current path 410, the current is guided to flow along the y-direction and the current density is constricted in the x- and z-direction.

The ability to shape the current path into more complex geometries with the proximity effect, as shown in FIG. 4D, may offer a number of advantages. First, such path geometries may be used to increase the effective current path length 1. As described above, increased path length leads to increased resistance, and thus increased Joule heating. Second, current path geometries may be configured to direct current flow to strategic locations for heating. Third, the current path geometries may be used to create areas of increased heating (e.g., hot spots) at sharp corners of the current path.

The effective resistance of the bulk medium to the AC current in the target area due to the combination of the proximity and skin effects can be greater than the resistance of the bulk medium to a DC current. For example, the effective resistance can be increased by two or more orders of magnitude above the resistance of the bulk medium to a DC current.

Figure 5B:
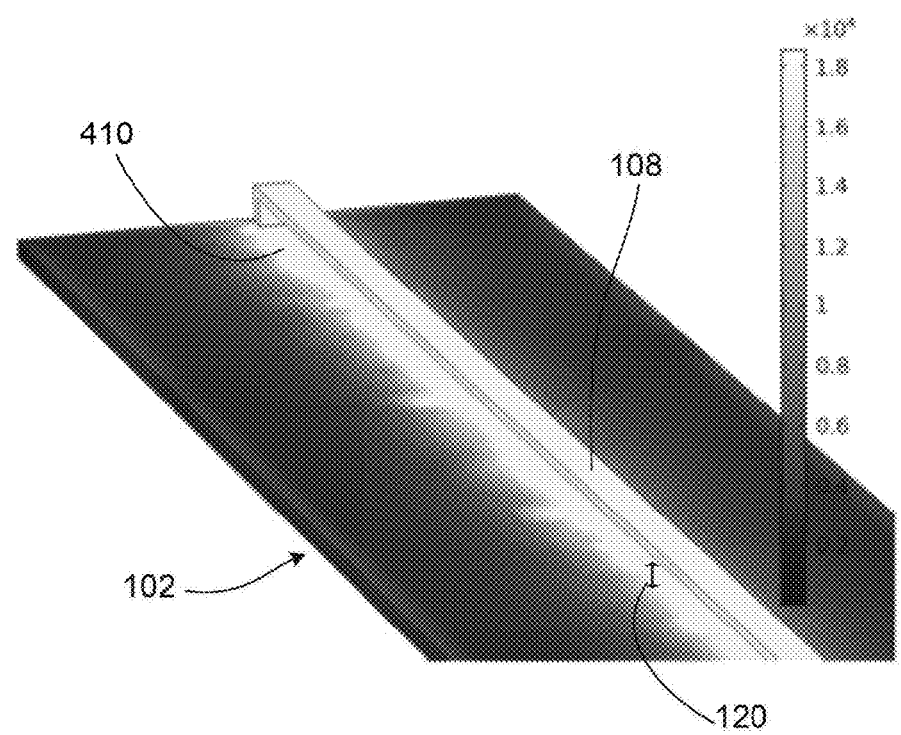

FIGS. 5A-B are simulation graphics showing the increased concentration of current density in a bulk conductor target area 102 near a second conductor/path 108 as a function of distance 120 between the conductors due to the proximity effect. The current in the bulk conductor and the second path are sufficient to cause a proximity effect (e.g., over 1 kHz, or 10 MHz) when distance 120 is reduced. For example, when distance 120 is 20 cm, the current density 410 remains roughly uniform in the x-y-plane, as shown in FIG. 5A. When distance 120 is reduced to 2 cm, as in in FIG. 5B, the proximity effect causes "crowding" or "constriction" of the current 410 around the return path 108 in the x-z-plane. This is realized by the majority of the current 410 crowding on a narrow strip along the bulk conductor and following the path of the second conductor (108) (e.g., return path, or other current carrying wires). In other words, current 410 follows the path of least inductance, rather than spreading out evenly throughout the bulk medium.

In some implementations, a wire other than the return path 108 is used to cause the proximity effect, shown as path 122 in FIG. 1. In that case, the current oscillations in that wire may or may not be driven by the same system (e.g., power control system 104) as paths 106 and 108. In that case, the proximity effect of wire 122 will depend on the distance of the wire 112 from current path 412 in the bulk conductor. Just as with return path 108, wire 122 may need to be sufficiently close (e.g., under 50 cm) to path 412.

In general, power control system 104 delivers current to the bulk medium 102 through electrodes (e.g., 116 and 118) and customized electric conductors (e.g., specialized wires or specialized cables) to form a closed-circuit (see FIG. 1). These three components will be explained in further detail below.

Figure 6A:
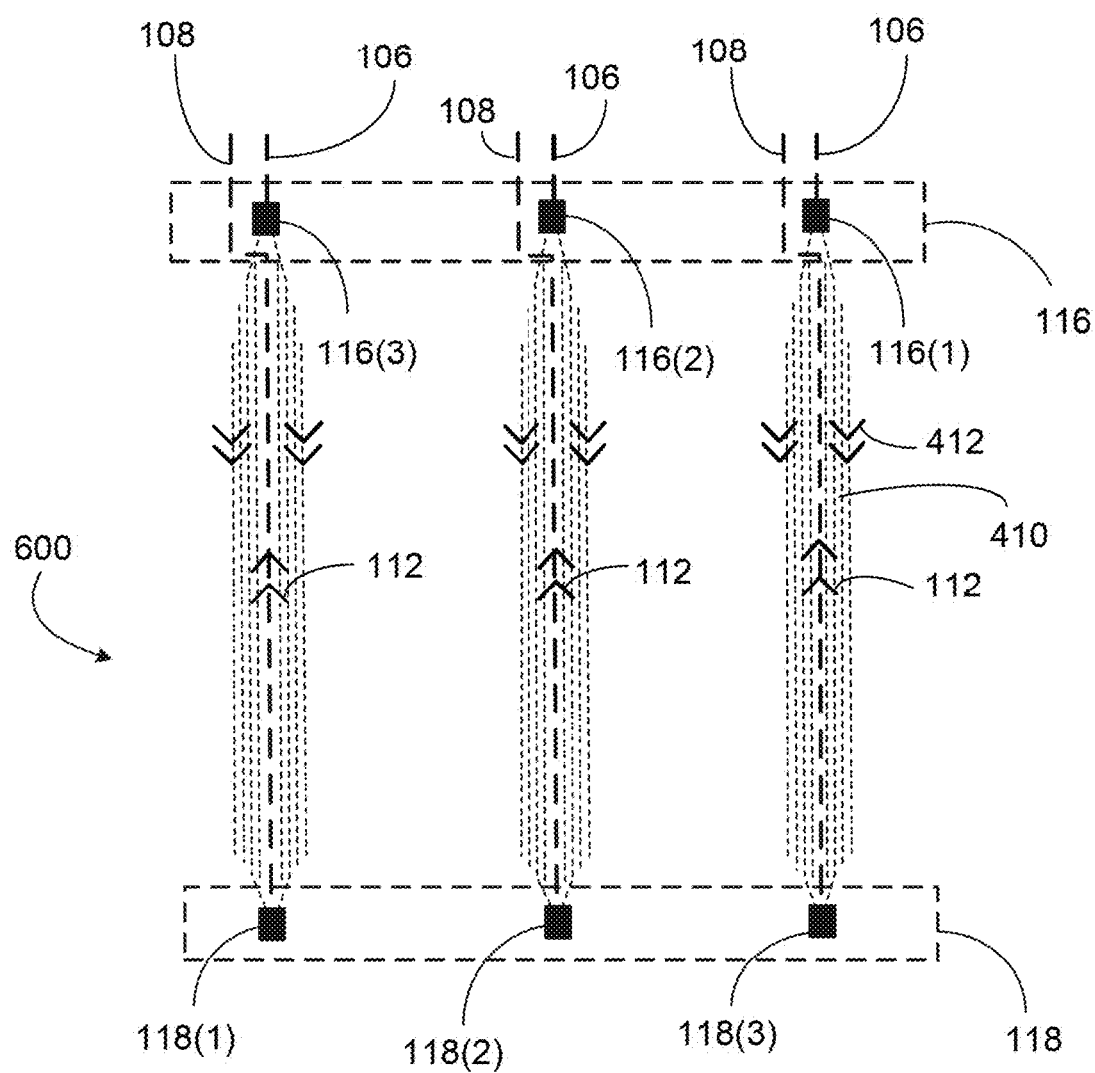
FIG. 6A is a schematic diagram of an exemplary setup for heating a bulk medium using an array of electrodes.

In some implementations, the electrodes 116 and 118 include an array of input and output electrodes, as shown in FIG. 6A. Electrode system 600 includes three input electrodes 116(1)-(3), forming electrode array 116, and three output electrodes 118(1)-(3), forming electrode array 118 and resulting in adjacent current paths 410 in the bulk medium. The proximity effect due to current 112 in return wires 108 constrains current density 410 in the bulk medium, as detailed above.

Figure 6B:
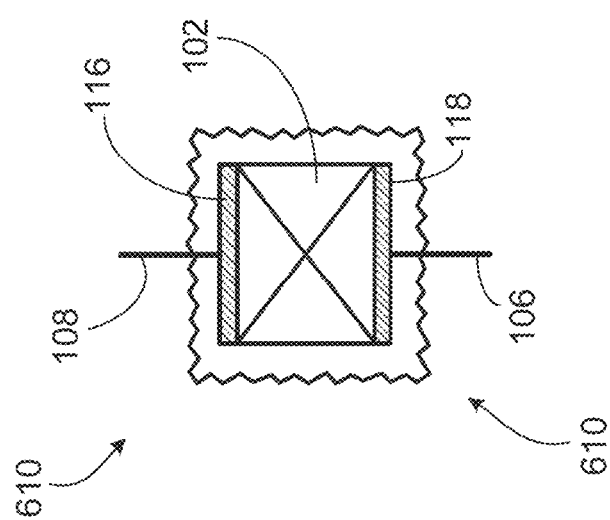
FIGS. 6B-D are schematic diagrams of exemplary setups for heating a bulk medium using various electrode arrangements.
Figure 6C:
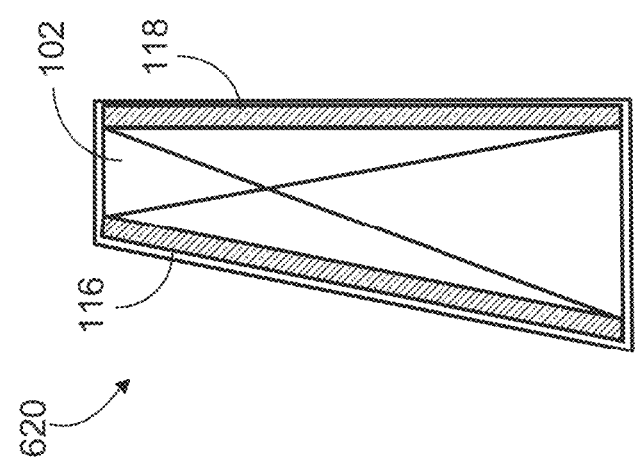
Figure 6D:
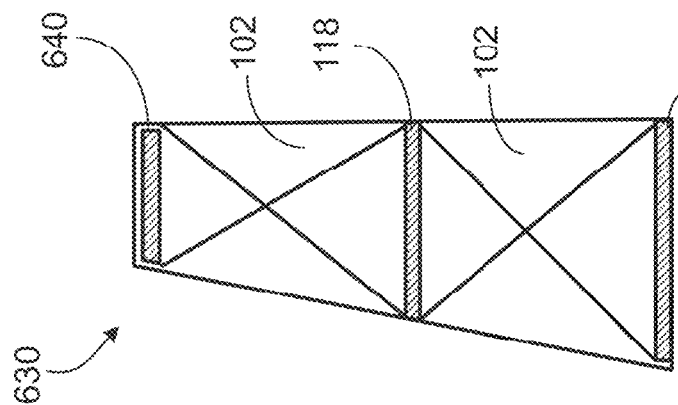

In general, various electrode geometries can be used in order to achieve desired heating in target areas of bulk medium 102. For example, referring to FIG. 6B, system 610 shows two electrode arrangements 116 and 118 used to apply a current through target area 102 of the bulk medium (with input/output wires 106 and 108). Electrode arrangement 116 and 118 can be arrays of one or more electrodes as shown in FIG. 6A. FIG. 6C-D are schematic diagrams of other electrode configurations, 620 and 630 respectively, to heat target area(s) 120, for example on an aircraft wing. Electrode arrangements indicated by 116, 118, and 640 can be single electrodes, or an array of one or more electrodes, as shown in FIG. 6A. Further details about the electrode shape and design is below.

In some implementations, the bulk medium is the skin of an airplane and target areas for heating include, but are not limited to, the following: wings, fuselage, vertical stabilizers, horizontal stabilizers, windows, winglets, windshield, control surfaces (flaps, ailerons, rudder, elevator, air brakes, etc.), nose/nose cone, landing gears, landing gear brakes, landing gear doors, engines and engine nacelles, AC inlets and outlets, fuel tank vents, pitot heads, static ports, and other antennae, sensors, and external lights, fuel tank vents, service panels. In other words, the proposed technology may involve placing electrodes on the inside of the airframe, in some cases, in one or more of the configurations shown in FIG. 6A-D. In some implementations, heating system 100 will produce Joule heating in portions of the target area, and subsequently conduction within the material may result in more "spread out" heating.

In general, power control system 104 includes a signal generating system that is designed to generate a high frequency (e.g., above 1 kHz) alternating electric signal (AC) and send it through the aforementioned target area 102 of the bulk medium. In some implementations, where the impedance of the target area is low (in some cases well below 1Ω), the signal generating system is configured to generate and sustain a desired current level, in order to generate Joule heating at the target area. In some cases, because the impedances of other parts of the system (e.g., the electric conductors or wires transmitting the signal) are above zero, a high current going through those parts would generate undesired Joule heating outside of the target area. For that reason, in some implementations, the signal generating system is designed such as a high current is only delivered close to the target area.

In some implementations, some or all of the signal generating system's elements/units, as well as the conducting units/cables connecting them, are designed such as to reduce as much as possible the undesired power losses typically occurring when transmitting high current and high frequency electromagnetic signals.

In some implementations, the signal generating system can receive power from existing power sources (e.g., existing electrical buses on an aircraft). In some implementations, the system uses a customized battery or a customized power source that is part of the system. For example, such customized power sources can include, but are not limited to: fuel-based electric generators, solar power-based electric generators, wind power-based electric generators, gas power based electric generators, etc. In some implementations, the signal generating system may be placed in a circuit between a power source (e.g., existing electrical bus, customized battery, customized power source) and the target area.

Additionally, in some implementations, the signal generating system can include control circuits and devices that exist as independent units and/or are embedded within a combination of other units that are part of the signal generating system.

In some implementations, heating system 100 is used to heat a number of distinct target areas. In such a case, each element or unit of the heating system (e.g., the signal transforming unit, the impedance adjusting network, etc.) can be either centralized for the entire system, or distributed as a distinct unit or more per target area or group of target areas. Centralization or distribution configurations can be used in order to improve system functionality, energy efficiency, cost, regulatory compliance, weight, size, and complexity, among other criteria. For example, in some implementations, the signal transforming unit is centralized, while the impedance adjusting network is distributed into one unit or more per target area. In some implementations, the signal transforming unit is only partially centralized with a centralized TSP ("Transformation to Standardized Power") sub-unit but with an ACG ("AC Generation") sub-unit distributed into one sub-unit or more per target area or group of target areas. In some implementations, the signal transforming unit is entirely distributed with each of its sub-units distributed into one sub-unit or more per target area, or group of target areas.

In some implementations, power control system 104 sends power to target area 102 in a continuous fashion until the heating/de-icing/anti-icing operation is complete. In some implementations, the system can turn the power on and off (e.g., using a control unit) in an improved/efficient manner, in order to achieve a desired heat generation and heat distribution in the conductive material 102. For example, while the system is on, heat is generated at specific locations of the target area, and is conducted across the target area, "spreading" to the rest of the target area. While the system is off, the generated heat continues to conduct within the target area.

In some implementations, the system could include different power levels for the on state, and cycle through the off state and different power levels in an improved fashion. In some implementations, specific power levels could be reached through a smoothed increase/decrease of power as opposed to a one-step power increments or decrements. Such pulsed power system patterns could either be entirely pre-scripted when the system is built, or could be varying and dynamically improved based on feedback loops forming part of the system's control unit, as detailed further below.

In some implementations, where the heating system includes several target areas, the pulsed power pattern described above can be used asynchronously across all target areas, such that all target areas will heat up in the desired amount of time, while maintaining both total average and total instantaneous power levels below a set threshold value. For example, for an aircraft de-icing system where both wings, the fuselage, and the horizontal and vertical stabilizers would be heated up, such a phased power pattern could be designed such that the system is turned on for only one target area at a time. In some implementations, a phased power pattern can be: powering on the system for the left wing, then the fuselage, then the right wing, then the vertical stabilizer, and then the horizontal stabilizer.

In some implementations, improved timing can be used at each stage in order to achieve the desired heat, average power, instantaneous power level, as well as an acceptable heat distribution. In some implementations, similar to the above pattern, any subset of the target areas can be heated at a given time.

In some implementations, one or more of the units or elements mentioned as part of the heating system design will have an enclosure. Such enclosure might be designed for a single unit or for any combination of units. In some implementations, the enclosures are designed in compliance with environmental qualification standards. For example, the enclosures can be designed in compliance criteria such as non-flammability, protection from precipitations, attachment and build providing protection from external shocks and vibrations, electrical insulation, protection from external electromagnetic interferences ("EMI") and shielding of the enclosed-circuits' EMI emissions, and thermal relief.

In some implementations, some of the enclosures can be designed such as to use the structure of the heated object (e.g., bulk conductive material) as a heatsink. For example, one or more of the heating system's units can be housed in metallic or conductive structures that are mounted to have high thermal conductivity to the bulk medium on which it is located. One possible benefit of this mounting is both in heating the bulk medium while also providing necessary cooling for the electronics. Another possible advantage of this design is reducing the weight of the heating system (or device) by obviating the need to provide a separate heatsink to dissipate losses. In some implementations, the target areas can be used as a part of the heat system units' heatsinks. This use may increase efficiency of the heating system because the heating system's circuits inevitably generate heat losses that may be conducted to the target areas to heat them.

In some implementations, multiple adhesives or mounting types can be employed to mount an enclosure onto the bulk medium. For example, an adhesive primarily used for retaining mechanical rigidity can be used to hold the casing in place while a different adhesive (or interface) can be used to provide a lower thermal impedance path for the heatsinking function of the enclosure.

In some implementations, one or more of the heating system's units can be configured to detect one or more measurements including, but not limited to, voltage, current, temperature, power forward, and reflected power, measured on the unit's circuits, surrounding cables, other units, or the target areas. In some implementations, such measurements can then be used to monitor operational status of the unit(s) and control their operations (using a feedback mechanism), including on/off switching, output levels and in-circuit control of switching and tunable parts for improvement (more details on the control of switching and tunable parts within a dynamic adjusting network are found below). Controlled parameters can include power to load and/or current to load, voltage control in the adjusting network, and other relevant signals.

In some implementations, the measurements used as part of feedback loops described above can also include specific ice sensors that can be installed on or close to the target areas. Such sensors could be used, for example, to inform the heating system and/or the user on de-icing completion status, and used as an input to adjust power levels at the de-icing and anti-icing operation stages. In some implementations, ice sensors can also be used to determine failures within the system and/or servicing requirements.

In some implementations, the heating system can include a protocol converter control unit (or "control unit" or "control subunit"), taking input from the user (which may be the pilot or co-pilot in the case of an aircraft de-icing system) and/or the system's sensors, and outputting control signals to all other units. In some implementations, inputs from the user can include, but are not limited to, on/off state, de-icing/anti-icing/off state, target temperatures for target areas, and target power output for target areas. In some implementations, inputs from sensors can include, but are not limited to, voltage, current, temperature, power forward and reflected power, impedance, and data from ice sensors, the squat switch, various aircraft logics units, information from avionics, as well as other data. In some implementations, the protocol converter unit is centralized for the entire system. In some implementations, it is distributed with one protocol converter control unit per target area or group of target areas.

In some implementations, user input could be transmitted to the control unit either using wires (e.g., using data transfer standards such as ARINC 429) or wirelessly (for example using low-energy Bluetooth or Wi-Fi connections). In some implementations, the user's input device could either be integrated to the system being heated (for example integrated into the flight deck's on-screen controls for an aircraft de-icing system), or could be a separate device, such as a touchscreen tablet (for example a separate tablet installed in the flight deck, or a special application installed on the pilot's touchscreen tablet in the case of an aircraft de-icing system).

In some implementations, power control system 104 includes a signal transforming unit ("STU") or circuitry that alters the signal from the existing electrical buses or the customized battery or any other power source of the heating system into the desired high frequency AC waveform for generating current in the bulk medium. For example, in aircraft applications, the signal transforming unit can take DC power available from the airplane's electrical bus and convert into the desired high frequency AC signal. In another aircraft example, the signal transforming unit can take power available from the airplane's electrical bus in the form of an AC signal and convert into the desired high frequency AC signal. In some implementations, the signal transforming unit can take DC power available from a customized battery or from any customized power source (e.g., forming part of the heating system) and convert into the desired high frequency AC signal. In some implementations, customized batteries or power sources can be embedded within the same enclosure and/or circuit board as the signal transforming unit.

Figure 7:
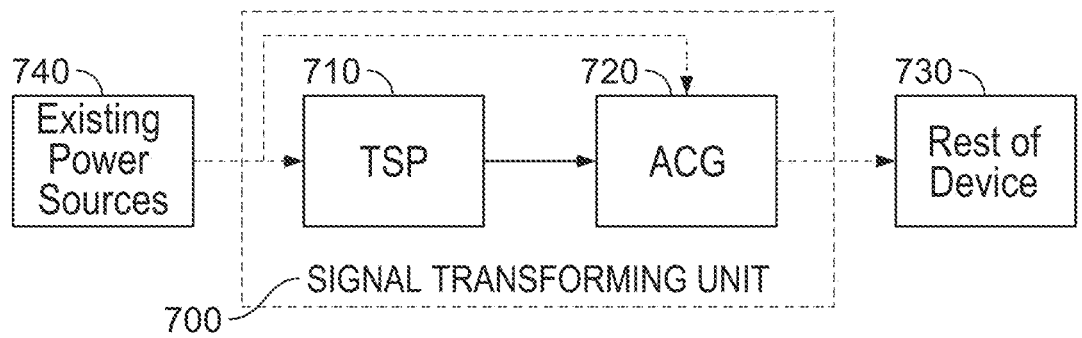
FIG. 7 is a schematic diagram of an exemplary signal transforming unit ("STU"), including Transformation to Standardized Power ("TSP") and AC Generation ("ACG") main sub-units.

FIG. 7 is a schematic diagram of an exemplary signal transforming unit ("STU") 700 for power control system 104, including transformation to standardized power ("TSP") 710 and AC generation ("ACG") 720 main subunits, which precede other circuitry 730 in the rest of device 100. Power control system 104 can draw power from existing power sources, as shown in FIG. 7.

Figure 8:
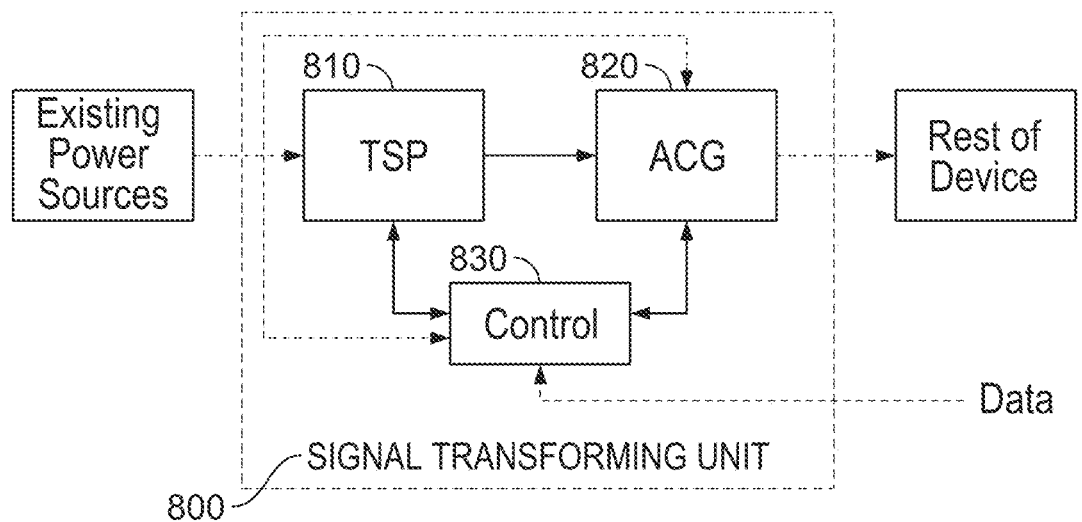
FIG. 8 is a schematic diagram of an exemplary a STU, including TSP, ACG, and control main sub-units.

FIG. 8 is a schematic diagram of an exemplary signal transforming unit ("STU") 800 for power control system 104, including a TSP 810, an ACG 820, and a control sub-unit 830.

In some implementations, the TSP draws power from existing power sources or the heating system's battery, and transforms it into a standardized input, such as a 250 VDC for improved operation of the ACG, as well as for improved power transfer efficiency of the signal transforming unit.

Figure 9A:
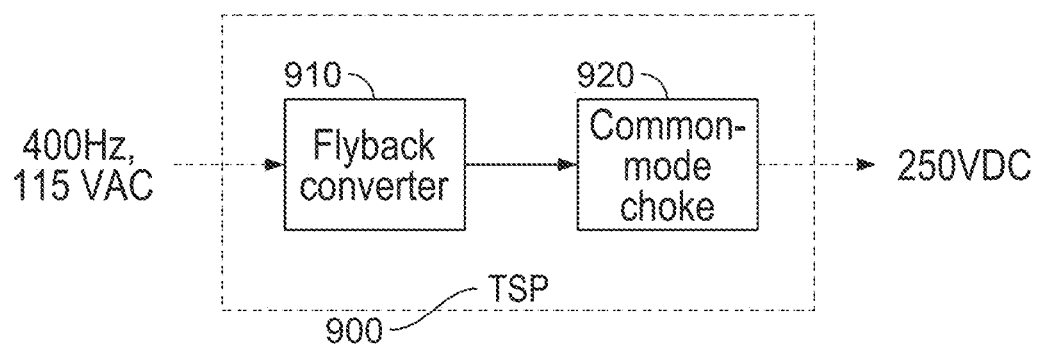
FIG. 9A is a schematic diagram of an exemplary TSP sub-unit, including a flyback converter and a common-mode choke.
Figure 9B:
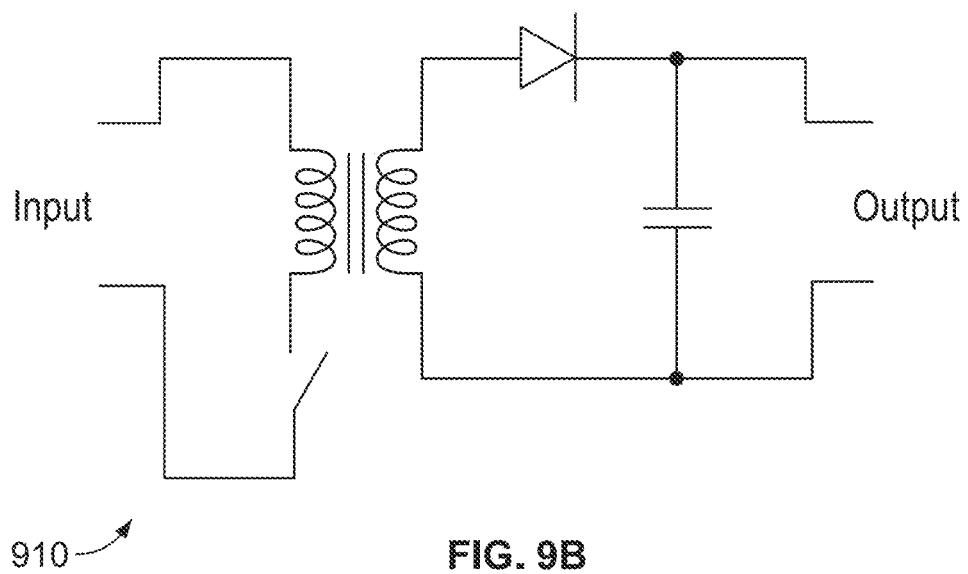
FIG. 9B is schematic diagram of an exemplary flyback converter.

In some implementations, where existing electrical buses provide power in the form of a 400 Hz, 115 VAC signal to the TSP, the TSP can include a flyback converter with a filter at its output, such as a common-mode choke, preventing electromagnetic interferences from reaching or damaging the ACG. FIG. 9A is a schematic diagram of an exemplary TSP sub-unit 900, including a flyback converter 910 and a common-mode choke 920. FIG. 9B is schematic diagram of an exemplary flyback converter 910.

In some implementations, the TSP is a bridge rectifier converting the AC power coming from existing power sources into any desired DC voltage. In some implementations, the TSP draws DC power from the battery or existing power sources (for example the typical 28 VDC in an aircraft) and transforms it into a different DC voltage or an AC voltage. For example, the DC-DC conversion may be useful to power control units and elements of the heating system, in which case possible voltage levels can include f3.3V, f5V and/or f12V. Finally, in some implementations, a power-factor correction ("PFC") stage can be included in the design of the TSP depending on the power supply source. In some implementations, the PFC may serve to correct for non-linear loading of the power supply which may be needed. Both active and passive PFC stages are possible.

In some implementations, the ACG uses input power from the TSP and transforms it into the desired high frequency AC signal. In some implementations, the ACG is designed for improved power transfer efficiency of the signal transforming unit. In some implementations, the ACG includes a power amplifier or an AC or RF generator or oscillator.

In some implementations, the primary power amplification stage of a power amplifier is either "linear" or "switching." Relevant trade-offs between these two architectures can include efficiency, power-handling, and linearity. Example linear amplifiers can include Class-A, Class-B, and Class-C. Example switching amplifiers can include Class-D, Class-E, and Class-F. In some implementations, linear amplifiers have high linearity and low efficiency as compared to switching amplifiers. Low efficiency may mean more difficult thermal management, higher-rated component requirements, etc. Low linearity may mean increased harmonic content potentially causing regulatory compliance issues, lower efficiency, more difficult physical and electrical layout design, etc.

In some implementations, the ACG includes a full-bridge class-D amplifier. For example, the amplifier design utilizes dual MOSFET transistors fed with a gate driver and a temperature compensated crystal oscillator ("TCXO") generating a desired frequency. FIG. 10A is a schematic diagram of an exemplary ACG sub-unit 1000, including a class-D amplifier 1010 with dual MOSFETs transistors, a temperature-controlled quartz oscillator ("TCXO") 1020, and a Gate driver 1030. FIG. 10B is a theoretical schematic diagram of an exemplary Class-D Amplifier using dual MOSFETs. In some implementations, the full-bridge architecture can provide differential (balanced) drive capability as well as four-times the power output for a given bus voltage level under a given load compared to a half-bridge architecture. Differential drive may also be relevant for emissions compliance under balanced loading conditions presented by the expected wing structure. Additionally, in some implementations, Class-D architectures can have a higher switch utilization factor than other switching architectures.

In some implementations, within the Class-D architecture under single-frequency drive, many input parameters can be varied to achieve improved output parameters. An example input parameter includes dead-time. Example output parameters include efficiency, peak component stresses, etc.

In some implementations, class-D architectures can have a high switch utilization factor and complete silicon-based component implementations, making them suitable for potential ASIC development. In such developments, a SoC (system-on-a-chip) implementation is possible where all control components and power electronics reside on either the same die or a MCP (multi-chip package). In some implementations, a class-D architecture has distributed modules housing SoCs and supporting circuitry attached to various, distributed locations on a given feature of an aircraft.

In other implementations, other switch-mode designs are utilized, such as single-switch architectures, e.g., Class-E or Class-F. In some implementations, such architectures may have higher switching frequency implementations where a high-side gate driver may be either difficult or impractical. In some implementations, single-switch architectures can be used instead of Class-D implementations as frequency increases due to potential limitations of Class-D implementations at those frequencies.

In some implementations, harmonic reduction and harmonic elimination techniques can be employed with switch-mode amplifiers to mitigate any negative effects from non-linear distortion inherent in some switching architectures. For example, changing the base waveform duty-cycle, blanking pulses, and other techniques can be used to remove harmonics during signal generation.

In some implementations, the ACG includes transistors including Silicon MOSFETs. In some implementations, the transistors are Gallium Nitride (GaN) MOSFETs. In certain implementations, GaN transistors have advantageous properties such as: on-resistance, turn-on gate charge, and reverse-recovery charge. In some implementations, GaN is suitable for higher frequencies.

In some implementations, the TSP additionally includes a low power conversion ("LPC") stage, such as a linear regulator, to draw power from the existing power sources and convert it into a suitable power input signal for the elements driving the ACG, such as gate drivers or crystal oscillators. FIG. 10C is a schematic diagram of an exemplary ACG sub-unit 1050, including a class-D amplifier 1010 with dual MOSFETs transistors, a temperature-controlled quartz oscillator ("TCXO") 1020, a Gate driver 1030, and an LPC 1050.

In some implementations, the AC Generation Sub-unit is located close to the target area. A possible advantage of this design is in limiting the losses and emissions that happen when carrying alternating currents from the AC Generation sub-unit through the adjusting network to the target area. In some implementations, the TSP sub-unit can be located close to the AC Generation unit or close to the existing power source or customized battery. When the TSP is closer to the ACG, it can be integrated with the ACG, potentially reducing the number of modules in the system and its complexity. When the TSP is closer to the existing power source or customized battery, it may be designed for improved power transfer (including for increased efficiency and reduced EMI) from the power source or battery to the ACG. For example, when the existing power source provides power in the form of a 400 Hz, 115 VAC voltage, the TSP can include an AC-DC converter, converting the power source voltage into 250 VDC, thus reducing EMI that would be caused by the AC current, and increasing efficiency by increasing the voltage and reducing the current carried from the TSP to the ACG.

In some implementations, the control sub-unit controls the signal transforming unit's status, including on/off mode, power output, frequency, and other parameters, based on relevant data inputs available in the application for which the device (heating system) is developed, and by outputting control signals to other signal transforming sub-units, including the TSP as well as the ACG's drivers. In the example of a de-icing and anti-icing heating system for aircraft, in some implementations, data inputs can include manual pilot input from a flight deck switch, temperature from temperature sensors inside and outside of the airframe, weight-on-wheels status from a squat switch, various aircraft logics units, information from avionics, feedback information from the device (heating system) itself, as well as other data.

In some implementations, a control sub-unit includes a microcontroller supervisor fed with low power conversion (LPC) stage, such as a linear regulator, drawing power from the existing power sources and converting it into a suitable power input signal, and outputting control signals to the TSP and the ACG. FIG. 11 is a schematic diagram of an exemplary control sub-unit 1100, including a microcontroller 1110 and a Low Power Conversion stage (LPC) 1120.

In some implementations, for example, in the case of a de-icing heating system retrofitted to an aircraft, the signal transforming unit can be installed close to the available electrical buses, in a centralized location. This may reduce installation complexity, labor time, and costs for the unit. In some implementations, the signal transforming unit is de-centralized and installed closer to the target areas. This may reduce the length over which the AC signal has to travel between a signal transforming unit and the target areas, potentially decreasing costs associated with electromagnetic interferences ("EMI") shielding of the signal and with the cable requirements to carry such AC signal.

In some implementations, the heating system has an impedance adjusting network ("IAN") configured to adjust the output impedance of the heating system to desired levels. For example, an IAN can be configured to adjust the output impedance of the heating system to correspond to the input impedance of the bulk medium to be heated. For example, an IAN can be configured to adjust the impedances between the output of the heating system and the input of the bulk medium to be within a desired range of one another. In some implementations, the impedance adjusting network is configured to adjust the output impedance of the heating system to sufficiently match the impedance of the bulk medium. In other words, the matching network is configured to match the output impedance of the STU ("source") to the impedance of the target areas ("load") within reasonable engineering tolerances. In some implementations, matching the source and load impedances includes adjusting the source impedance of the heating system to be a complex conjugate of the impedance of the bulk medium. In some implementations, the impedance adjusting network is adjusted such that an output impedance of the heating system is within 10 to 30% of the impedance of the bulk medium to be heated.

FIG. 12 is a conceptual diagram of an adjusting network 1200 between a source 1210 and a load 1220. FIG. 12 shows the adjusting network taking input power from the STU ("source") through an input port impedance-adjusted to the STU's output, and outputs power to target areas ("load") through an output port that is impedance-adjusted to correspond to the target areas.

In general, with an AC signal, when the output impedance of a source does not correspond to the impedance of load, part of the signal sent from the source to the load reflects back to the source instead of travelling through the load. In some implementations, an impedance adjusting network may achieve several benefits by inhibiting signal reflection and voltage standing wave build-up, including:

Reducing voltage across the heating and arcing risks
Improving efficiency of the heating system
Reducing the total output power required from the STU, hence reducing the STU's size, weight and cost
Reducing stress on system components
Improving reliability
Reducing temperature gradients in cabling and bulk medium In some implementations, the output impedance of the STU is higher than the impedance of the target areas. In that case, the adjusting network converts relatively high voltage and low current power from the STU into relatively low voltage and high current power delivered to target areas. In implementations, this means high current is only delivered after the adjusting network and thus closer to the target, reducing Joule losses in the rest of the SGU and improving the heating system's overall efficiency.

In various implementations, the adjusting network can either be centralized or distributed throughout the target areas. Distributing the adjusting network may allow cabling to serve as a filter while potentially lowering peak voltage, peak current, and/or temperature effects on any given component. Distribution may also add modularity to the system design, which may improve part serviceability/replacement. In addition, distribution potentially allows the system to avoid sensitive equipment and/or hazardous areas, e.g., fuel tanks.

A distributed impedance adjusting network such as an impedance matching network arranged at the input of the coupling strip 1900 can facilitate distributed monitoring for each coupling strip locally, even in implementations where the power control system 104 supplies power to multiple coupling strips. It can also provide means for various localized abilities, including the abilities to switch a coupling strip 1900 on or off, and to communicate information to the power control system 104. The communication can be facilitated through either separate communication cables, or power cable encoding (e.g., through power cables connected to the coupling strips 1900) to save on weight and cable clutter.

For example, a distributed impedance adjusting network can trigger a special impedance state which is detectable by the power control system 104 based on using intentional impedance variation to encode signals to be sent back over the power line, e.g., through either digital communication style encoding or analog or threshold level encoding techniques. As another example, the distributed impedance adjusting network can add an additional data signal (in addition to the heating power signal) on the power cable. Alternatively or in addition, one or more of the units or elements mentioned as part of the heating system may relay information through wireless means.

In some implementations, the adjusting network additionally supports fault indication. In these implementations, the heating system can include local fault sensors that, as will be described in more detail below at the "Control and Sensing" section, may be triggered or tripped by faults or failures that may be present in the heating system. For example, the local fault sensors can be arranged at the coupling strips 1900. The adjusting network can include a controller which maintains a lookup table specifying different types of faults of specific parts and sections of the heating system, as well as different impedance values corresponding to the types of faults. The adjusting network is then configurable to adjust its input impedance as observed by the power control system to specific values so as to indicate particular types of faults or failures that may be present.

Additionally, in some implementations, the adjusting network can be balanced by including additional capacitive components and grounding middle points of symmetry in the network. When driven by a fully differential source, balancing the network may allow for high common-mode rejection and greater noise immunity. In some implementations, no such balance is achieved and the adjusting network's return path end at the circuit's ground.

Generally, in some implementations, adjusting networks can include passive electronic components arranged in specific building block configurations. For example, those building block configurations can include transformers, L-networks, n-networks, T-networks, and other configurations. FIGS. 13A-D are schematic diagrams of exemplary impedance adjusting network building blocks.

In some implementations, the heating system's adjusting network includes a passive adjusting sub-unit. FIG. 14 is a schematic diagram of an exemplary adjusting network unit 1400, including a passive adjusting sub-unit 1410. In some implementations, the passive adjusting sub-unit can include one or more of the building block configurations mentioned above, as well as other configurations, assembled together. In some implementations, the passive adjusting sub-unit's passive electronic components are chosen with high quality factors, such as to improve the network's efficiency.

In some implementations, the heating system's adjusting network can be designed to have a high-quality factor (high-Q) or low-quality factor (low-Q). High-Q adjusting networks can be used to filter out harmonic signal content. Filtering may be advantageous in a switching amplifier design as harmonic content may be higher than for a linear amplifier. High-Q networks, however, may be more sensitive to part tolerances, operational variations in external conditions, assembly variations, and any other variation in the system. Thus, high-Q systems may present practical problems while implementing systems. For example, in the case of an aircraft wing de-icing system, if the system is High-Q, the impedance adjusting network could become very out of tune due to small perturbations (e.g., a flap movement) causing failure risk. Lowering harmonic content outside the fundamental drive frequency may be advantageous for regulatory certification as well as practical design concerns, including containing stray signals within a design, over-stressing components (either in peak or time-average ratings), control algorithm instabilities, etc. In some cases, it is possible to ease or even eliminate these sensitivity concerns through the use of dynamic tuning elements.

In some implementations, the heating system's adjusting network design can be based on transmission line adjusting concepts. For example, the cabling at the input and/or output of the adjusting network can be viewed as part of the adjusting network. In some implementations, by choosing the right cable materials, form factor, dimensions and length, an appropriate impedance adjustment can be achieved.

In some implementations, the heating system's adjusting network is a dynamic adjusting network including an active adjusting sub-unit and a control sub-unit. FIG. 15A is a schematic diagram of an exemplary adjusting network unit 1500, including an active adjusting sub-unit 1510 and a control sub-unit 1520. In some implementations, the active adjusting sub-unit includes one or more adjusting network configurations controlled by the control sub-unit. In some implementations, the active adjusting network sub-unit's passive electronic components are chosen with high quality factors, such as to improve the network's efficiency. In some implementations, the control sub-unit, receives input data from the signal sent to and coming from the target areas (such as forward power, reflected power or voltage standing wave ratio), and dynamically controls the active adjusting network sub-unit to adjust the impedance tuning in real time. For example, such control can be achieved through tuning elements included in the design of the active adjusting network sub-unit. For instance, dynamic tuning elements can include tunable capacitors and/or tunable inductors. In addition, tunable element examples include: PIN Diodes, BST capacitors, DTC (discrete tuning capacitors), varactor diodes, MEMS, Ferroelectric varactors, Ferromagnetic components, YIG-tuned filters, etc. Exemplary metrics that can be considered while evaluating such devices include: operating frequency range, tuning DC voltage, tuning control signal linearity, control complexity, capacitance/inductance tuning ratio, tuning speed, quality factor (Q), switching lifetime, packaging cost, power handling, power consumption, breakdown voltage, linearity, third order intercept (IP3), integration capability, etc.

In some implementations, the use of a control unit with feedback between the target areas and the adjusting network can allow the network to adapt to any external changes that might impact the target area impedance or the STU output impedance, including changes in temperature, geometric configuration of the target areas, location of the heating system, the environment surrounding the system and target areas, and other parameters. In some implementations, the adjusting network additionally includes a Low Power Conversion ("LPC") stage, such as a linear regulator, drawing power from the existing power sources and converting it into a suitable power input signal for the control sub-unit. FIG. 15B is a schematic diagram of an exemplary adjusting network unit 1550, including an active adjusting sub-unit 1510, a low power conversion stage ("LPC") 1560, and a control sub-unit 1520.

In some implementations, specialized impedance measurements can be performed on the target areas for all configurations and environmental conditions covering the spectrum of possible situations during use of the heating system. Those measurements may allow for the design of a dynamic adjusting network unit adapted to the narrowest impedance range that allows for an adequate impedance adjustment in the entire spectrum of situations mentioned above. In some implementations, such design is accomplished by use of algorithmic optimizations or computer simulations to increase the system's efficiency while decreasing the adjusting network's weight, complexity and cost.

In some implementations, specialized cables can be used in the heating system, specifically designed or chosen at each stage for improving efficiency and shielding the power signal being carried to the target areas. FIG. 16 is a schematic diagram of cable stages in an exemplary heating system. In various implementations, stages of cables in the heating system can be customized, including cables between the power sources 1620 and the STU 1610 (Cable Stage One 1630), cables in the STU between the TSP 1640 and the ACG 1650 sub-units (Cable Stage Two 1660), cables between the STU 1610 and the adjusting network 1670 (Cable Stage Three 1680), as well as cables between the adjusting network 1670 and the target areas 1690 (Cable Stage Four 1695).

In general, various design considerations may be relevant in designing specialized cables throughout the heating system. In some implementations, thermal considerations may be relevant. For example, in some implementations, the cable connecting the adjusting network to the target area (or running near the target area and returning to the adjusting network in some cases) is fastened to allow for increased thermal flow from the cable to the target area. This is advantageous if some of the heat generated as current runs through the cables (which would otherwise be lost) is recovered and transferring to the target area, where the intent is to generate heat, improving the efficiency of the system.

In some implementations, the cables can be routed near the target area by using fasteners. To improve thermal contact in such cases, thermal interface materials with improved thermal conductivity can be used to fill air gaps in between the cable-fastener-target area interface.

In some implementations, cables are directly attached to the target area. To improve thermal contact in such cases, an adhesive with higher thermal conductivity can be used to attach the cable to the contact area. Additionally, thermal interface materials with higher thermal conductivity can be used to fill some or all of the remaining air gaps existing between the cable and the target area.

In some implementations, cross-sections of different geometries as well as different cable form factors can be used, depending on the units, target areas or power sources that the cables connect. In some implementations, the cable only includes a main conductor, with or without a protective jacket (including for electrical insulation and/or environmental protection, e.g., corrosion, humidity, extreme temperatures, frictions). This configuration may be advantageous for parts of the system that would carry a DC signal, or that would deliver a signal to the target area.

In some implementations, the cable is a coaxial cable. The coaxial cable can include a shield which may reduce EMI emissions when carrying an AC signal, and may protect against EMI surrounding the system when carrying any signal.

In some implementations, the cable is a triaxial cable. This design may be beneficial for EMI protection and insulation when carrying any signal, and more particularly when carrying balanced signal, for example at the output of a balanced implementation of an adjusting network unit.

In some implementations, the cable is a twinaxial cable. This design may have benefits that are similar to the ones provided by a triaxial cable.

In some implementations, different cable cross-section geometries can be used, depending on the units, target areas or power sources that the cables connect.

In some implementations, the cross section of the cable's conductor(s) has a circular geometry. This design has the benefit of being relatively low-cost to manufacture (low non-recurring engineering costs) in the case of a coaxial/triaxial/twinaxial form factor.

In some implementations, the cross section of the cable is flat and/or rectangular. For example, this cross-section may be an advantageous cable geometry for the last stage of the system where the cable delivers current to the target area. At that stage, a rectangular shape may allow for lower impact of the proximity and skin effects on currents circulating within the cable, hence reducing losses and increasing the system's efficiency. Additionally, that geometry may reduce the total amount of conductive material needed in the cable, hence reducing the weight of the system, which is an important consideration in the case of an aircraft deicing system.

In some implementations, depending on the specific input and output currents and signals carried by the cable, as well as depending on its cross-section geometry and other factors, the size of the cross-section can be selected to limit operating temperatures to a specified range (e.g., for compliance and depending on the materials used to manufacture the cable), as well as to reduce its weight and size.

In some implementations, different cable shielding types (and cross-section geometries) will be used depending on the units, target areas or power sources that the cables connect.

In some implementations, the cable won't include any shielding. This is more likely to be the advantageous at stages where DC current is carried (hence with lower EMI suppression requirements), and where a return path doesn't need to be carried (for example at the later stage of the system in an implementation where the target area carries the return current, and a nearby cable feeds the target area with that current).

In some implementations, single shielding will be used. This is advantageous, for example, where one layer of shielding is sufficient in getting the cable to comply with EMI/EMC requirements as well as other environmental requirements.

In some implementations, double shielding will be used. This adds another layer of shielding which, for example, may reduce EMI emissions further, and reduce the cable's EMI susceptibility.

In some implementations, triple or more shielding will be used. This adds additional layers of shielding for reasons similar to the ones above.

In some implementations, for a given target area, cables delivering current to this area might follow different possible paths.

In some implementations, the cables simply follow roughly straight paths from one side of the target area to another. In some cases, these paths could be parallel. In some implementations, cables might run through the target area diagonally, crossing each other at various locations over the target area. This could for example help generate more uniform heat across the surface of the target area and generate relatively hotter spots at desired locations where the cables cross.

In some implementations, cables run a zigzag-type path, a serpentine path, or a path than can be modelled by 2D spline curves. This design may increase the system's effectivity by lengthening the path followed by currents running through the target area, hence increasing its effective resistance further. This, for example, may help achieve higher efficiency, lower current, and more stable impedance adjusting with the system.

In some implementations, cable path designs are based on a combination of the options listed above, as well as others.

In some implementations, depending on the cable's design, stage and purpose, different materials might be used in its making.

Depending on local voltage, current, temperature, power, bend radius and durability requirements, as well as other criteria, the cables' conductor materials may be chosen to improve efficiency, electrical conductivity, weight, cost, size, and thermal aspects.

In some implementations, the conductor material is made of copper, silver, aluminum, carbon fiber composite, titanium, or an alloy thereof. In some implementations, the conductor is made of any of the materials mentioned previously, and coated with other materials, for example a silver coating to improve the conductivity of the conductor's skin.

In some implementations, conductors might be made of solid materials, or stranded. For example, in some implementations, strands could each be insulated from each other by using an insulating coating such as enamel. For example, a Litz wire could be used to reduce the impact of skin and proximity effects within the cable.

In some implementations (e.g., for coaxial/triaxial/twinaxial cables), depending on local voltage, current, temperature, power, bend radius and durability requirements, as well as other criteria, the cables' dielectric materials may be chosen to increase efficiency (for example by reducing dielectric losses), weight, cost, flexibility, maximum voltage tolerance, maximum power tolerance, temperature rating (by tolerating higher temperatures and/or having a higher heat capacity and/or lower dielectric losses and/or better heat conduction out of the cable).

In some implementations, where transmission line adjusting is used in the adjusting network unit, relevant cables can use dielectric materials also chosen to reach desired impedance levels. Exemplary materials include polyethylene and Teflon-based materials, as well as other materials.

In some implementations, depending on local voltage, current, temperature, power, bend radius and durability requirements, as well as other criteria, the cables' jacket materials will be chosen to improve parameters such as weight, cost, flexibility, maximum voltage tolerance, temperature rating, and heat conduction to nearby heatsinks (for example to the target area when it is used as a heatsink).

In some implementations, in the case where transmission line adjusting is used as part of the adjusting network, the length of the cable used for impedance adjusting can be controlled, in addition to its dielectric, in order to reach a targeted impedance level. For example, the cable delivering current to the target area is used as part of a transmission line adjusting system, and extra length is added for impedance adjusting and locally coiled to occupy a smaller amount of space.

In some implementations, specific fastening techniques can be used to route the cables through the system's structure. Such techniques may be chosen to improve installation cost and time, system weight (by reducing length of wire needed and weight of fastening technique), as well as for improved desired electromagnetic effects and heat transfer for cables close to the target area.

In some implementations, the fastener is chosen to reduce the distance between the cable delivering power to the target area and the target area. This design may generate the proximity effect in a more intense manner. In some implementations, conventional cable fastener designs can be chosen for a low cable-target area distance.

In some implementations, the fasteners will also be used to increase heat conduction from the cables to the target area.

In some implementations, fastener materials are chosen for lower weight and cost of the system. This can be achieved by using composite materials, for example. In some implementations, where fasteners are also used to conduct heat to the target area, materials will also be chosen for increased thermal conductivity (metallic materials, for example, typically have a relatively high thermal conductivity).

In some implementations, adhesives used to attach fasteners to their bonding areas are chosen for increasing strength and ensuring long-term bonding to the target area. The strength of the adhesive is advantageous in the case where the bonding area is relatively small and where mechanical constraints created on the bonding area are relatively strong. Additionally, in some implementations where the fasteners are used to conduct heat from the cable to a target area, the adhesive is also chosen for increased thermal conductivity.

Finally, in some implementations where the fasteners are used to conduct heat from the cable to a target area, air gaps in area between the cable, the fasteners, and the target area are filled using a thermal interface material that is sufficiently thermally conductive to ensure improved flow of heat from the cable to the target area.

In some implementations, cables are directly attached to surrounding structures such as the bulk medium using an adhesive, allowing for better heat transfer from the cable to the structure to which it is attached. Adhesives are selected based on criteria similar to the criteria used for fasteners.

In some implementations, cable assembly designs include splitting of a given cable path into a set of two or more separate branches. This is for example useful in implementations where one adjusting network sends current to a set of several target areas. In such implementations, one cable could be the sole output of the adjusting network, and as it routes to the target areas, the cable can split into separate branches that each deliver currents to the target areas. In some implementations, such splitting can be achieved by splitting a given conductor strand into several smaller ones, by sending a subset of strands to each of the separate branches when the split cable has a stranded conductor, or by the use of a power divider. The power divider can be useful for controlling the amount of current, voltage and power going to each of the branches that the cable is split into.

Similarly, in some implementations, two or more cables can merge into a fewer number of cables that accumulate the signals coming from all the merged cables. Such merging can be achieved by merging given conductor strands into other ones, by re-grouping different subsets of strands into new stranded cables, or by the use of a power combiner (e.g., same device as a power divider, but used backwards). The power combiner can be useful for controlling the amount of current, voltage and power going to each of the branches that the cables are merged into.

In some implementations, each cable stage in the heating system has unique cable design considerations.

In some implementations, Cable Stage One is chosen to allow for the efficient power transfer from the power sources to the TSP sub-unit. In some implementations, where the power sources output DC electrical current, Cable Stage One includes stranded copper insulated with an adapted material, and of a total equivalent gauge suited for the power, voltage and current carried to the TSP sub-unit. In some implementations, where the power sources output a 400 Hz, 115 VAC signal, Cable Stage One includes stranded and twisted copper, insulated with an adapted material, and of a total equivalent gauge suited for the power, voltage and current carried to the TSP sub-unit.

In some implementations, Cable Stage Two is chosen to allow for the efficient power transfer from the TSP to the ACG sub-units. In some implementations, where the TSP outputs power in the form of a 250 VDC signal, Cable Stage Two includes stranded copper insulated with an adapted material, and of a total equivalent gauge suited for the power, voltage and current carried to the TSP sub-unit.

In some implementations, Cable Stage Three is chosen and customized to allow for the efficient transfer of the high frequency AC power signal from the STU's output to the adjusting network. For example, this cable may be designed to reduce resistive and electromagnetic losses caused by the signal's high frequency, as well as to be shielded from external interferences that could alter the signal's integrity and to prevent signal leakage from the cable that could impact surrounding equipment and materials. In some implementations, Cable Stage Three is a high power, high frequency transmission line in the form of a customized coaxial cable. In some implementations, the coaxial cable includes a core conductor carrying the adjusting network's input signal and is made of stranded copper with an outside diameter large enough to carry the power with reduced resistive losses, a dielectric material surrounding the core chosen to increase electrical insulation and to sustain high voltage and temperature ranges, a shield conductor providing the signal's return path to the ACG made of stranded and braided copper with an equivalent gauge large enough to carry the power with reduced resistive losses, a first casing insulating the conducting shield chosen to sustain high voltage and temperature ranges, an outer shield similar to the conducting shield but not directly carrying currents and used to shield the cable from external interferences and to prevent leakage, and finally a second casing similar to the first casing and insulating the outer shield.

In some implementations, Cable Stage Four is chosen and customized to allow for the efficient transfer of the high frequency and high current AC power signal from the adjusting network to the target areas. In some implementations, this cable is designed to adjust impedance between the adjusting network and the target areas, to reduce resistive and electromagnetic losses caused by the signal's high frequency, as well as to be shielded from external interferences that could alter the signal's integrity and to prevent signal leakage from the cable that could impact surrounding equipment and materials. In some implementations, Cable Stage Four is a high power, high frequency and high current transmission line in the form of a customized coaxial cable, similar the implementation described above for Cable Stage Three, except with larger conductor gauges and diameters and with additional silver coatings of same conductors in order to improve high current performance and further reduce resistive losses. In some implementations, Cable Stage Four is additionally customized based on Litz wire design. Such a design's purpose is to reduce the losses due to the proximity and skin effects in the cables, by manufacturing the conductors out of thinner-than-skin-depth, individually insulated (for example using an enamel coating), and perfectly symmetrically twisted or woven brands.

In general, electrodes include the material through which the current will enter and leave the bulk medium target area. In some implementations, a connector will be used to connect the electrodes to the bulk medium. Connector refers to an attachment fixture that connects the electrodes to the bulk medium. In some implementations, the electrodes and connectors are designed to reduce the contact resistance between the electrodes and the bulk medium. Put another way, the electrodes are designed to smoothen the potential difference that occurs across the target area, for a given return path. If this contact resistance is higher than the resistance of the target area in between the two electrodes, more heating will occur at the contact points than along the target area, all else equal, reducing the heating efficiency of the heating system. In some implementations, for similar reasons, the electrodes and connectors are designed to reduce the contact resistance between the electrodes and the wires (or cables) of the heating system. In some implementations, the electrodes and connectors will also be designed to reduce electromagnetic losses (e.g., electromagnetic radiation).

In some implementations, electrode design considerations to achieve one or more of the above goals include (1) selecting an electrode material that has high conductivity, and (2) increasing the "real" contact area between the electrodes and the bulk medium, and between the electrodes and the wires. "Real" contact area refers to the minute inter-metallic, or inter-material, contacts through which the current flows from one material to the other, often referred to as "a-spots". In some implementations, the connectors will also be designed to achieve these goals.

In some implementations, the material of the electrodes can include silver, copper, aluminum, carbon fiber composite, titanium, or an alloy thereof.

In some implementations, the electrodes are a part of the cables used to convey current to the bulk medium.

In some implementations, the geometry of the electrodes is designed to be suitable to a specific target area, and/or to reduce the contact resistance between the electrodes and the bulk medium and/or to reduce electromagnetic losses.

In some implementations, the electrodes are circular.

In some implementations, the electrodes are the shape of the end of the cables used to convey current to the bulk medium.

In some implementations, line electrodes (e.g., rectangular electrodes in which the length is larger than the width) are used.

In some implementations, electrodes in the shape of 2D spline curves with a small thickness (in the third spatial dimension) are used.

In some implementations, the cable conductor can be connected to the target area by being sandwiched between a connector plate and the target area. For example, a portion of the side of the connector plate in contact with the target area can be milled out. The conductor of the cable that this connection bonds to the target area can be placed in this milled portion. This configuration can allow for the clamping or adhering of the electrode connector plate with the cable conductor underneath and without having to bend the connection to ensure proper bonding with the target area.

In general, various implementations and design considerations for electrodes and connectors are contemplated.

FIG. 17 is a photograph of an exemplary circular stud electrode 1700 for a heating system 100. The electrode includes a circular ground stud coupled to a disk 1710 made of a conductive material (e.g., aluminum), on which a threaded conductive material 1720 (e.g., aluminum) is mounted.

In some implementations, the conductor of the cable which is connected to the target area though electrode 1700 is wrapped around threaded conductive material 1720, lying flat and covering a significant portion of the surface area of both the threaded conductive material and the disk. In some implementations, a nut and washer can be used on threaded material 1720 to press the conductor against the disk 1710, ensuring higher contact area and lower contact resistance.

In some implementations, the air gaps between the washer, cable, and disk 1710 are filled with an electrically and/or thermally conductive thermal interface material, ensuring improved heat and/or current conductivity from the cable to the stud 1700.

In some implementations, circular stud electrode 1700 is attached to the target area using a specifically chosen adhesive which is both sufficiently electrically and thermally conductive to conduct the heat and electric signal from the cable to the target area. In some implementations, the adhesive is also sufficiently strong to withstand the torque created by the nut and washer.

In some implementations, the connector is a U-shaped fixture attached to the bulk medium and electrodes in such a manner that significant compressive strength is applied between the electrode and bulk medium.

In some implementations, the materials of the electrode and connector can be chosen to reduce their weight. In some implementations, the material of the electrode is chosen to improve electrical and/or thermal conduction through the material, in addition to reducing its weight. Improved conduction may be advantageous for electrode designs where the current flowing from the cable to the target area goes through the electrode (e.g., circular stud, one plate design).

In some implementations, specific enclosures are included as part of the connector and electrode design. For example, such enclosures can be chosen for environmental qualification, including criteria such as thermal relief and/or insulation, electrical insulation, EMI shielding, corrosion protection, resistance to vibration and shock, durability, protection from external contamination and precipitations.

In general, various adhesion configurations (and combinations thereof) between the electrodes and/or connectors and the bulk medium are contemplated. In some implementations, the configurations reduce the contact resistance between the electrodes and the bulk medium and/or reduce electromagnetic losses.

In some implementations, the electrodes are connected to the bulk medium using a brazed joint. FIG. 18A is a schematic of an exemplary brazed joint attachment 1800 between an electrode 1802 and the bulk medium target area 102, which is part of the larger bulk medium 1806. A brazing material is used to create braze joint 1804. For example, a low temperature brazing filler metal (e.g., AL 802) could be used to braze the electrodes to the target area to create a low resistance contact. In some implementations, in order to mitigate oxidation (the formation of an aluminum oxide layer at the brazing site), the filler metals will be coated with flux. Flux is a material that at high temperatures dissolves oxides and prevents the surface from re-oxidizing until the filler metal wets the surface.

In some implementations, the electrodes and the target area are clad together under pressure and temperature. For example, in some implementations, a compressive force between the electrodes and the target area is applied. Without wishing to be bound by theory, the compressive force may reduce the contact resistance in between the electrodes and the bulk medium as per the equation below:

$$R = \rho \sqrt{\frac{\pi H}{4F}}$$

where ρ is the electrical resistivity of the contact materials, H is the Vickers' Hardness of the softer of the contact surfaces, and F is the compressive, or contact, force.

In some implementations, compressive force can be applied to connect the electrodes and the bulk medium using a mechanical fastener connector. FIG. 18B is a schematic of an exemplary attachment configuration 1820 between electrode 1802 and the target area 102, which is part of the larger bulk medium 1806. Solid rivets 1822 are used to apply compressive force to connect the electrode to the target area.

In some implementations, compressive force can be applied using vacuum tape, or a similar object which can air seal the connection in between the electrodes and the target area. FIG. 18C is a schematic of an exemplary attachment configuration 1840, between electrode 1802 and the target area 102, which is part of the larger bulk medium 1806. Air sealing tape 1842 is used to connect the electrode and the target area. After the air seal is completed, a suction device can be used to create a vacuum between the electrodes and the target area, thereby bringing the two together and generating a compressive force.

In some implementations, compressive force can be applied using clamps sandwiching the electrode and target area and increasing pressure at their interface, for example with C-clamps.

In some implementations, the compressive force can be applied using magnets or magnetized surfaces. In some implementations, either a face of the electrode or a face of the target area is magnetized, allowing for an attractive force between the magnets and electrode and/or contact area, which results in the desired compressive force. In some implementations, two or more magnets are used, and the electrode and target area are sandwiched between them, allowing for an attractive force between the magnets, which results in the desired compressive force. In some implementations, both a face of the electrode and a face of the target area are magnetized, allowing for an attractive force between the electrode and the target area, which results in the desired compressive force.

In some implementations, the compressive force is applied by an external or internal compression fixture connector that adheres to a surface on or near the target area, and converts the adhesive strength into a desired compression force. In some implementations, adhesives (e.g., curing adhesives) can be used in conjunction with the fixture connectors.

In some implementations, the electrodes could be embedded, partially or wholly, into the bulk medium, using one of the aforementioned methods or an alternative technique.

In some implementations, a conductive material (e.g., graphene) is placed in between the electrodes and the target area.

In some implementations, the connector material used to connect the electrode to the target area is an adhesive chosen for increased strength, ensuring long-term bonding to the target area. The strength of the adhesive may be advantageous in the case where the bonding area is relatively small and where mechanical constraints created on the bonding area are relatively strong (e.g., in the case of the U-shape stud electrode). In one implementation, when the electrode needs to remain in a fixed position to cure the adhesive after being applied, internal or external/disposable fixtures using adhesives and mechanical force can be used to keep the electrode in place.

In some implementations, the connector material used to connect the electrode to the target area is also chosen for higher thermal and/or electrical conductivity to ensure improved flow of current and heat from the cable to the target area. For example, higher conductivity may be a consideration where the electrode used is attached such that the adhesive is on the path of the electrical current running from the cable/electrode to the target area (e.g., with circular stud electrode and the single plate design electrode). To that end, in some implementations, nanomaterials (e.g., CNT) are placed between the electrodes and the bulk medium. In some implementations, the surface of the electrodes and the portion of the surface of the bulk medium which will be brought into contact with the electrodes (e.g., target area) can be manipulated in order to increase the "real" contact area between them.

In some implementations, and in combination with the aforementioned implementations as well as other implementations, the connector, the electrodes and part of the target area are encased with a material that reduces or eliminates electromagnetic losses.

In some implementations, any combination of the methods mentioned above is used with any electrode and connector implementation. For example, FIG. 18D is a schematic of an exemplary combinatorial attachment 1860 between the electrode 1802 and the bulk medium 1806 target area 102. The attachment includes a brazed joint 1804 and solid rivets 1822.

In some implementations, no connectors/cables may be needed for the system, since no physical contact is required for the desired current to be generated. In that case, in some implementations, the return path of the signal may be an additional portion of wire running back to the adjusting network.

Implementations of the heating system described herein can be used as a de-icing/anti-icing device for melting ice from the surface of an airplane by applying high frequency AC current to a target area of the airplane's skin/airframe (e.g., to produce Joule heating). Heat generated in the airframe target area is conducted to the surface of the airframe and convects across the airframe-ice interface into the ice. In some implementations, the ice completely melts. In some implementations, a portion of the ice (a layer directly in contact with the airframe) melts, creating a layer of water between the ice and the airframe, allowing the ice to slip off or to be mechanically removed from the airframe. In some implementations, heating occurs prior to ice being present, preventing its formation.

In some implementations, upon melting of the ice, the high frequency AC current continues to be applied to maintain the generation of Joule heating within the airframe, which transfers to any water formed/remaining on the surface using conduction and convection.

FIGS. 19-32 provide examples of assemblies for carrying and delivering electromagnetic energy for bulk medium heating systems. The assemblies (referred to herein as "coupling strips") are configured to function similarly to transmission lines in combination with a bulk conductive medium to which they are attached. For example, in some implementations, the design of the coupling strips causes the bulk medium itself to conduct current in a manner similar to current traveling through a transmission line. The coupling strips can electromagnetically couple AC signals from the lines to the bulk media, thereby, generating corresponding current signals within the bulk medium. Thus, in effect, it can be said that the design of the coupling strip causes the bulk medium (in combination with the coupling strip) to operate as a transmission line as well, or alternatively causes the bulk medium and the coupling strips to together form a system that behaves like a transmission line and can be analyzed and designed as such.

For example, as discussed above, implementations of the present disclosure can be configured to produce heating in a bulk medium by manipulating mechanisms for shaping (e.g., constricting, lengthening, etc.) current within a conductive medium (e.g., bulk medium, conductor): for example, by using the skin effect and the proximity effect. Both effects rely on running a high frequency AC current through the conductive medium that is to be heated. The skin effect constrains current flow by taking advantage of the tendency of an alternating electric current ("AC") to become distributed within a conductor such that the current density is largest near the surface of the conductor, and decreases with greater depths in the conductor. The proximity effect can be used to further constrain current flow in the conductor by placing another AC current path near the existing current flowing in the conductor. The proximity effect can also act to lengthen the current path. The coupling strips can be used to produce and control such effects in addition to the systems and processes discussed above. For example, the coupling strips can be used with the various power control systems described above.

FIG. 19 is a cross-sectional view of an exemplary coupling strip 1900. Coupling strip 1900 can be used to provide high frequency current signals to a bulk medium such as an aircraft skin 1902 to heat the bulk medium. The coupling strip 1900 has a multi-layer structure that includes a first dielectric layer 1908 over the bulk medium 1902, a conductive layer 1904 over the first dielectric layer 1908, a second dielectric layer 1908 over the conductive layer 1904, and a conductive shielding layer 1906 over the second dielectric layer 1908.

The first dielectric layer 1908 has a thickness D1. The conductive layer 1904 has a thickness D2. The second dielectric layer 1908 has a thickness D3. The conductive shielding layer 1906 has a thickness D4. The overall thickness of the coupling strip 1900 is D5. The conductive layer 1904 can be made from conductive materials including, but not limited to, copper, copper alloys (e.g., brass or bronze), silver, silver alloys, aluminum, aluminum alloys, titanium, titanium alloys, chromium, nickel, nickel alloys, cobalt-base alloys, corrosion-resistant steel, graphite, or a combination thereof. The conductive shielding layer 1906 can be made from conductive materials including, but not limited to, copper, copper alloys (e.g., brass or bronze), silver, silver alloys, aluminum, aluminum alloys, titanium, titanium alloys, chromium, nickel, nickel alloys, cobalt-base alloys, corrosion-resistant steel, graphite, or a combination thereof. In some implementations, the conductive shielding layer 1906 can be formed as a metal foil (e.g., copper foil or aluminum foil) or as a woven metal layer. The dielectric layers 1908 can be made from dielectric materials including, but not limited to, Kapton, mylar, Polyethylene Terephthalate (PET), Polytetrafluoroethylene (PTFE), rubber, or a combination thereof.

In some implementations, the coupling strip 1900 includes a protective layer over the conductive shielding layer. For example, the protective layer can include, but is not limited to one or more layer of polyurethane, polyflouride, paint, paint replacement film, sealant, or a combination thereof.

As illustrated in FIG. 20, coupling strips 1900 can arranged on the surface of a bulk medium, such as an aircraft skin 2000 (e.g., a wing), to supply electrical current to the bulk medium and heat the bulk medium generating and shaping a current flow within the bulk medium. The coupling strips 1900 extend along the surface of the aircraft skin 2000 and are spaced apart from one another. In some implementations, one or more coupling strips 1900 include a short circuit termination that conductively couple at least a portion of a coupling strip (e.g., the conductive layer 1904) to the bulk medium 1902. For example, a coupling strip 1900 can terminate with an electrode, such as those discussed above, to form closed-circuit (e.g., a short circuit) between the conductive layer 1904 contained therein and the bulk medium 1902. The termination of the coupling strip 1900 is the far end of the strip opposite the end to which current is supplied (e.g., opposite the power input end). In some implementations, one or more coupling strips 1900 terminate in an open circuit. An open circuit termination means that the termination end of the coupling strip 1900 is left as an open circuit; not being connected to an electrical ground through either the bulk medium 1902 or a conductive shielding layer of the coupling strip 1900. In some implementations, one or more coupling strips 1900 terminate with an impedance adjusting component (e.g., a circuit element) connected between the coupling strip 1900 and the bulk medium 1902. For example, a coupling strip 1900 can terminate with a capacitive, resistive, or inductive termination. For example, circuit element such as a capacitor, an inductor, or a resistor can be connected between the conductive layer 1904 of a coupling strip 1900 and the bulk medium 1902.

Referring to FIGS. 19 and 20, a power control system (e.g., power control system 104 described above) is coupled to one end of each of the coupling strips to feed each strip with an electrical current. For example, a power supply line from the power control system can be coupled to the conductive layer of each carrier strip 1900 and either one or both of the bulk media 1902 (e.g., aircraft skin 2000) can be coupled to electrical ground.

The power control system supplies an AC current to each carrier strip 1900. For example, the power control system can supply an AC current with a frequency between 1 kHz and 450 MHz. In some implementations, the frequency is between 1 MHz and 450 MHz. In some implementations, the frequency is between 1 kHz and 1 MHz. The power control system can be configured to provide between 0.1 Amps and 200 Amps of AC current to each coupling strip 1900. For example, a power source of the power control system and an electrical arrangement of the coupling strips 1900 can be configured to provide a desired amount of current (e.g., between 0.1 Amps and 200 Amps) to each coupling strip 1900. As one general example, if the coupling strips 1900 are coupled to the power control system in series with one another a 100 Amp power source may be used to provide 100 Amps of current to each coupling strip 1900. If ten coupling strips 1900 are coupled to the power control system in parallel with one another a 100 Amp power source may be used to provide 10 Amps of current to each coupling strip 1900. It should be noted that this example assumes that the impedance of each coupling strip is equal. As discussed below, the impedance of coupling strips 1900 can be tuned in various ways to control the current distribution among the coupling strips as might be desired or required for a particular heating application.

The AC current for heating the aircraft skin 1902 is provided through the conductive layer 1904. The AC current provided through the conductive layer 1904 generates (e.g., by electromagnetic capacitive and inductive coupling) a corresponding current in the aircraft skin 1902 as shown in FIGS. 22A-22B. FIGS. 22A-22B illustrate output plots of an electromagnetic Finite Element Analysis (FEA) simulating the operation of an exemplary coupling strip 1900 attached to a conductive bulk medium 1902. The bulk medium 1902 (e.g., simulated as an aircraft skin), the conductive layer 1904, and the conductive shielding layer 1906 are labeled in the plot shown in FIG. 22A. In FIG. 22B, individual components of the coupling strip 1900 are not shown, and, only the coupling strip 1900 (depicted generally) and the bulk medium 1902 are labeled. The region labeled as 2206 in both plots represents the background environment (e.g., the atmosphere). Both plots illustrate the normalized density (in A/m$^2$) of the current induced in the bulk medium 1902 and indicated by the shaded region 2204. The current density in the bulk medium 1902 is at a maximum in a narrow region 2204 near the surface of the bulk medium 1902. In addition, the plot in FIG. 22A illustrates the normalized electric field intensity (light grey scale region 2202) within the dielectric layers of the coupling strip 1900. Notably, the conductive shielding layer 1906 shields the surrounding environment 2206 from electric fields produced by the current traveling through the conductive layer 1904, e.g., to reduce or eliminate electromagnetic radiation and to protect the coupling strip 1900 from external electromagnetic interference. The bulk medium 1902 serves as a shielding layer as well by, e.g., minimizing or blocking the electric fields. Thus, the conductive shielding layer 1906 and the bulk medium 1902 can, in implementations of the coupling strip 1900, serve to contain the electric fields within the coupling strip 1900 (e.g., between conductive shielding layer 1906 and the bulk medium 1902). This effect reduces or prevents electromagnetic interference between heating system and other nearby electrical components. Implementations of the coupling strip 1900, in combination with the bulk medium 1902 can achieve an operating performance comparable to stripline-type transmission lines.

Referring again to FIG. 19, the heating effect of the carrier strips 1900 on the bulk medium and also the impedance of each carrier strip 1900 can be adjusted by altering characteristics of the carrier strip such as, e.g., the thicknesses of the various layers 1904, 1906, and 1908; the width of the conductive layer; the layout of the conductive layer; the materials of each layer—including their dielectric constants and conductivity properties; or by the inclusion of impedance adjusting components (e.g., capacitors, inductors, and resistors). Furthermore, the heating effects of the current generated in the bulk medium 1902 can also be altered by changing these characteristics which also serve to adjust the proximity effect and path of the heating current that travels through the bulk medium 1902, as discussed above.

For example, each of the layers 1904, 1906, 1908 can be formed with respective thickness (D1–D4) ranging generally between 0.1 mil and 1 inch or, in some implementations, between 0.5 mil and 10 mils. In some implementations, the coupling strip 1900 can be formed with different distances separating the conductive layer 1904 from the bulk medium 1902 and separating the conductive layer 1904 from the conductive shielding layer 1906. In some implementations, these distances are related by a ratio. For example, the coupling strip 1900 can be formed such that the relative thickness D1 and D3 of the dielectric layers 1908 are related by a ratio. For example, the ratio D1:D3 can range be between 1:1 and 1:5 for some implementations. The ratio D1:D3 can be reversed to range between 1:1 and 5:1 for other implementations, e.g., in order to obtain a desired current density and/or impedance value for a given application. In one example implementation D1 is 3 mils, D2 is 1 mils, D3 is 3 mils, and D4 is 1 mils. In another example implementation D1 is 7.2 mils, D2 is 1.4 mils, D3 is 2.4 mils, and D4 is 1.4 mils. In yet another example implementation D1 is 1000 mils, D2 is 50 mils, D3 is 500 mils, and D4 is 50 mils. In yet another example implementation D1 is 10 mils, D2 is 2.5 mils, D3 is 50 mils, and D4 is 2.5 mils. In yet another example D1 is 2.4 mils, D2 is 1.4 mils, D3 is 7.2 mils, and D4 is 1.4 mils. In yet a further example D1 is 17.6 mils, D2 is 9.8 mils, D3 is 24.5 mils, and D4 is 9.8 mils. In yet another example D1 is 100 mils, D2 is 20 mils, D3 is 250 mils, and D4 is 20 mils. In yet another example D1 is 5.5 mils, D2 is 2.5 mils, D3 is 9.0 mils, and D4 is 2.5 mils. In yet a further example D1 is 1.5 inches, D2 is 0.25 inches, D3 is 2.2 inches, and D4 is 0.25 inches. In yet another example D1 is 3.8 mils, D2 is 2 mils, D3 is 3.8 mils, and D4 is 2 mils. In yet another example D1 is 2.9 mils, D2 is 1.5 mils, D3 is 5.8 mils, and D4 is 2.5 mils. In yet a further example D1 is 5 mils, D2 is 2.5 mills, D3 is 25 mils, and D4 is 1.5 inches. In yet another example D1 is 11 mils, D2 is 3 mils, D3 is 5.5 mils, and D4 is 3 mils. In yet another example D1 is 21 mils, D2 is 1.5 mils, D3 is 7 mils, and D4 is 2.5 mils. In yet a further example D1 is 10 mils, D2 is 2.5 mills, D3 is 2 mils, and D4 is 2.5 inches. In yet a further example D1 is 4.5 inches, D2 is 0.25 inches, D3 is 1.5 inches, and D4 is 0.25 inches. In another example implementation D1 is 3 mils, D2 is 1 mils, D3 is 3 mils, and D4 is 1 mils. In yet another example D1 is 10.2 mils, D2 is 3.5 mils, D3 is 40.8 mils, and D4 is 2.5 mils. In yet another example D1 is 4.8 mils, D2 is 0.5 mils, D3 is 14.4 mils, and D4 is 0.5 mils. In yet another example D1 is 15 mils, D2 is 1.4 mils, D3 is 3 mils, and D4 is 1.4 mils. In yet another example D1 is 113 mils, D2 is 10 mils, D3 is 28.25 mils, and D4 is 10 mils. In yet another example D1 is 127 mils, D2 is 5 mils, D3 is 254 mils, and D4 is 10 mils. In yet another example D1 is 53 mils, D2 is 12 mils, D3 is 159 mils, and D4 is 12 mils. In yet another example D1 is 13 mils, D2 is 1.4 mils, D3 is 2.6 mils, and D4 is 1.4 mils. In yet another example D1 is 23 mils, D2 is 4 mils, D3 is 46 mils, and D4 is 4 mils. In yet another example D1 is 11.5 mils, D2 is 2.8 mils, D3 is 57.5 mils, and D4 is 2.8 mils. In yet another example D1 is 10 mils, D2 is 1.4 mils, D3 is 2.5 mils, and D4 is 1.4 mils.

Furthermore, the width of the conductive layer 1904 can generally range between several inches or several mils across the layer. FIG. 21 depicts a top view of several exemplary coupling strips (Examples 1-9) to illustrate various configurations of the conductive layer 1904 within a coupling strip 1900. It should be noted that the coupling strips 1900 in FIG. 21 are depicted with the layers above the conductive layer 1904 (e.g., the second dielectric layer and the conductive shielding layer) removed for illustrative purposes. The cross-sectional area of conductive layer 1904 can be varied along its length. For example, the width of conductive layer 1904 can vary along its length to tune the impedance of the coupling strip 1900 and, in some cases, to tune the current densities in the bulk medium and the conducting layer. Examples 1-9 show several exemplary width-variation patters for a conductive layer 1904 of a coupling strip 1900. For instance, the width of the conductive layer 1904 across the coupling strip 1900 can vary between a maximum width and minimum width. In some implementations, the maximum width is as little as 1.5 times larger the minimum width. In other implementations, the maximum width is as much as 100 times larger than the minimum width. For example, the width of the conductive layer 1904 shown in Example 1 may be 1.5 inches at its largest location (e.g., the top end) and 1 inch at its narrowest location (e.g., the bottom end). In another example, the width of the conductive layer 1904 shown in Example 1 may be 1 inches at its largest location (e.g., the top end) and 10 mils at its narrowest location (e.g., the bottom end).

In some implementations, the thickness of conductive layer 1904 can vary along its length. For example, the width of conductive layer 1904 can vary along its length to tune the impedance of the coupling strip 1900. In some implementations, both the thickness and width and material of conductive layer 1904 can vary along its length.

In some implementations, the impedance of the coupling line 1900 can be adjusted by including impedance adjusting components (e.g., capacitors, inductors, and resistors) at one or more locations along the length of the conductive layer 1904. For example, the conductive layer can be separated into several segments along the length with one or more impedance adjusting components connecting the segments. For instance, in reference to coupling strip Example 4 of FIG. 21, the conductive layer 1904 can be separated into two segments at region 2102 and an impedance adjusting component (e.g., a capacitor, inductor, resistor, or combination thereof) can be electrically connected between each segment. Alternatively or in addition, an impedance adjusting component can be connected to the conductive layer as a shunt element between the conductive layer 1904 and either the bulk medium 1902 or the conductive shielding layer 1906.

In some implementations, the width, thickness, or both of the conductive shielding layer 1906 can vary along the length of the coupling strip 1900. In some implementations, the width, thickness, or both of the dielectric layers 1908 can vary along the length of the coupling strip 1900. For example, in some implementations, the cross-sectional areas of the conductive layer 1904, the dielectric layers 1908 and the conductive shielding layer 1906 can vary along the length of the strip 1900.

FIG. 23 illustrates layout diagrams (Layouts A-E) of several exemplary arrangements for a conductive layer 1904 within a coupling strip 1900. Initially, in a linear arrangement (as depicted in FIG. 21) the conductive layer 1904 extends linearly along the length of the coupling strip 1900. Layouts A-E depict coupling strips 1900 in which the conductive layer 1904 is arranged to follow along a non-linear pattern or path. Specifically, the examples shown in FIG. 23 depict the conductive layer 1904 arranged in various different serpentine patterns. The depicted serpentine patterns position segments of the conductive layer 1904 alongside one another in a width direction of the coupling strip 1900. Such arrangements allow the overall length of the coupling strip 1900 to be reduced while maintaining a desired total length of the conductive layer 1904. In some applications, maintaining a relatively uniform length for the conductive layer 1904 in different coupling strips 1900 helps to maintain consistent impedance between coupling strips 1900 of different lengths. For example, in each of Layouts A and B conductive layer 1904 can be formed to the same total length. However, the overall length of the coupling strip 1900 in Layout B may be shortened to half of the length of a coupling strip 1900 with conductive layer in a linear arrangement (e.g., as depicted in FIG. 21). Similarly, the overall length of the coupling strip 1900 in Layout C may be shortened to one third of the length of a coupling strip 1900 with conductive layer in a linear arrangement. Moreover, the shorter length coupling strips 1900 can be placed in space constrained locations on an aircraft body. For example, coupling strips 1900 with having a conductive layer arranged according to Layouts A-E can be placed on narrow areas of a wing (e.g., wing tips) where a coupling strip 1900 with the linear conductive layer arrangement might be too long to fit.

Each Layout A-E illustrates coupling strip 1900 having a conductive layer 1904 arranged along non-linear path from an input end 2302 to a termination end 2304. Layout A illustrates a coupling strip 1900 with a conductive layer 1904 in a double overlap arrangement. The conductive layer 1904 in Layout A includes two segments arranged alongside one another, e.g., in a U-shaped path from the input end 2302 to the termination end 2304. FIG. 24A depicts a cross-sectional view of a coupling strip 1900 according to Layout A taken at A-A'.

Layout B illustrates a coupling strip 1900 with a conductive layer 1904 in a triple overlap arrangement. The conductive layer 1904 in Layout B includes three segments arranged alongside one another, e.g., in an S-shaped path from the input end 2302 to the termination end 2304. FIG. 24B depicts a cross-sectional view of a coupling strip 1900 according to Layout B taken at B-B'.

Layouts C and D illustrate coupling strips 1900 with a conductive layer 1904 in different variations of a quadruple overlap arrangement. The conductive layer 1904 in each of Layouts C and D includes four segments arranged alongside one another. In Layout C the segments of the conductive layer 1904 are arranged, e.g., in an M-shaped path (or W-Shaped path) from the input end 2302 to the termination end 2304. In Layout D the segments of the conductive layer 1904 are arranged, e.g., as a double overlap arrangement folded alongside itself. A similar technique can also be applied to the trio configuration by folding the trio conductive layer 1904 alongside itself. FIG. 24C depicts a cross-sectional view of a coupling strip 1900 according to Layout C and Layout D taken at C-C'.

Layout E illustrates a more general arrangement for a conductive layer 1904. For instance, Layout E depicts an example of a conductive layer 1904 with multiple segments of different widths positioned alongside one another. Further, in some implementations, a conductive layer 1904 can include interconnections 2306 between segments at various positions between the segments as shown in Layout E. In some implementations, a coupling strip 1900 may also include multiple signal inputs 2302.

FIG. 25A depicts a cross-sectional view of an exemplary configuration for attaching a coupling strip 1900 to a bulk medium 1902. More specifically, FIG. 25A depicts a bottom attachment configuration. In a bottom attachment configuration, an adhesive material 2502 disposed between the bottom of the coupling strip 1900 (e.g., the bottom dielectric layer) and the surface of the bulk medium 1902. For example, the adhesive material can be, but is not limited to, a layer of a double-sided adhesive (e.g., a double-sided tape), a resin, or an epoxy.

FIG. 25B depicts a cross-sectional view of another exemplary configuration for attaching a coupling strip 1900 to a bulk medium 1902. More specifically, FIG. 25B depicts a top attachment configuration. In a top attachment configuration, an adhesive layer 2504 is applied over the coupling strip 1900 to attach the coupling strip 1900 to the aircraft skin 1902. The adhesive layer 2504 can be, for example, an adhesive coating, an adhesive film, or tape.

FIG. 26A is a cross-sectional view of a coupling strip 1900 with a double-sided adhesive bottom layer before installation on a bulk medium 1902 and FIG. 26B is a cross-sectional view of the coupling strip 1900 of FIG. 26A installed on a bulk medium 1902. In some implementations such as a bottom attachment configuration, a coupling strip 1900 includes an adhesive bottom layer 2608. The adhesive bottom layer can be formed from a double-sided adhesive material (e.g., a double-sided tape). In such implementations, the double-sided adhesive material can serve as the bottom dielectric layer (e.g., the bottom dielectric layer 1908 of FIG. 19). In some implementations, the adhesive bottom layer 2608 can be, for example, an adhesive coating or adhesive film applied to the bottom surface of the bottom dielectric layer 1908. Prior to installation, a coupling strip 1900 with an adhesive bottom layer 2608 can include a liner 2610 over the adhesive bottom layer 2608. The liner 2610 can be, e.g., a peel-off layer. For instance, the liner 2610 may protect the adhesive bottom layer 2608 prior to installation. During installation, the liner 2610 can be removed from the adhesive bottom layer 2608 to expose an adhesive surface thereof so that the coupling strip 1900 can be attached to the surface of the bulk medium 1902.

In some implementations, one or more of adhesive layers 2604 and 2606 can be included to attach dielectric layer 1908 to the conductive layer 1904 and/or to attach the conductive shielding layer 1906 to the dielectric layer 1908. In some implementations, the coupling strip 1900 includes a protective layer 2602 over the conductive shielding layer 1906. For example, the protective layer 2602 can include, but is not limited to one or more layer of polyurethane, polyflouride, paint, paint replacement film, sealant, or a combination thereof.

In some applications, a non-conductive bulk medium may need to be heated. In such situations the heating systems and coupling strips described herein can be modified to heat a non-conductive bulk medium in such situations. For example, an embedded layer can be used with the coupling strip heating system to heat a non-conductive bulk medium.

Figure 27A:
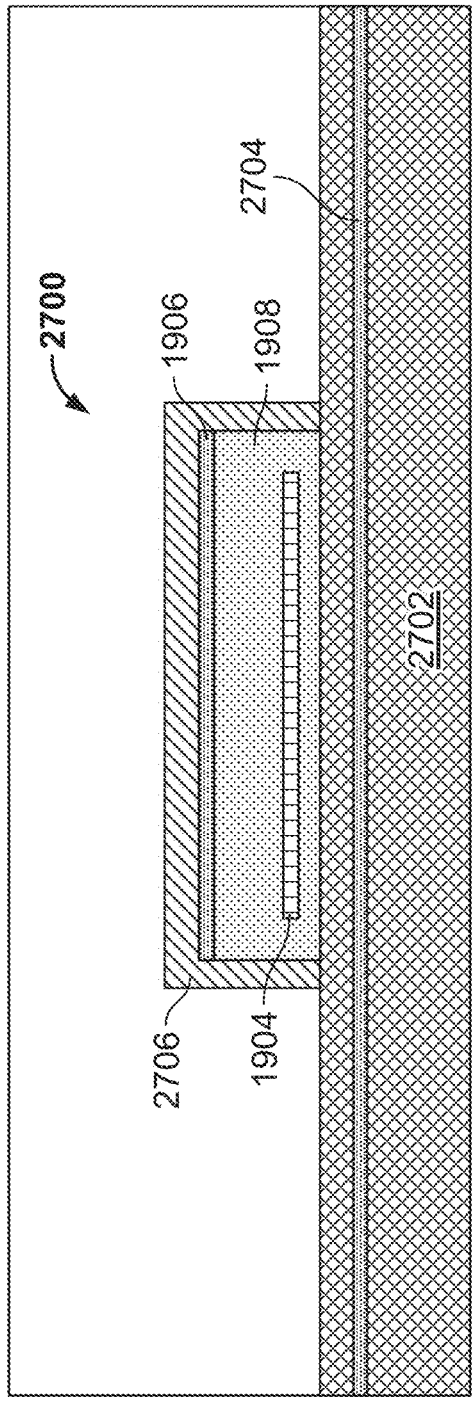

FIGS. 27A-27F depict cross-sectional views of various implementations of embedded coupling strips. FIG. 27A illustrates coupling strip 2700 that is similar to the coupling strip 1900 of FIG. 19. Like coupling strip 1900, coupling strip 2700 includes has a multi-layer structure that includes a first dielectric layer 1908 over the bulk medium 1902, a conductive layer 1904 over the first dielectric layer 1908, a second dielectric layer 1908 over the conductive layer 1904, and a conductive shielding layer 1906 over the second dielectric layer 1908, and optionally, a protective layer 2706 over the conductive shielding layer 1906. Protective layer 2706 is similar to protective layer 2602 described above. Coupling strip 2700 differs from coupling strip 1900 in that it is attached to the surface of a non-conductive bulk medium 2702 and the non-conductive bulk medium 2702 includes a bulk conductive material 2704 embedded therein. For example, the bulk conductive material 2704 can be formed as a metal foil, metal tape, or as a woven metal layer embedded within the non-conductive bulk medium 2702. For example, the non-conductive bulk medium 2702 can be a layered material (e.g., a carbon fiber composite, a fiberglass composite, or a Kevlar composite) with the conductive bulk material 2704 disposed between layers of the non-conductive bulk medium 2702. The bulk conductive material 2704 can be made from conductive materials including, but not limited to, copper, copper alloys (e.g., brass or bronze), silver, silver alloys, aluminum, aluminum alloys, titanium, titanium alloys, chromium, nickel, nickel alloys, cobalt-base alloys, corrosion-resistant steel, graphite, or a combination thereof.

In each of the examples illustrated in FIGS. 27A-27F, AC current passed through the conductive layer 1904 of the coupling strip 2700 generates a heating current in the bulk conductive material 2704 rather than in the non-conductive bulk medium 2702. Heat generated in the bulk conductive material 2704 is then transferred into the non-conductive bulk medium 2702 (e.g., by conduction). In some examples, if the non-conductive bulk medium exhibits some electrically conductive behavior, in addition to the bulk conductive material layer, heat will also generate in the non-conductive portion.

Figure 27B:
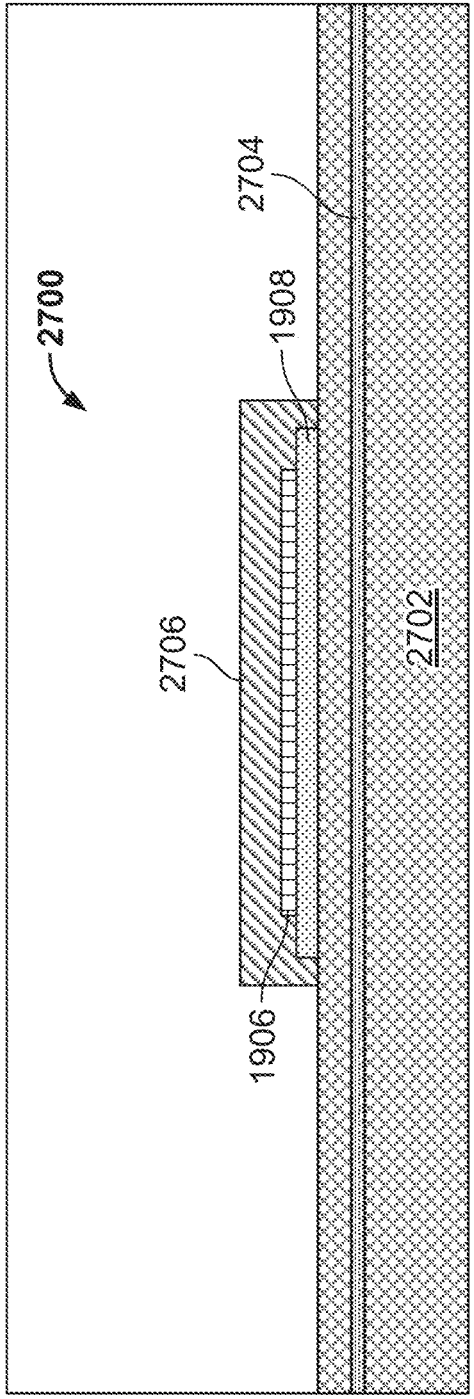

FIG. 27B illustrates an implementation of a coupling strip 2700 that includes only a protective layer 2706, a conductive layer 1904, and a dielectric layer 1908. The coupling strip 2700 is arranged with the protective layer 2706 over the conductive layer 1904, and with the conductive layer 1904 over the dielectric layer 1908. The dielectric layer 1908 separated from the embedded conductive bulk material 2704 by a portion of the non-conductive bulk medium 2702.

Figure 27C:
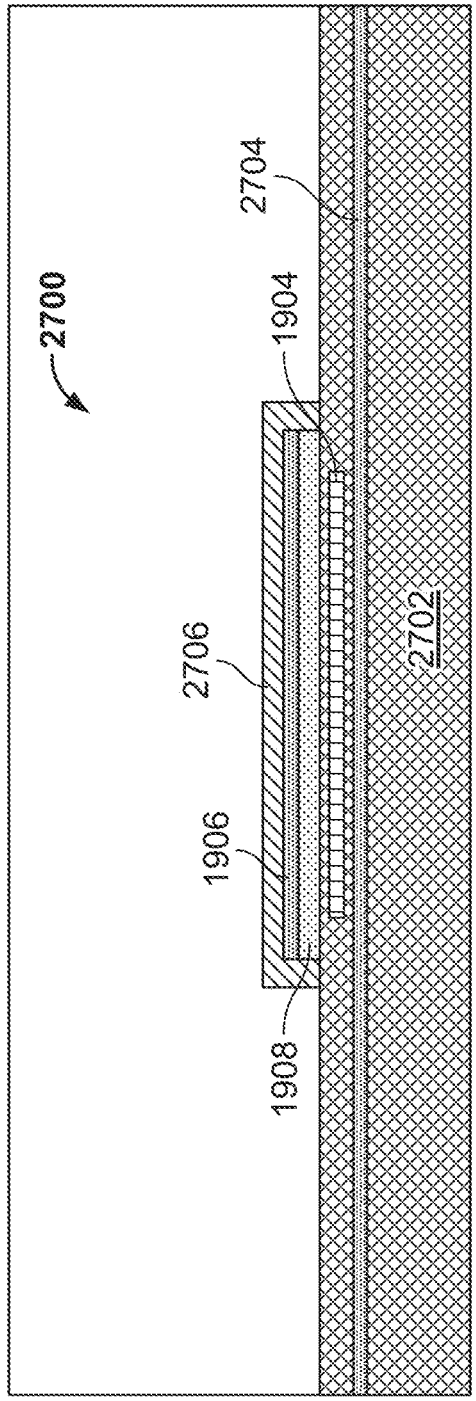

FIG. 27C illustrates an implementation of a coupling strip 2700 that includes a conductive layer 1904 embedded within the non-conductive bulk medium 2702. The coupling strip 2700 in FIG. 27C includes a protective layer 2706, a conductive shielding layer 1906, a dielectric layer 1908, and a conductive layer 1904. The coupling strip 2700 is arranged with the protective layer 2706, the conductive shielding layer 1906, and the dielectric layer 1908 over the conductive layer 1904. The conductive layer 1904 is embedded within the non-conductive bulk medium 2702 and spaced apart from the conductive bulk material 2704 by a portion of the non-conductive bulk medium 2702. For example, conductive layer 1904 and the conductive bulk material 2704 can each be disposed between different layers of the non-conductive bulk medium 2702.

Figure 27D:
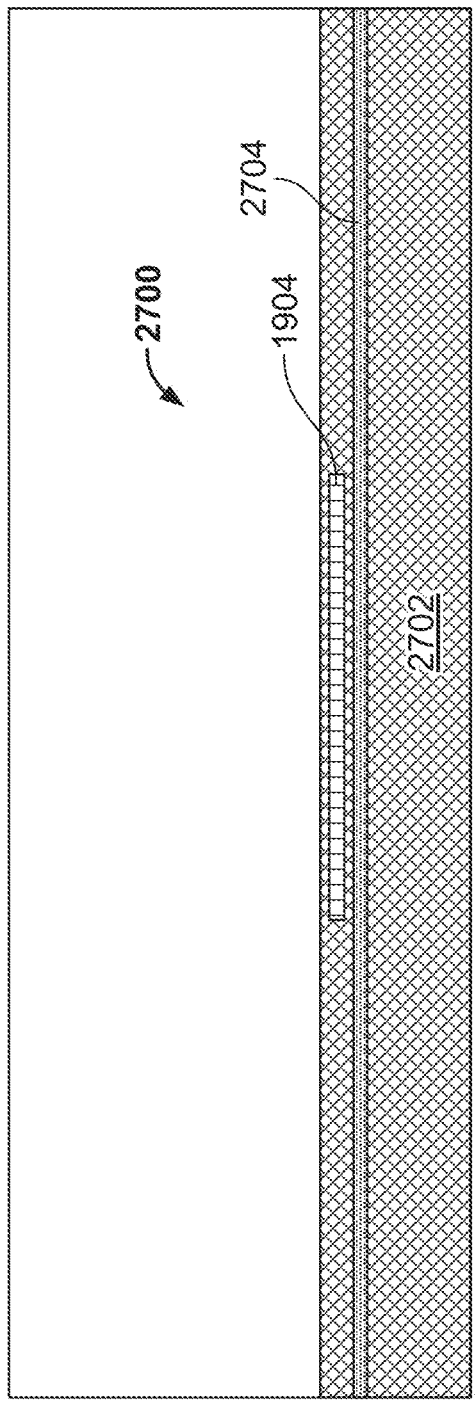

FIG. 27D illustrates a version of the coupling strip 2700 depicted in FIG. 27C, but without the protective layer 2706, conductive shielding layer 1906, and dielectric layer 1908.

Figure 27E:
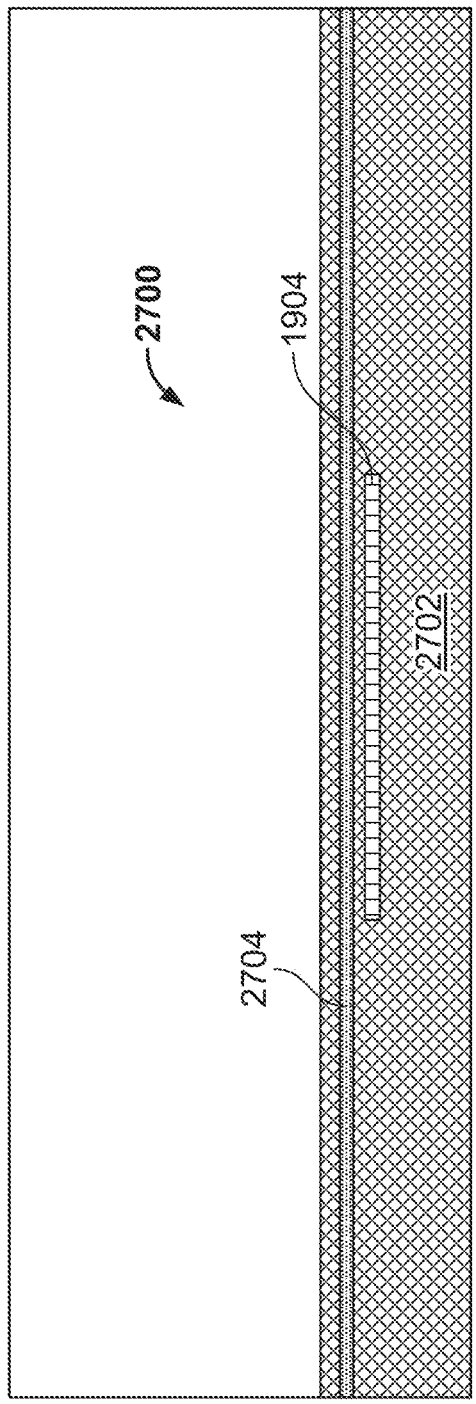

FIG. 27E illustrates a version of the coupling strip 2700 depicted in FIG. 27D, but with orientation of the conductive layer 1904 and the conductive bulk material 2704 reversed. That is, in the coupling strip 2700 arrangement depicted in FIG. 27E the conductive bulk material 2704 is positioned closer to a surface of the non-conductive bulk medium 2702 than the conductive layer 1904.

Figure 27F:
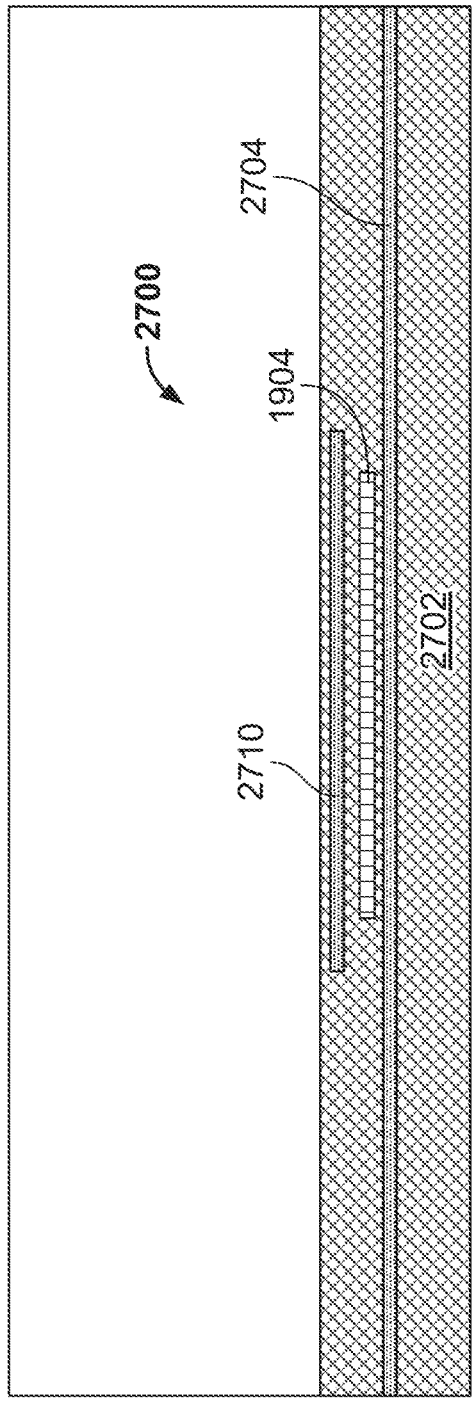

FIG. 27F illustrates an implementation of a coupling strip 2700 that includes a conductive layer 1904 and a conductive shielding layer 1906 embedded within the non-conductive bulk medium 2702. In the coupling strip 2700 arrangement depicted in FIG. 27F portions of the non-conductive bulk medium 2702 (e.g., layers of the non-conductive bulk medium 2702) separate the conductive layer 1904 from the conductive shielding layer 1906 and from the conductive bulk material 2704. The non-conductive bulk medium 2702 serves a similar purpose of the dielectric layers 1908 in coupling strip 1900 shown in FIG. 19.

FIG. 28 depicts diagrams of one implementations of a coupling strip connector 2802. Diagram 2805 is a circuit diagram of the connector 2802. The connector 2802 includes an integrated impedance adjusting network 2804. The impedance adjusting network 2804 is electrically coupled between an input signal interface 2806 and the coupling strip 1900. For example, the input signal interface 2806 can be a coaxial cable connection. An input terminal 2810 of the input signal interface 2806 (e.g., a center wire of a coaxial cable connection) is coupled to the conductive layer 1904 of the coupling strip 1900 by a wiring 2808. Ground terminal(s) 2814 of the input signal interface 2806 (e.g., the shielding of a coaxial cable connection) is coupled to one or both of the bulk medium 1902 or the conductive shielding layer 1906 of the coupling strip 1900 by one or more wirings 2812.

The impedance adjusting network 2804 is configured to tune the input impedance of the coupling strip 1900 to a desired level as measured at the input signal interface 2806. The impedance adjusting network 2804 can be a fixed or variable impedance adjusting network. For example, the impedance adjusting network 2804 can be implemented as any of the impedance adjusting networks described above in reference to FIGS. 12-15B. In diagram 2850 impedance adjusting network 2804 is implemented as a shunt capacitor C1 between a ground connected to either or both the conductive shielding layer 1906 of the coupling strip 1900 and the bulk medium 1902 (or a bulk conductive material 2704 if implemented for a non-conductive bulk medium).

FIG. 29 depicts diagrams of another implementation of a coupling strip connector 2902. The connector 2902 includes two input signal interfaces 2906A and 2906B, e.g., for coupling chaining multiple coupling strips 1900 together. Diagram 2905 is a circuit diagram of the connector 2902. The connector 2902 includes an integrated impedance adjusting network 2904. The impedance adjusting network 2904 includes series and shunt impedance adjusting components 2904A, 2904B, 2904C electrically coupled between the input signal interfaces 2906A, 2906B and the coupling strip 1900. For example, the input signal interfaces 2906A and 2906B can be a coaxial cable connections. Respective input terminals 22910 of the input signal interfaces 2906A, 2906B are coupled to the conductive layer 1904 of the coupling strip 1900 and to each other by a wiring 2808. Respective ground terminal(s) 2914 of the input signal interfaces 2906A, 2906B are coupled to one or both of the bulk medium 1902 or the conductive shielding layer 1906 of the coupling strip 1900 by one or more wirings 2912.

In diagram 2950 impedance adjusting network 2804 is implemented as a series capacitor C1 and two shunt capacitors C2, C3 between a ground connected to either or both the conductive shielding layer 1906 of the coupling strip 1900 and the bulk medium 1902 (or a bulk conductive material 2704 if implemented for a non-conductive bulk medium).

FIG. 30 is a block diagram of a first exemplary bulk medium heating system 3000 utilizing coupling strips 1900 according to implementations of the present disclosure. The heating system 3000 includes a number of coupling strips 1900 spaced apart from one another and attached to the bulk medium 1902 (e.g., an aircraft wing). Each coupling strip 1900 is connected to the power control system 3002. Power control system 3002 can be implemented as any of the implementations of power control system 104 discussed above. The power control system 3002 feeds each strip with an AC current.

One end of each coupling strip 1900 (referred to herein as the "input end") is coupled to a power control system 3002 through a connector 3004. In the illustrated example, the opposite end of each coupling strip 1900 (referred to herein as the "termination end") has either an open circuit termination 3006 or a closed-circuit termination 3008. The coupling strips 1900 are arranged in an alternating pattern where each neighboring pair of coupling strips 1900 has a different type of termination. For example, one coupling strip 1900 in each neighboring pair is provided with an open circuit termination 3006 at its termination end while the other coupling strip 1900 in the pair is provided with a closed-circuit termination 3008. The open circuit terminations 3006 indicate that the termination end of the coupling strip 1900 is left as an open circuit; not being connected to an electrical ground through either the bulk medium 1902 or a conductive shielding layer of the coupling strip 1900. In some implementations, the closed-circuit terminations 3008 are short circuits between the conductive layer of the coupling strip 1900 and either or both of the bulk medium 1902 or a conductive shielding layer of the coupling strip 1900. In some implementations, the closed-circuit terminations 3008 are capacitive terminations where a capacitor is connected between the conductive layer of the coupling strip 1900 and an electrical ground. For example, the capacitor is connected between the conductive layer of the coupling strip 1900 and either the bulk medium 1902 or the conductive shielding layer of the coupling strip 1900. In some implementations, the closed-circuit terminations 3008 are inductive terminations where an inductor is connected between the conductive layer of the coupling strip 1900 and an electrical ground. For example, the inductor is connected between the conductive layer of the coupling strip 1900 and either the bulk medium 1902 or the conductive shielding layer of the coupling strip 1900. In some implementations, the closed-circuit terminations 3008 are resistive terminations where a resistor is connected between the conductive layer of the coupling strip 1900 and an electrical ground. For example, the resistor is connected between the conductive layer of the coupling strip 1900 and either the bulk medium 1902 or the conductive shielding layer of the coupling strip 1900.

Complementary termination types can be applied to neighboring coupling strips 1900 to provide a desired input impedance at the power control system 3002, to provide a desired heating distribution across the bulk medium 1902, or a combination thereof. For example, coupling strips 1900 can be installed on the bulk medium 1902 with the neighboring coupling strips 1900 having complementary termination types. For example, the terminations of neighboring coupling strips 1900 can alternate between open circuit terminations 3006 and short circuit terminations (e.g., closed-circuit termination 3008 implemented as short circuits). In another example, the terminations of neighboring coupling strips 1900 can alternate between closed-circuit termination 3008 implemented as capacitive terminations and closed-circuit termination 3008 implemented as inductive terminations.

FIG. 31 is a block diagram of a second exemplary bulk medium heating system 3100 utilizing coupling strips 1900 according to implementations of the present disclosure. Heating system 3100 is similar to heating system 3000 described above with the addition of a control system 3102 that is configured to drive variable terminations 3106 attached to the termination end of each coupling strip 1900. The variable terminations 3106 include a switchable termination. In some implementations, the variable terminations 3106 are configured to switch between a short circuit termination and an open circuit termination. For example, the variable terminations 3106 include a controllable switch coupled between the conductive layer of the coupling strip 1900 and an electrical ground. The controllable switch can be implemented as an electronic switch (e.g., transistor, power diode, thyristor, silicon-controlled rectifier, etc.) or a mechanical switch (e.g., relay). For example, the controllable switch is connected between the conductive layer of the coupling strip 1900 and either the bulk medium 1902 or the conductive shielding layer of the coupling strip 1900. An output of the control system is coupled to the control terminal of the controllable switch.

The termination of each coupling strip 1900 can be changed between an open circuit and a short circuit by opening and closing the controllable switch (or turning an electronic switch off and on). For example, the control system 3102 controls the operations of the variable terminations 3106 for a coupling strip 1900 by operating the controllable switch to change the termination type of the coupling strip 1900 as needed to heat the bulk medium 1902. In some implementations, the control system 3102 can control each coupling strip's variable termination 3106 independently. In some implementations, the control system 3102 can control the variable terminations 3106 of a group (e.g., a pair or larger group) of coupling strips in synchronization with each other. In some implementations, the control system 3102 can control the variable terminations 3106 of one or more coupling strips 1900 in regular intervals, e.g., according to regular operating cycle. The operating cycle for switching the variable terminations 3106 can range between 0.01 Hz to 100 Hz.

In some implementations, the control system 3102 controls the operations of the variable terminations 3106 by alternately switching them between open circuit and closed-circuit terminations. For example, the control system 3102 switches half of the variable terminations 3106 to short circuit terminations and half of the variable terminations 3106 to open circuit terminations during a first half of an operation cycle. Then, during the second half of the operation cycle, the control system 3102 switches the variable terminations 3106 so that those that were open circuit terminations are switched to closed-circuit terminations and vice versa. The operating cycle for switching the variable terminations 3106 can range between 0.01 Hz to 100 Hz.

In some implementations, the variable terminations 3106 of each pair of neighboring coupling strip 1900 are controlled to maintain the opposite type of termination. That is, the control system 3102 controls the variable terminations 3106 such that the termination of one coupling strip 1900 in each neighboring pair is configured as an open circuit and the termination of the other coupling strip 1900 in the pair is configured as an open circuit, with the terminations alternating for each half of an operating cycle.

The control system 3102 can be a computing device with one or more processors or microcontrollers configured to control the operations of the variable terminations 3106. For example, the control system 3102 includes memory storing instructions (e.g., software code) which when executed by the control system cause the control system 3102 to provide appropriate control signals to the controllable switches in the variable terminations 3106. In some implementations, the power control system 3002 and the control system 3102 can be integrated into a common power and control system.

In some implementations, the variable terminations 3106 are configured to switch between a capacitive termination and an inductive termination. For example, the controllable switch can be arranged to switch between coupling the conductive layer of a coupling strip 1900 to a capacitor that is connected to ground or coupling the conductive layer of a coupling strip 1900 to an inductor that is connected to ground. As noted above the ground can be through either the bulk medium 1902 or the conductive shielding layer of the coupling strip 1900. Moreover, in such implementations, the control system 3102 can be operated as described above to alternately switch the variable terminations 3106 between conductive and inductive terminations.

In other implementations, the variable terminations 3106 can be modified to switch between different termination types, e.g., between open circuit terminations and capacitive terminations, between short circuit terminations and inductive terminations, between open circuit terminations and inductive terminations, between short circuit terminations and capacitive terminations, between open circuit terminations and resistive terminations, between short circuit terminations and resistive terminations, or other combinations thereof.

FIG. 32 is a block diagram of a third exemplary bulk medium heating system 3200 utilizing coupling strips according to implementations of the present disclosure. Heating system 3200 is configured to alternately drive neighboring coupling strips 1900. Heating system 3200 is similar to heating system 3000 described above with the addition of a control system 3202 that is configured to drive the switchable connectors 3204 attached to the input end of each coupling strip 1900. The switchable connectors 3204 include a controllable switch arranged to connect and disconnect an associated coupling strip 1900 from the power control system 3002. The controllable switch can be implemented as an electronic switch (e.g., transistor, power diode, thyristor, silicon-controlled rectifier, etc.) or a mechanical switch (e.g., relay). For example, the controllable switch is connected between the conductive layer of the coupling strip 1900 and an input terminal of the switchable connector 3204. An output of the control system is coupled to the control terminal of the controllable switch.

The control system 3202 controls the operations of the switchable connector 3204 to alternately connect and disconnect the coupling strips 1900 with the power control system 3002, effectively turning the coupling strips 1900 on and off. For example, the control system 3202 can control the switchable connectors 3204 to alternately turn the coupling strips 1900 on and off. For example, the control system 3202 controls the operations of the switchable connectors 3204 for a coupling strip 1900 by operating the controllable switch to turn the coupling strip 1900 off and on as needed to heat the bulk medium 1902. In some implementations, the control system 3102 can control each coupling strip's variable termination 3106 independently. In some implementations, the control system 3102 can control the variable terminations 3106 of a group (e.g., a pair or larger group) of coupling strips in synchronization with each other. In some implementations, the control system 3102 can control switch the variable terminations 3106 of one or more coupling strips 1900 in regular intervals, e.g., according to regular operating cycle. The operating cycle for switching the variable terminations 3106 can range between 0.01 Hz to 100 Hz. In some implementations, the control system 3202 turns the coupling strips 1900 with open circuit terminations 3006 on and the coupling strips 1900 with closed-circuit terminations 3008 off during a first half of the operating cycle. Then, during the second half of the operating cycle, the control system 3202 switches the switchable connectors 3204 to turn the coupling strips 1900 with open circuit terminations 3006 off and the coupling strips 1900 with closed-circuit terminations 3008 on.

The control system 3202 can be a computing device with one or more processors or microcontrollers configured to control the operations of the variable terminations 3106. For example, the control system 3202 includes memory storing instructions (e.g., software code) which when executed by the control system cause the control system 3202 to provide appropriate control signals to the controllable switches in the variable terminations 3106. In some implementations, the power control system 3002 and the control system 3202 can be integrated into a common power and control system.

As used herein, the terms "perpendicular" or "substantially perpendicular" or "normal" or "substantially normal" refer to a relation between two elements (e.g., lines, directions, axes, planes, surfaces, or components) that forms a ninety-degree angle within acceptable engineering or measurement tolerances. For example, directions can be considered perpendicular to each other if the angle between the directions is within an acceptable tolerance of ninety degrees (e.g., ±1-2 degrees).

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software and/or hardware product or packaged into multiple software and/or hardware products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Control and Sensing:

In some implementations, the controller is a group of sensors and circuits that performs control, sensing, and monitoring functions of the power control systems. The controller can be, for example, power control system 104, as described with reference to FIG. 1.

In some implementations, the control functions include switching the entire power control system on and off, switching certain sections of the power control system designated to power certain target areas of the bulk medium on and off, regulating the amount of power outputted into certain areas of the bulk medium.

In some implementations, the control functions include control of the dynamic adjusting network.

In some implementations, the monitoring functions include any combination of the following: assessing the health and adequate functionality of the entire heating system, assessing the health and adequate functionality of specific parts and sections of the heating system, performing fault detection for the entire heating system, perform fault detection of specific parts and sections of the heating system, performing fault annunciation to the system user or users, performing fault annunciation to a maintenance or inspection crew.

In some implementations, fault detection means any combination of the following: detecting any electrical faults, detecting any heating function faults, detecting any coupling strip faults, detecting damage in the bulk medium (including in cases where the heating system is functioning appropriately and undamaged). Coupling strips in this disclosure may also be referred to as "striplines," or in some cases merely "lines." A coupling strip includes, e.g., the structural layers described above in reference to FIGS. 19 and 23-27F. As described below, in some implementations coupling strips may include multiple conductive paths, e.g., a sense line and a carrier line. As used herein, the carrier line refers to a conductive path within the coupling strip that carries a current used for heating the bulk medium. The sense line is a separate conductive path that may intermittently or continually carry a smaller current used for sensing faults in the carrier line or coupling strip as a whole.

In some implementations, electrical faults include, but are not limited to: input and output power, voltage, current at any stage of the power control system at levels not within set intervals. In some implementations, electrical faults include temperatures of circuits, devices or components of the power control system being higher or lower than expected in normal operation of the heating system. In some implementations, electrical faults include input and output impedances at any stage of the power system at levels not within set intervals.

In some implementations, heating function faults include, but are not limited to: overheating of any area of the bulk medium compared to normal operation of the heating system, underheating of any area of the bulk medium compared to normal operation of the heating system. In implementations where the heating system is a de-icing system, heating function faults can also include any of the following: any area of the bulk medium not completely de-iced, freezing or re-freezing of precipitations on the bulk medium during or after de-icing and anti-icing operations.

In some implementations, coupling strip faults include any of the following: temperatures at one or more locations on or near the coupling strips and on the bulk medium higher or lower than expected in normal operation of the heating system, a coupling strip being cut at any location, short circuit within the coupling strip (between trace and shield or within the trace itself check trace wording), short circuit between the coupling strip and the bulk medium, short and open circuit at the input connector of the coupling strip, open circuit within the coupling strip, delamination in the coupling strip construction, burnt sections of the coupling strip, delamination between the coupling strip and the bulk medium, peeling of the coupling strip off of the bulk medium, mechanical damages such as dents, holes, bumps, cuts, wrinkles, burr caused by events such as hail, lightning strike, maintenance crew or other personnel mishandling the coupling strip, maintenance crew or other personnel walking or stepping on the coupling strip, static discharge, corrosion on the coupling strip, corrosion or oxide films in between the coupling strip and the bulk medium or in between an electrode/connector and the coupling strip, or in between an electrode/connector and the bulk medium.

In some implementations, the sensing functions include all sensors used to provide input and feedback to the controller such as voltage, current, power, forward power, reflected power, Voltage Standing Wave Ratio (VSWR), time domain reflectometry (TDR), temperature, and ice sensors.

In some implementations, some elements or all elements of the controller are distributed within the power control system. In some implementations, some elements or all elements of the controller are installed such that they are independent from the rest of the control system. In some implementations, these elements are housed in separate, dedicated enclosures.

In some implementations two or more elements of the controller are independent from each other and configured such that a failure of the controller's functions would require at least two of these elements to fail simultaneously. In such implementations, because of the independence of the controllers with respect to each other, the controller's reliability is increased, and the reliability required from each of these elements to meet the controller's requirements is lower, in some cases making their design, implementation, and integration easier and simpler. This is particularly advantageous in applications where safety and controller reliability are critical or regulated, in particular in the case of a heating system installed on aircraft.

In some implementations, two or more subsystems performing the monitoring functions are configured independently to help achieve reliability and safety requirements. In some implementations, two or more subsystems performing the sensing functions are configured independently to help achieve reliability and safety requirements. In some implementations, two or more subsystems performing the control functions are configured independently to help achieve reliability and safety requirements. In some implementations, any combinations of the control, sensing, and monitoring subsystems are configured independently to help achieve reliability and safety requirements.

In some implementations, two identical sensors are used at some sensor locations. In such implementations, both sensors may be connected with and feeding data to the same monitoring subsystem. For example, each of them may be connected to a separate monitoring subsystem each and configured such that the monitoring subsystems are independent from each other, each of them may be both connected to two or more monitoring subsystems configured to operate independently from each other.

In some implementations, two independent sensors are used to gather information on a similar area, and independence may be achieved by using different sensor types and/or being located within at least some distance from each other while still being able to monitor the same area or collect equivalent information. In such implementations, both sensors may be connected with and feeding data to the same monitoring subsystem, each of them may be connected to a separate monitoring subsystem each and configured such that the monitoring subsystems are independent from each other, each of them may be both connected to two or more monitoring subsystems configured to operate independently from each other.

In some implementations, any combination of the controller's control, sensing, and monitoring subsystems are configured to optimize the reliability and safety of its most critical functions. In the case of a heating system used for aircraft de-icing and anti-icing, in some implementations such functions can include a combination of the following: detecting any heating system faults and annunciate them to the pilot, detecting electrical faults in the power control system and annunciate them to the pilot, detecting any faults in the coupling strips, detecting any heating faults in the power control system and bulk medium and annunciate them to the pilot.

In some implementations where the heating system is used for aircraft de-icing and anti-icing, the controller is further optimized to perform verification that the aircraft's critical surfaces, once de-iced, remain free of freezing or frozen precipitations and contaminants. Contaminants may refer to sleet, snow, slush, ice, or any other material that may adhere to an aircraft skin and inhibit proper operations.

In some implementations, the controller and coupling strips layout on the bulk medium are designed and optimized to work together. In such implementations, coupling strips layouts on the bulk medium may be arranged to create areas of interest at chosen locations. Such areas may be, by way of example, areas that by design remain cooler than the rest of the bulk medium when the heating system is activated, or areas that may be the first to experience a re-freezing event (e.g., from ongoing freezing or frozen precipitations, or from melted contaminants running on the bulk medium's surface) while the heating system is running or after it has been deactivated. In such implementations, the controller's sensors may be arranged to gather information on these areas and help assess whether the heating system is functioning adequately or whether the bulk medium is experiencing a freezing or re-freezing event. In some implementations, the bulk medium may be locally modified at some of these areas to ensure that they are cooler than other areas of the bulk medium when the heating system is running or that they are the first areas to experience a refreezing event (e.g., by adding relatively small features like edges and ridges so that melted water may accumulate and stagnate over a cooler area to facilitate refreezing). In some implementations, such areas are selected to be easily observable by the heating system's user (e.g., in the case of an aircraft de-icing system, to be easily visible by the pilot from the aircraft's cabin or flight deck), such that the user may be able to infer whether the bulk medium has experienced a de-icing event based on visual observation of said areas.

In some implementations where the heating system is used for aircraft de-icing and anti-icing, the controller is further optimized to perform verification that specific areas are free of freezing or frozen precipitations and contaminants. Such areas may include: horizontal and sloping upper surfaces exposed to vertically and near-vertically falling precipitation, wing and horizontal stabilizer upper surface.

In some implementations, some of the monitoring functions are performed by using analysis methods leveraging machine learning, computer vision, and artificial intelligence techniques on data collected by the sensing subsystems. In such analysis methods, in some implementations, the techniques may be trained using data gathered empirically from tests performed on heating systems, and may be continuously trained and improved using data gathered by installed heating systems.

In some implementations, the controller may use a timer measuring temporal information such as time of activation of the heating system, amount of time elapsed since the heating system was last activated, and amount of time elapsed since the system was last deactivated. In some implementations, information from the timer may be used in concert with information from the sensing subsystems for analysis to help the controller perform its intended functions.

As shown in FIG. 37A, a flight deck display and annunciation system can be provided in some implementations. The system can have multiple indications, which inform the pilot of the status of the system. For example, an "ON" indicator can be illuminated when the system is energized, a "WARM" indicator can be illuminated when some or all necessary temperature sensors have been at or above 15 C. For example, an "OK" indicator can be illuminated when some or all necessary temperature sensors have indicated at or above 15 C for at least 15 minutes. An "OVHT" indicator can illuminate if an overheat condition is detected, for example any temperature sensor reaches a temperature of greater than or equal to 150 C. A "System Fail" indicator can illuminate for various reasons indicating a potential system failure. For example, if the system has been "ON" for a predetermined time (e.g., 25 minutes) without reaching at least the "WARM" state. In another example, "System Fail" can illuminate if the system is "ON" and has been in an "OVHT" state for greater than 10 seconds. The preceding temperatures and times are provided for exemplary purposes, and they can be varied or adjusted without departing from the scope and spirit of this disclosure.

FIG. 37B depicts an alternative example flight deck indication, showing a system function status for a "DE-ICE" system state as well as an "ANTI-ICE" system state. In the example illustration, the flight deck indication can indicate whether the system is in an "OFF", "GROUND DE-ICE", "GROUND ANTI-ICE", or "FAULT" status. In some implementations, a separate indication can be presented for each region of an aircraft or area of interest.

FIG. 37C shows an example implementation of where the flight deck indication of FIG. 37B may be located in an aircraft cabin. In the example of FIG. 37C, as indicated by the dashed line box, the flight deck indicate is located at the top right corner of an aircraft overhead flight deck.

In some above implementations, the controller's sensing subsystems can include one or more wireless sensors, e.g., one or more wireless temperature sensors or one or more wireless ice sensors, that are configurable to transmit data to a central receiver over a wireless data network. This can alleviate the need for additional sensor wires and enable access to various physically distant locations on the bulk medium. The wireless sensors can draw power from the coupling strip 1900 with direct electrical connection, e.g., by tapping into a low voltage, low current DC bias carried in the coupling strip 1900, or harvesting power directly from the AC current that passes through the coupling strip 1900. Alternatively, the wireless sensors can draw power without direct connection to the coupling strip 1900, e.g., by tapping into near-field electromagnetic emissions through an antenna or coil.

Temperature Sensing

In some implementations, the controller's sensing subsystems include temperature sensors. Temperature sensors may be used to take a point measurement, or to measure parameters such as maximum, minimum, average, or mapping of temperatures over a designated area, e.g., by using a sensor mat that has multiple sensors from which information on the area can be extracted.

In some implementations, temperature sensors may include any of the following sensor types: thermocouples, Resistive Temperature Detectors (RTDs), Thermistors, Fiber Optic, Infrared sensors. Thermocouples could be used to measure temperatures through measuring a change in voltage. Thermocouples are low-cost, simple implementation, and have a wide measurement range. The signal is on the order of tens of millivolts, potentially requiring significant noise reduction in order to perform an accurate measurement in the presence of electromagnetic interference. Resistive temperature detectors (RTDs) can be used to measure temperature by measuring a change in sensor resistance. These elements are typically constructed from platinum, and have very high accuracy. This may require four-wire measurements to be performed, or the leads must be kept short, for example by implementing a local voltage measurement which is then converted to a digital signal. Thermistors are similar to RTDs in that both calculate the temperature based on a resistance measurement. Thermistors have the added benefit of having high baseline resistances, potentially making lead resistance negligible. Fiber optic sensors are typically based upon fiber-Bragg gratings. The gratings reflect a certain wavelength of light. With changes in temperature, the reflected wavelength changes predictably, allowing the temperature to be calculated. Since each grating reflects only a small band of wavelengths, multiple sensors can be incorporated into a single fiber optic element and measured with a single instrument. The fiber optic elements themselves are very small in diameter, ~0.1 mm, but may be meters or tens of meters in length. Since the measurement is optical, it should be impervious to RF interference.

In some implementations, the temperature sensors are arranged on the bulk medium in ways sensors may be arranged as described previously in this specification. In some implementations, the temperature sensors may be arranged widely apart from one another, under the skin of the bulk medium, or both, e.g., as supported by the lumped capacitance model which assumes the temperature of a solid to be spatially uniform within a volume for which the Biot number Bi is small enough (for example Bi<0.1), where the Biot number is defined as $Bi=h/kL$, where k is the thermal conductivity of the solid, h is the convective heat transfer coefficient from the solid into the environment surrounding it and L is a characteristic dimension of the volume. The lumped capacitance model can be a particularly helpful model as within volumes where Bi is small enough, bulk medium temperatures can be assumed to be approximatively uniform, allowing for a reduced quantity of sensors installed on the bulk medium, thus reducing system complexity, cost, and installation labor. Such techniques can be especially effective on bulk mediums that have high thermal conductivities, such as the aluminum alloys commonly making up aircraft skins, where the Biot number remains sufficiently small over relatively large area, justifying the use of a limited number of temperature sensors and sensing points. In some implementations, the temperature sensors may be arranged on the bulk medium such as to be located on specific locations such as Hot Spots, Cold Spots, Refreezing Spots, among other Spots. Hot Spots may be locations chosen to be running relatively hotter than other locations on the bulk medium when the heating system is activated. Hot Spot sensors may be used to perform general controller functions, and may be used to detect an over-temperature event on the bulk medium or coupling strips. Cold Spots may be locations chosen to be running relatively cooler than other locations on the bulk medium when the heating system is activated. Cold Spot sensors may be used to perform general controller functions, and may be used to detect inadequate heating on the bulk medium or coupling strips. Refreezing Spots may be locations chosen to be likelier to experience freezing or refreezing events sooner than other locations on the bulk medium when the heating system is activated or after it has been deactivated. Refreezing Spot sensors may be used to perform general controller functions, and may be used to detect refreezing events or inadequate heating on the bulk medium or coupling strips. Other Spots may be located at other areas of interest such as the ones previously listed in this specification.

In some implementations, the coupling strips' layout on the bulk medium may be optimized such that the spots described above are present are designated areas, chosen for parameters such as ease of access, ease of installation, or ease of visual observation for the heating system's user. For example, as depicted in FIG. 33, an aircraft pilot has a limited sightline 3302 visible from the flight deck. This results in a portion of the aircraft that is not visible to the pilot (3304) and a portion of the aircraft that is visible (3306). In some implementations, a refreezing spot, or cold spot can be selected that is within in the visible portion (3306) of the aircraft, to permit visual verification by the pilot.

FIG. 33 additionally illustrates an example temperature overlay of the wing when the system active. Location 3308 on the wing can be an example cold spot selected or engineered to be visible by the pilot and monitored to allow for verification of anti-icing prior to takeoff. For instance, as illustrated location 3308 correlates to a region of relatively low temperature (as indicated by the yellow color gradient) compared with the majority of the wing (as indicated by the red color gradient) within the heating pattern produced by heating elements (such as the coupling strips described herein).

Locations of cold spots and/or hot spots can be engineered, e.g., by arranging heating strips (e.g., coupling strips) on the surface of the aircraft in a pattern that produces a heating pattern on the aircraft skin with locally cooler or warmer skin temperatures relative to the rest of the aircraft. For instance, the coupling strips can be arranged in a geometry that provides locally lower (or higher) power density (more wire spacing), or selected coupling strips can be operated at lower (or higher) power density at higher (lower) thermal mass locations, or by locally tuning output power to produce a heating pattern that provides cold/hot spots in desired locations.

In some implementations, at least two independent sets of temperature sensors may be used to improve reliability for the controller's critical functions by adding redundancy to its sensing subsystems. In some implementations, independence may be achieved by adding two identical temperature sensors at each designated sensor location. In some implementations, independence may be achieved by adding two different temperature sensors (e.g., of a different manufacturer or sensor type) at each designated sensor location. In some implementations, independence may be achieved by adding two temperature sensors at locations far enough apart from each other to reduce likeliness of simultaneous failure of both sensors while being close enough to monitor equivalent parameters. In some implementations, independence may be achieved with any combination of these methods. In some implementations, sets of independent sensors may be sending information to a single monitoring subsystem, or may be sending information to a set of independent monitoring subsystems that are each dedicated to an independent set of sensors, or may all be sending information to a set of at least two independent monitoring subsystems.

In some implementations, temperature sensing can be achieved by using one or more temperature sensors (or temperature elements) that are an integral part of the coupling strip, e.g., in addition to or instead of using the temperature sensors that are separately arranged on the bulk medium. Example temperature sensors are described in more detail above at the Temperature Sensing section. For example, the temperature sensor can be affixed to the coupling strip or to a nearby sense line (sense lines are described in more detail below) and can either short or open when temperature exceeds a predetermined threshold. Short or open circuit can be detected elsewhere, e.g., at the input connector or a power control system (e.g., the system 104). This enables temperature detection at the location of the temperature sensor.

In some implementations, an array of the temperature sensors can be arranged in parallel. For instance, a parallel arrangement can include an array of parallel over-temperature or under-temperature sensors arranged as a thermostat control loop. A thermostat control loop is a hysteresis control method used to maintain the temperature of a system, e.g., the heating system 100 of FIG. 1, to be within a predetermined range, e.g., above a minimal temperature Tmin and below a maximal temperature Tmax, by leveraging temperature sensor information.

In some implementations, an array of temperature elements can be arranged in series. For example, temperature elements can be arranged along the coupling strip 1900, e.g., affixed to the coupling strip or to a nearby sense line, or along a separate cable strip, so as to enforce over-temperature shutdown if temperature becomes too high at any point in the series configuration.

In some implementations, temperature elements such as periodic thermistors of different values can be arranged in parallel such that when a specific temperature element along the line heats excessively, an analog value may be detected and decoded to indicate not only that the coupling strip has seen an over-temperature but also the specific location where the failure occurred along the coupling line.

In some implementations, temperature sensing can be achieved by using traces on flexible circuits, using added sense lines running within the coupling strips and alongside the carrier lines—the sense lines acting as wiring from and to temperature sensors implemented within the coupling strips—, using added sense lines and sensors implemented within sensing strips installed independently from the coupling strips, or by implementing temperature sensors directly in the coupling strips with the carrier lines, e.g., in the configuration of periodic capacitors, parallel plate capacitors, trace inductors, or a combination thereof.

In some implementations, the temperature can be measured as a function of time. For example, temperature variations can be measured and recorded at regular sampling intervals and stored as vectors representing time-based variations in temperature, rather than static temperature measurements. Time based temperature measurement may permit more complex mathematical analyses such as rate of change (e.g., time-based derivative) or total heat output (e.g., integration). In such implementations, the controller can make any of a variety of assessments including assessments of the current de-icing status based on the temporal information associated with temperature changes. As a specific example, in response to temperature readings sensed by the temperature sensors hovering around 0° C., the controller can determine that the energy delivered by the bulk medium heating system enters latent fusion heat, and thus the de-icing operation is ongoing, and furthermore, when temperature readings sensed by the sensors increase after hovering around 0° C., the controller can determine that the de-icing operation is complete as the energy delivered by the bulk medium goes into increasing temperatures and not into latent fusion heat anymore once frozen contamination has been melted away from the bulk medium. In other words, the time point at which the bulk medium is de-iced can be determined when the temperature plotted with reference to time has been relatively flat (e.g., zero slope) for a predetermined time period followed by period of a positive slope.

In some cases, as will be described further below at the "Ice Detection/Sensing" section, temperature can also be measured as a function of time, and de-icing status can be similarly estimated.

FIG. 40 depicts plots of impedance and temperature as a function of time on a coupling strip. As shown in plot 4000, temperature readings hover around a fixed value (10° C.) while de-icing operation is ongoing (from about 07:00 to 07:30), and then as the de-icing operation is complete, the temperature readings increase (beginning at about 07:30).

In addition, in implementations where the bulk medium is constructed of highly thermally conductive materials (e.g., aluminum), a lumped capacitance thermal model can be used as a basis for assessing de-icing status of the system. The controller can also use the lumped capacitance thermal model to determine the locations of any cold spots on the bulk medium, as well as to determine the temperature of the cold spots. This can reduce the total number of sensors required, facilitate more effective sensor placement, including sensor placement underneath (i.e., instead of atop) the aircraft skin, or both by leveraging thermal conductivity of the bulk medium.

Ice Detection/Sensing

In some implementations, the controller's sensing subsystems include ice detectors or sensors. Ice detection refers to a method of recognizing freezing or frozen precipitation or contaminants, including, but not limited to, snow, ice, and slush, or similar forms of frozen precipitation accumulating on a surface.

In some implementations, ice detection is used to determine whether deicing of a structure is required, tracking and progress of deicing, and monitoring for subsequent ice accumulation after deicing.

In some implementations, ice detection is achieved using a transducer or a plurality of transducers to monitor acoustic parameters of the structure, including, but not limited to, damping coefficient, resonant frequency, and frequency response. In some implementations, ice detection is achieved by observing changes in polarized light. In some implementations, the changes to incident, non-polarized light are observed after it has interacted with ice using variable polarization. In some implementations, changes in incident polarized light are observed. In some implementations, changes to the intensity of reflected light may be used to detect ice formation. In some implementations, ice is detected using a sensor or a plurality of sensors on the surface collecting snow/ice. When snow or ice collects on top of a surface, it closes a sensor aperture, signaling that ice is present. In some implementations, infrared emissions from the surfaces may indicate the presence of ice. This includes, but is not limited to, variation in the surface emissivity, as well as calculation of the surface temperature to determine if conditions are favorable for ice formation. In some implementations, ice detection may be achieved with the use of sensors mounted on critical surfaces. When freezing or frozen precipitation collects on the sensors, it causes a measurable change in electrical impedance. In some implementations, ice sensors leverage the fact that presence of ice near the coupling strips will affect the electromagnetic fields surrounding said lines, having a detectable effect on the frequency domain response and/or time domain response of the coupling strips to an electrical signal. These changes can be measured and used to indicate the presence of ice on the structure. In some implementations, the presence of ice may be predicted by the temperature gradient across the structure or by the rate of change of temperature, which can be measured with temperature sensors as described above. In some implementations, any of the sensors described herein may be surface mounted to the structure.

In some implementations, ice sensors are arranged on the bulk medium similar to how the temperature sensors can be arranged as described previously in this specification. In some implementations, the ice sensors may be arranged on the bulk medium such as to be located on specific locations such as Hot Spots, Cold Spots, Refreezing Spots, among other locations. Hot Spot sensors may be used to perform general controller functions, and may be used to detect an over-temperature event on the bulk medium or coupling strips. Cold Spots may be locations chosen to be running relatively cooler than other locations on the bulk medium when the heating system is activated. Cold Spot sensors may be used to perform general controller functions, and may be used to detect inadequate heating on the bulk medium or coupling strips. Refreezing Spots may be locations chosen to be likelier to experience freezing or refreezing events sooner than other locations on the bulk medium when the heating system is activated or after it has been deactivated. Refreezing Spot sensors may be used to perform general controller functions, and may be used to detect refreezing events or inadequate heating on the bulk medium or coupling strips. Other Spots may be located at other areas of interest such as the ones previously listed in this specification.

In some implementations, the coupling strips' layout on the bulk medium may be optimized such that the spots described above are present are designated areas, chosen for parameters such as ease of access, ease of installation, or lease of visual observation for the heating system's user.

In some implementations, at least two independent sets of ice sensors may be used to improve reliability for the controller's critical functions by adding redundancy to its sensing subsystems. In some implementations, independence may be achieved by adding two identical ice sensors at each designated sensor location. In some implementations, independence may be achieved by adding two different ice sensors (e.g., of a different manufacturer or sensor type) at each designated sensor location. In some implementations, independence may be achieved by adding two ice sensors at locations far enough apart from each other to reduce likeliness of simultaneous failure of both sensors while being close enough to monitor equivalent parameters. In some implementations, independence may be achieved with any combination of these methods. In some implementations, sets of independent sensors may be sending information to a single monitoring subsystem, or may be sending information to a set of independent monitoring subsystems that are each dedicated to an independent set of sensors, or may all be sending information to a set of at least two independent monitoring subsystems.

In some implementations, the controller's sensing subsystems include one or more capacitive sensors. The one or more capacitive sensors, either alone or in combination with other sensors such as temperature sensors, can be used to distinguish ice from water. For example, a circuit board, e.g., a flexible printed circuit board (or flex PCB), which includes an array of the one or more capacitive sensors can be arranged on a surface of the bulk medium to measure the changes in capacitance readings on the surface, e.g., due to the presence of ice or water. As another example, the capacitive sensors can be arranged beneath a cover layer (e.g., a paint replacement film) of the bulk medium.

In some implementations, temperature on the coupling strip 1900 can be derived from impedance measurements which may similarly be measured as a function of time, e.g., by comparing the impedance measurements against a data-base of reference plots of frequency responses at different temperatures. For example, data can be collected on a test system, recording impedance frequency response as a function of ambient temperature. The controller can then leverage the recorded data to infer coupling strip temperatures based on impedance readings.

In some such implementations, the coupling strip 1900 include material(s) that exhibit significant and predictable impedance variations with temperature changes, thereby facilitating the use of impedance measurements for assessing temperature of a target area of the bulk medium. For example, the coupling strip 1900 may be partially constructed using dielectric materials or conductors for which the dielectric constant or conductivity may vary predictably with temperature, thereby causing the impedance to vary locally at the target area of the bulk medium. For example, the coupling strip 1900 may be constructed using one or more of acrylic adhesives, silicon adhesives, ethylene-vinyl acetate adhesives, polysulfide sealants polyurethane sealants, Mylar, PTFE, FEP, Kapton, or epoxy-based materials.

For example, to determine the current temperature of a particular coupling strip, the controller can measure the impedance value of the particular coupling strip and then compare the impedance value to temperature values in a lookup table. As another example, the controller can make the impedance measurement and then calculate (e.g., based on a mathematical relationship between the impedance and temperature) the temperature from the measured impedance value. As a particular example, acrylic adhesive material can be used to construct the bottom dielectric layer of the strip that separate the coupling strip from the bulk medium.

FIG. 41 is a 3D plot of a dielectric constant of an example acrylic adhesive material. FIG. 42 is a plot of a dielectric constant of an example acrylic adhesive material.

As shown in FIG. 41, the dielectric constant ($\varepsilon_r$) of the acrylic adhesive material varies with temperature (C). Specifically, the dielectric constant drives the characteristic impedance of the system including the coupling strip and the bulk medium. So as the temperature for the coupling strip changes, the dielectric constant changes accordingly. This in turn results in variation in the impedance of the system.

In some implementations, the impedance can be measured as a function of time and de-icing status can be determined from impedance measurements by using a similar detection scheme to temperature measurements, as impedance generally varies with temperature. In particular, the time point at which the bulk medium is de-iced can be determined when the impedance plotted with reference to time has been relatively flat (e.g., zero slope) for a predetermined time period followed by period of a positive or negative slope. As shown in plot 4500 of FIG. 40, impedance readings hover around a fixed value (5.7Ω) while de-icing operation is ongoing (from about 07:00 to 07:20), and then as the de-icing operation is complete, the impedance readings increase (beginning at about 07:20).

Electrical

In some implementations, the controller includes control, sensing, and monitoring subsystems used to measure electrical parameters and performance. Such parameters include voltage, current, input and output power at any output impedance at any stages of the heating system, including its power control system, interconnects, cabling, connectors, and electrodes.

In some implementations, the controller uses and analyzes collected electrical parameters to assess health of the heating system and its components, to control the amount of power directed to the target areas of the bulk medium, to ensure adequate heating is being performed, to annunciate any faults and errors to the system's user, and to log the data collected for further diagnostic from the system's user or a maintenance crew.

In some implementations, the controller can verify that all measured electrical parameters are within expected ranges to perform its control and monitoring functions.

In some implementations, output and input power at any of the stages of the power control systems are measured simultaneously to allow the controller to assess power levels and efficiency of said stages. By way of example, by monitoring the power level and efficiency (input power divided by power delivered to heating elements) it can be possible to detect faults in the system and annunciate failures to de-ice. For instance, this can be used to infer that insufficient power delivered to the load will result in incomplete de-icing.

In some implementations, the ratio of voltage to current at the input and output of any stages of the heating system are measured and utilized by the controller. By way of example, at some stages of implementations of the heating system, changes in downstream electrical elements will result in a change to the voltage-to-current ratio at upstream stages of the electrical system, and detecting those changes enables detection of remote downstream faults and performance metrics.

Frequency domain analysis is commonly used for analyzing cables and high frequency systems, for example by determining the magnitude and phase of the input impedance of a circuit across a range of frequencies. That information can be used to assess the health of the heating system, and, in the implementations where the system includes coupling strips (which behave as transmission lines), to evaluate characteristic impedance, propagation constant, termination, and length of the coupling strips.

For example, for a transmission line of a known characteristic impedance, open terminated, the impedance looking in can vary from 0 at lengths equal to odd multiples of a quarter of the wavelength of the traveling signal, to Zo at lengths equal to multiples of half the wavelength This analysis can be performed from a single point, or if both ends of a cable can be accessed, a "2 port" measurement can be made, that analyzes the transmission and reflection of a signal passing from one port to another.

Measurement across the frequency domain is most commonly performed with a network analyzer, a tool that at a high level transmits a series of frequencies, computes impedance from the voltage/current ratio, interpolates, and displays the data.

These are also tools that can be used to verify if there have been any changes in a transmission line system. In a complex electrical system where cables may travel long distances and be hard to access, transmission line analysis is an invaluable tool to check for breaks in the cable or other unwanted changes.

Cuts and other direct damages to the coupling strips and other cables in the heating system are detectable by impedance measurements. Further details, e.g. whether a coupling strip or cable is fully severed or partially cut, can also be determined. An example of a detectable error is a change in length. For example, if a coupling strip or cable is severed, it is shortened (and its termination might be changed) and its input impedance changes according to the following formula:

$$Z_{in} = Z_0 \frac{Z_L + Z_0 \tanh(\gamma l)}{Z_0 + Z_L \tanh(\gamma l)}$$

Faults are also detectable when the termination is changed away from the expected value, so for example if a coupling strip that is normally open-terminated is shorted, or if a coupling strip that is normally short-terminated is cut or delaminated into an open termination.

It is important to note that passive monitoring of the operating power control system can detect impedance at the frequency of operation. Therefore, the diagnostic functions described in the rest of this document can be accomplished during operation.

While using a network analyzer assumes sending sinusoidal signals across the device being measured to obtain its frequency response, making it an active measurement method, passive monitoring includes monitoring the signals flowing through said device (e.g., voltage and current) during its normal operation to calculate its impedance. Because it can only extract information from operating signals and conditions, it does not provide as wide a range of information as a full sweep of frequencies. However, it can still be used to monitor for failures. Furthermore it can be operating continuously, including when the heating system is running.

There are 3 principle elements in a passive monitoring implementation.

The interface:

An interface between the power system and the monitoring system should be carefully designed. For example, it is important that excessive power, for example power designated for ice protection, does not go into the monitoring system.

The Division:

Another critical element of the system is the calculation of impedance from voltage and current (e.g., V/I). This needs to be both accurate and appropriately fast, as well as maintain phase information.

Signal Conversion

Once the impedance signal has been calculated, it is typically converted to a form of more use to the monitoring subsystems, e.g., using an analog-to-digital converter.

Passive monitoring is a valuable tool for the protection of the system as a whole, allowing for fault detection in real time and protection against any damage to the electrical power system that may be caused by said fault.

In some implementations, a controller can alternate operation of a network analyzer system with providing power to the coupling strips. For example, the controller can intermittently switch of the power supplied to the coupling strips while connecting the network analyzer to check for faults. Power flow to the coupling strips can be recommenced after the network analyzer obtains a measurement. The network analyzer can then be disconnected to avoid damage from the power signals. In some implementations, the network analyzer can be rotate between performing measurements on different couplings strips. For example, the controller or control system can alternately shut off power flow to different coupling strips while network analyzer measurements are obtained on the strip. Thus, neighboring coupling strips can still maintain some heat to the surface of the aircraft near the coupling strip that is undergoing a network analyzer measurement.

In some implementations, the network analyzer can be configured to operate using a different range of signal frequencies than the power supply system. For example, the power signals can be supplied within a range of 100-450 MHz, while the network analyzer can be configured to measure impedance of the coupling strips using test signals within a range of 1-10 MHz. A low pass filter can be provided between the input/output of the network analyzer and the power source to avoid damage to the network analyzer by the power signals and to permit impedance measurements of the couplings trips without the need to cease heating operations.

In some implementations, the controller additionally uses Time Domain Reflectometry methods to perform its functions. Time domain reflectometry (TDR) is the study of transmission line reflections. It is commonly used to detect failures in cables that are very long or otherwise hard to access. Its core difference from previous methods discussed is its focus in the time domain. This means that it is capable of measuring the travel time for a signal to reach the end of a cable or coupling strip and bounce back to its entry point. It is for example an effective tool for measuring parameters like transmission line or coupling strip length or characteristic impedance. TDR is an important complement to frequency domain analysis as it is capable of deriving parameters that are difficult to back out of a frequency plot.

FIG. 34 depicts an example implementation of TDR, illustrating how, for example, open circuits, short circuits, and impedance mismatches can be detected using TDR on a coupling strip attached to an aluminum panel.

As a result, TDR allows for characterizing and localizing discontinuities, faults, or imperfections in a transmission line, cable or coupling strip. For example, for a cable of consistent materials, the speed of propagation of an electrical signal can be measured. Using this propagation speed, the distance from measurement point and any perturbation, fault, termination change, or alteration can be measured and spotted as local changes in impedance through TDR.

TDR uses a very fast pulse generator that sends a signal to the system being measured. Key pulse parameters, including the time it takes for a low to high voltage transition, are tuned to each specific system being tested and specific measurement goals in order to capture the desired data. This pulse is then measured with an oscilloscope. Specialized instruments can be used that combine a pulse generator and a sampling oscilloscope, which are optimized for periodic measurements. However, specialized equipment is not always required. A time domain representation can be reconstructed from the frequency domain. Using the inverse Fourier transform, the output of a network analyzer can be converted to an approximation of the expected time domain behavior.

Because TDR allows for characterizing and localizing discontinuities in a transmission line, it can be used to detect shorts, opens, line delamination, and other transmission line damages in the heating system, e.g., in its cables and coupling strips.

In FIG. 35A, a comparison of two of our transmission lines measured with TDR is shown. In one line after 2 meters there is a connector that appears on the plot up as a large variation in the impedance localized in a narrow region. The same technique can similarly be used to detect deformation of the transmission lines or coupling strips, short circuits, and delamination of the transmission line from the bulk medium. In some implementations, the controller performs automated analysis of results. With proper signal processing and advanced analysis techniques (e.g., leveraging machine learning, computer vision, deep learning, artificial intelligence, and other data-based methods), it is possible to compare live results with a stored reference to detect, characterize, and quantify changes, as well as to interpret plots to determine parameters including impedance, termination, and length.

It can be shown that elements of the heating system, such as its cables and coupling strips in implementations where they are included, have geometric and material properties that are dependent on temperature. By way of example, the geometry of transmission lines and coupling strips may be affected by thermal expansion and contraction. It can be further shown that the conductivity, dielectric constant and magnetic permeability of materials included in the construction of the coupling strips can vary with temperature. The previous sections describe how faults can be detected by change of impedance measured at different points within the system. In addition to detection of changes to the physical structure of the coupling strips or bulk media, system de-icing status may also be assessed. Impedance change vs. temperature may be calculated, simulated, or measured empirically. In some implementations it may be possible to measure impedance and impedance change over time of the coupling strips to infer their temperatures, providing an additional method for the controller to perform its function.

Another useful metric may be the rate of change of measured impedance. It can be shown that during phase change, a material (in this case ice melting into water) will continue to absorb energy, but will not change temperature (in this case staying at 0 c until fully melted). In some implementations, the controller may measure the coupling strips' impedances and utilize this property to help perform its functions, including determining that de-icing is ongoing or completed.

Detecting Damage and Alterations on a Bulk Medium

In implementations where the coupling strips are installed on a bulk medium such that the bulk medium can be viewed as part of a transmission line geometry (e.g., by installing a coupling strip on aluminum skin such that the aluminum skin is one of the ground planes of the resulting stripline formed by the combination of the coupling strip and the aluminum skin), these methods can be used to detect changes, alterations, and damage in the bulk medium, even when the coupling strip itself is left unaltered. For a structure with adequate coverage of coupling strips over the bulk medium, where these lines are routed back to an electrical system such as the heating systems described herein, sections of the bulk structure can be analyzed and monitored for possible damage from centralized measurement points.

In some implementations, changes to the structure of the bulk medium can be viewed and analyzed as geometric changes to the transmission lines formed by the coupling strips coupled to the bulk medium. For example, a dent could alter the geometry of the bulk medium, changing the transmission line's characteristic impedance in a region.

When installed on aircraft's skin, the system described herein could provide skin and structure damage detection capability. This damage detection could be performed autonomously via control and sensing circuitry embedded in the aircraft, or using specialized diagnostic equipment brought by a maintenance crew to designated locations in the aircraft. Currently, this type of damage is typically detected by visual inspection, a time consuming and error-prone process. Additionally, in-flight damage detection is limited to events large enough that the crew would notice without help from any diagnostic system.

In the case of composite skin aircraft, the transmission lines can be embedded in the skin material's composite layers (for example taking advantage of the lightning protection shield and adding conducting lines in another layer to form embedded microstrips or striplines), allowing for damage detection, including composite material delamination.

In some implementations, the system can include separate sense lines arranged to detect faults in the coupling strips. For example, coupling strips may be susceptible to a particular type of fault, delamination, where the coupling strip is at least partially unbound from the bulk medium. In some such implementations, sense line can be configured to be more sensitive to certain faults. In some implementations, sense lines can be included with the carrier line in a coupling strip 1900.

For example, as discussed briefly above, the carrier line is a conductive path within the coupling strip (see 1900 in FIGS. 19 and 23-27F) that carries a current used for heating the bulk medium while the sense line is a separate conductive path configured to sense faults in the carrier line or the coupling strip as a whole. The sense line may intermittently or continually carry a current (AC or DC) used for sensing faults in the carrier line or coupling strip as a whole. The current in the sense line is typically less than the current in the carrier line, under normal operating conditions (e.g., without a fault). For example, a sense line may be added to a coupling strip such as the one shown in 1900 in FIG. 19. The sense line can be added in the same layer of the coupling strip as the carrier line (e.g., the conductive path 1904 in FIG. 19) or in a separate layer from the carrier line.

A current sensor, which may be configured to detect changes in the flow of electricity in a wire or circuit, can be used by the system to determine that more current is passing through the sense line than it normally should, and therefore to detect delamination. Specifically, the system can make threshold-based delamination detections. For instance, on a properly laminated line, the current measured on the sense line would be relatively low. On a (partially) delaminated line, however, the current would be above a threshold current value. The threshold value may be chosen to enable detection of a given delamination length (e.g., 10 cm) while still being sufficient high to avoid false positives during normal operation of the coupling strip.

Additionally or alternatively, a two-port network analyzer sensor can be used by the system, with a first ground-referenced port connected to the carrier line 3910 and a second ground-referenced port connected to the sense line. Such a network analyzer sensor may be configured to quantify coupling between the sense line and carrier line by measuring the S-parameters (e.g., S21 parameter) of the sensor's two-port network at one or more chosen frequencies. Delamination can then be detected when the S21 parameter is above a predetermined threshold value.

In some implementations, the heating system can include any of a variety of self-altering components that can be used to assist in detection of system faults including delamination. In particular, the coupling strip 1900 can be constructed to fail into an easily detectable failure configuration when in a specific failure mode. The coupling strip 1900 can be constructed such that that happens early enough to be quickly detected and before triggering any undesirable failure consequences, e.g., to the bulk medium 1902.

As one example, the dielectric separation between the conductive layer 1904 and the conductive shielding layer 1906 can be constructed of one or more predetermined materials such that the dielectric separation begins changing geometry and losing insulative properties as it begins melting after its temperature exceeds a threshold temperature, e.g., as heat accumulates on the coupling strip 1900 locally on the delaminated section of the coupling strip 1900 from the bulk medium 1902, due to the delaminated section of the coupling strip coupling heating signals into its own conductive shielding layer (instead of the bulk medium) and thus self-heating that unbound section of the coupling strip. An altered, e.g., electrically shorted, dielectric separation between the conductive layer 1904 and the conductive shielding layer 1906, results in a drastic change in the coupling strip's performance and input impedance, from which any delamination can be easily detected, e.g., by using a current sensor or impedance sensor. For instance, a drastic change in impedance may be an increase or decrease in impedance of the coupling strip by one or more orders of magnitude compared to the impedance of the coupling strip during normal (non-faulted) operation.

For example, in the case of de-icing an external surface of an airplane, because the heating system normally operates in the range from 50° C. to 60° C., the threshold temperature may be set at a value that is greater than the upper limit of the normal range and is well below a harmful temperature (e.g., fuel tank ignition), e.g., at 130° C. In this example, polysulfide-based materials are example materials suitable for use in constructing the dielectric separation.

As another example, the conductive layer 1904 can be constructed of one or more predetermined materials such that the conductive layer 1904 loses its electrical conductivity as temperature increases, e.g., degrades into an open state, thereby permitting straightforward detection of delamination. In this example, copper, aluminum, and alloys are suitable materials for use in constructing the conductive layer.

As another example, the a bottom dielectric layer can be constructed of one or more predetermined materials the dielectric constant of which may change significantly with respect to temperature, thereby resulting in detectable impedance changes that can be used to indicate a fault, or to enable accurate temperature measurements through impedance measurements. In this example, acrylic adhesives, silicon adhesives, ethylene-vinyl acetate adhesives, polysulfide sealants, polyurethane sealants, Mylar, PTFE, FEP, and Kapton, are suitable materials for use in constructing the bottom layer.

In some implementations, the conductive layer 1904 can be constructed to be less sensitive to certain aspects of the system relative to others. For example, the conductive layer 1904 can be constructed in a way such that the impedance, cross section area, or both of the conductive layer 1904 remain relatively temperature independent. In this way, any fault in the system such as a delamination which triggers significant impedance change will become easily discernable from normal operational variation of the system.

Specifically, different construction materials, different bonding materials and associated bond methods, different geometric design such as different cross-sectional dimensions, or different termination configurations can be considered so as to achieve the desired sensitiveness of the conductive layer 1904 in these implementations. For example, water based adhesives have drastic impedance changes around 0° C., while alcohol-based adhesives such as Ethylene-vinyl acetate (EVA) have more consistent or stable impedance changes. Epoxy also has relatively stable dielectric behaviors.

Frequency Domain Analysis for Bulk Medium Mechanical Changes Detection

Changes in impedance can also be used to detect mechanical changes (e.g., dents or cracks) to an aircraft skin or other bulk medium. For example, changes in impedance are detectable following impacts to the structure either on or off the coupling strips. This was demonstrated using an impact test setup. A 1.2 kg indenter was dropped on the panel from a height of 2.8 m. This was selected in order to cause a 4 mm dent 25 mm from the nearest fastener attaching the aircraft skin to a structural element, e.g., a wing rib. The changes observed were small enough that they would not cause the system to malfunction, but large enough to be detectable.

FIG. 35B shows a normalized real part of the impedance immediately before and after an impact. "Near tip", "near connector", and "middle" denote impacts on the coupling strip in the named location. "Between" and "far" indicate impacts between two branches of a coupling strip, and far (~18 cm) from the nearest coupling strip. As shown, a jump in impedance is visible after the impact.

As shown in FIG. 35B, a relatively small jump (~5%) in the impedance is observable following the impact. This is detectable both for impacts off and on the coupling strip. Since a change in impedance is recognizable, even for an impact away from a coupling strip, this can be used to detect impacts, including when they occur between lines. Since lines will cover most of an aircraft's surface for our system, they can be used to monitor the structure and detect mechanical changes (e.g., dents or cracks).

Frequency Domain Analysis for Cable Fault Detection

In some implementations, frequency domain analysis plots can be used to detect any cable faults that may be present in the heating system 100, e.g., delamination of the coupling strip 1900; and can also be used to detect mechanical changes (e.g., dents or cracks) to an aircraft skin or other bulk medium. In particular, advanced graph analysis techniques including plot transform techniques (e.g., Fourier transform) and machine learning techniques (e.g., neural networks) may be used to extract, from the frequency response plots or data derived from the frequency response plots or both, features or characteristics from which the presence of cable faults or bulk medium mechanical changes may be detected. In general, different features or characteristics can indicate different types of cable faults and bulk medium mechanical changes.

For example, the features or characteristics can include minimum or maximum resistance or theta values, as well as associated frequency value at which these minimum or maximum values are located. As another example, the features or characteristics can include resonance peak pattern information including, for example, dominance of resonance peaks, distance between the peaks from each other, and consistency between the peak-to-peak frequency spacing.

FIG. 43 depicts plots of frequency responses of a healthy coupling (e.g., a non-faulty coupling strip) coupling strip and a faulty coupling strip installed on a bulk medium. In this example, as a particular type of cable fault, delamination may be detected based on determining whether the respective values of resonance peaks, e.g., resonance peak 4310, over a given range of frequencies are decreasing or increasing monotonously. As depicted in plot 4300, resonance peaks values decreases monotonously for a healthy coupling strip. As depicted in plot 4350, for an unhealthy (e.g., delaminated) coupling strip, however, the resonance peaks values may first decrease, then increase, and again followed by decrease.

In some implementations, a fault such as a short circuit, open circuit, or delamination of a cable (e.g., a coupling strip) can be detected by comparing a measured impedance vs frequency of a particular cable with data indicating an expected pattern of impedance vs frequency for a non-faulted (e.g., healthy) cable. For example, a spectrum analyzer or TDR device can be used to measure an impedance vs frequency or time domain pattern for a particular cable. The measured impedance vs frequency or time domain pattern can be compared with an expected impedance vs frequency or time domain pattern for a similar cable with no faults (e.g., as depicted in plot 4350). In the frequency domain example, variations in the features or characteristics of the resonance peak pattern of the measured impedance vs frequency pattern as compared with the expected impedance vs frequency pattern can be used to identify fault(s) in the cable.

TDR for Bulk Medium Mechanical Changes Detection

Because dents and other bulk medium mechanical changes are localized deformation of the bulk medium, they can result in localized change in characteristic impedance of the transmission lines installed on the bulk medium. As such, TDR is well suited for detection and localization of mechanical changes on the bulk medium.

FIG. 36 illustrates examples of TDR on two different coupling strip designs. The red lines show the dent test panel while the blue represents a baseline panel. Using TDR, we can see that there are abrupt changes in impedance along the dented coupling strip that appear as fluctuations of impedance around its usual value for an undented panel. With this information, we can further localize dents to specific areas of the cable. Therefore, it is possible to identify the position of damage to the underlying structure. This data can be challenging to detect using the frequency response alone, because the average characteristic impedance along the coupling strip length is about the same. However, TDR allows us to see localized discontinuities.

In one heating system embodiment, TDR measurements performed on coupling strips covering a bulk medium, coupled with analysis of the obtained data (e.g., using advanced methods previously listed), can be used to map the bulk medium's skin and structural condition and health. This could be used either as a maintenance and service diagnostic tool, or as a real-time monitoring tool.

In implementations of an electrical de-icing system using coupling strips to heat a bulk medium, multiple coupling strips are powered from the same high frequency source. This implementation could include additional cabling such that the AC power source is not physically close to the coupling strips in question. In these implementation fault detection and de-icing assessment as described above is still possible. In fact, a single monitoring system at the AC source is capable of monitoring the performance of all attached coupling strips. However, additional monitors could be placed at the input of each coupling strip in another implementation. Each coupling strip can be seen as a parallel element, with additional cabling used as series elements in a network. This network will still be defined by the geometric and material parameters of its construction.

In some implementations, multiple AC sources may be combined to feed power to one or more coupling strips as described above. Similar to above, this would allow for the possibility of a single controller subsystem to detect faults amongst one or more AC sources and one or more coupling strips. However, it is also possible to have individual monitors for each AC source, which would aid isolating the source of a fault to a single system element. In this implementation it would be possible to install redundant AC sources, such that the fault detection system may be capable of bringing redundant elements online to compensate for a fault while still completing de-icing.

Some implementations of an electrical de-icing system may include distributed or in-line circuitry between the AC source and coupling strips. This circuitry may be passive (containing only inductors, capacitors, resistors, and transformers). On the other hand, this circuitry may be active (containing transistors, logic gates, or other elements, e.g., in the case of active IANs). In an implementation where this circuit is active, it may be used for fault detection and de-icing assessment. In implementations where multiple coupling strips are fed from a single or combined AC source, distributed active circuitry could isolate faults to a single coupling strip element by deploying individual monitors to each coupling strip element. Further, if additional redundant coupling strip elements are installed, distributed active circuitry could route power to other coupling strips to mitigate a fault on a single coupling strip and complete de-icing. This distributed circuitry could communicate with the AC sources or any 'upstream' circuitry either through cabling or known wireless communication protocols, or through manipulation of the voltage, current, or impedance of system. For example, in one implementation this distributed circuitry could use an electrical or electromechanical switch to disconnect any coupling strips with impedance outside the normal range. This disconnection could then be detected by the monitoring system at the AC source, while also ensuring that faulty coupling strips are not energized, preventing more possible damage to the system. In another implementation, power could be direct towards areas of greater ice buildup by coordinating other sensors (e.g., temperature sensors, ice sensors) with such distributed circuitry.

In implementations where multiple coupling strips are attached to the same bulk medium, it can be possible to detect faults in nearby coupling strips by transmitting signals to a single coupling strip. All coupling strips attached to the same bulk structure may have some level of electromagnetic coupling. By putting a transmitter on one coupling strip (such as an AC power source, network analyzer, TDR etc.) and a receiver such as an oscilloscope on a separate coupling strip, it is possible to pick up induced signals. This can be used to verify that the coupling is within expected range. If the coupling factor is outside of the expected range it could indicate a fault. For example, in one possible implementation, poor electrical connection of a coupling strip to the bulk structure could cause increased coupling to other coupling strips. This would also lead to insufficient heating for the purpose of de-icing. By monitoring the induced signal on other coupling strips this error could be detected.

In some implementations, as similarly described above, TDR plots can be used to assist in delamination detection of the coupling strips, e.g., by using graph analysis techniques to analyze certain features depicted or otherwise extracted from the TDR plots.

In addition to detecting defects in the coupling strips or detecting dents in the bulk medium, by using similar techniques to the ones described above, either TDR or frequency domain analysis can be used to detect the presence of various contaminants such as water or ice on the bulk medium, as well as to determine the type of contaminants that are present on the bulk medium.

Note that as used herein the term "electrically connected" includes the case where components are connected to each other through an object having any electric function, in contrast to a "direct connection" in which two electrical components are directly coupled to one another (e.g., through a wire or circuit trace without any further intervening components such as resistors, capacitors, inductors, etc.). Furthermore, references made to a first component as being electrically connected to a specific terminal of a second component are not intended to include an electrical path passing through the second component itself. For example, a capacitor that is electrically connected to a gate terminal of a transistor may include the case where the electrical connection passes through other objects or components that have an electric function, but would not include the case where the electrical connection passes through another terminal (e.g., a source/drain) of the transistor itself to the gate of the transistor.

What is claimed is:

1. A system for heating an exterior of an aircraft, the system comprising:
   a series of individual heating elements arranged on a skin of the aircraft;
   a sensor positioned on the skin in a location that corresponds with a region of relatively low temperature within a heating pattern produced by the heating elements; and
   a control system connected to the heating elements and the sensor, the control system configured to control power supplied to the heating elements responsive to output from the sensor,
   wherein the heating elements are coupling strips comprising a multi-layer structure extending along a surface of the aircraft skin that forms, in combination with the aircraft skin, an electrical transmission line, the multi-layer structure comprising:
      a first dielectric layer over the aircraft skin,
      a conductive layer over the first dielectric layer,
      a second dielectric layer over the conductive layer, and
      a conductive shielding layer over the second dielectric layer.

2. The system of claim 1, wherein the location comprises a structural feature on the aircraft skin arranged to maintain a local temperature at the location lower relative to a temperature of the majority of the aircraft skin with the heating elements active.

3. The system of claim 2, wherein the structural feature comprises an arrangement of the heating elements that provides less heat to the location relative to the majority of the aircraft skin.

4. The system of claim 1, wherein the location comprises a structural feature on the aircraft skin, and arranged to cause formation of ice at the location.

5. The system of claim 4, wherein the structural feature comprises a ridge, edge, or wall.

6. The system of claim 1, wherein the sensor is a temperature sensor or an ice sensor.

7. The system of claim 1, wherein the location is visible from a window of the aircraft.

8. The system of claim 1, wherein the control system is configured to:
   detect, based on the output from the sensor, a characteristic of the aircraft skin at the location;
   compare a value of the characteristic to a reference characteristic; and
   in response to determining that the value of the characteristic is indicative of freezing at the location, trigger an indication of a freezing condition.

9. A system for heating an exterior of an aircraft, the system comprising:
   a series of individual heating elements arranged on a skin of the aircraft;
   a first sensor positioned on the skin in a first location that corresponds with a region of relatively low temperature within a heating pattern produced by the heating elements;
   a second sensor positioned on the skin of the aircraft in a second location that corresponds with a region of relatively high temperature within the heating pattern produced by the heating elements; and
   a control system connected to the heating elements, the first sensor, and the second sensor,
   wherein the control system is configured to:
      control power supplied to the heating elements responsive to output from the first sensor;
      detect, based on an output from the second sensor, a temperature of the aircraft skin at the second location;
      compare the temperature to a reference temperature for the second location; and
      in response to determining that temperature is greater than the reference temperature, trigger an indication of an over-temperature condition.

10. The system of claim 1, wherein the control system is configured to:
    detect, based on the output from the sensor, a characteristic of the aircraft skin at the location;
    compare a value of the characteristic to a reference characteristic; and
    in response to determining that the value of the characteristic is indicative of freezing at the location, apply power to a heating element.

11. A system for heating an exterior of an aircraft, the system comprising:
    a series of individual heating elements arranged on a skin of the aircraft;
    a first sensor positioned on the skin in a first location that corresponds with a region of relatively low temperature within a heating pattern produced by the heating elements;
    a second sensor positioned on the skin of the aircraft in a second location that corresponds with a region of relatively high temperature within the heating pattern produced by the heating elements; and
    a control system connected to the heating elements, the first sensor, and the second sensor,
    wherein the control system is configured to:
       control power supplied to the heating elements responsive to output from the first sensor;
       detect, based on an output from the second sensor, a temperature of the aircraft skin at the second location;
       compare the temperature to a reference temperature for the location; and
       in response to determining that temperature is greater than the reference temperature, reduce power applied to a heating element.

12. A system for heating an exterior of a bulk conductor, the system comprising:
    a series of individual heating elements arranged on a skin of the bulk conductor;

a sensor positioned on the skin in a location that corresponds with a region of relatively low temperature within a heating pattern produced by the heating elements; and a control system connected to the heating elements and the sensor, the control system configured to control power supplied to the heating elements responsive to output from the sensor, wherein the heating elements are coupling strips comprising a multi-layer structure extending along a surface of the bulk conductor skin that forms, in combination with the bulk conductor skin, an electrical transmission line, the multi-layer structure comprising:
    a first dielectric layer over the bulk conductor skin,
    a conductive layer over the first dielectric layer,
    a second dielectric layer over the conductive layer, and
    a conductive shielding layer over the second dielectric layer.

13. The system of claim 12, wherein the location comprises a structural feature on the bulk conductor skin arranged to maintain a local temperature at the location lower relative to a temperature of the majority of the bulk conductor skin with the heating elements active.

14. The system of claim 13, wherein the structural feature comprises an arrangement of the heating elements that provides less heat to the location relative to the majority of the bulk conductor skin.

15. The system of claim 12, wherein the location comprises a structural feature on the bulk conductor skin and arranged to cause formation of ice at the location.

16. The system of claim 15, wherein the structural feature comprises a ridge, edge, or wall.

17. The system of claim 12, wherein the sensor is a temperature sensor or an ice sensor.

18. The system of claim 12, wherein the location is visible from a window of the bulk conductor.

19. The system of claim 12, wherein the control system is configured to:
    detect, based on the output from the sensor, a characteristic of the bulk conductor skin at the location; compare a value of the characteristic to a reference characteristic; and
    in response to determining that the value of the characteristic is indicative of freezing at the location, trigger an indication of a freezing condition.

20. A system for heating an exterior of a bulk conductor, the system comprising:
    a series of individual heating elements arranged on a skin of the bulk conductor;
    a first sensor positioned on the skin in a first location that corresponds with a region of relatively low temperature within a heating pattern produced by the heating elements;
    a second sensor positioned on the skin of the bulk conductor in a second location that corresponds with a region of relatively high temperature within the heating pattern produced by the heating elements; and
    a control system connected to the heating elements, the first sensor, and the second sensor,
    wherein the control system is configured to:
        control power supplied to the heating elements responsive to output from the first sensor;
        detect, based on an output from the second sensor, a temperature of the bulk conductor skin at the second location;
        compare the temperature to a reference temperature for the second location; and
        in response to determining that temperature is greater than the reference temperature, trigger an indication of an over-temperature condition.

21. The system of claim 12, wherein the control system is configured to:
    detect, based on the output from the sensor, a characteristic of the bulk conductor skin at the location; compare a value of the characteristic to a reference characteristic; and
    in response to determining that the value of the characteristic is indicative of freezing at the location, apply power to a heating element.

22. A system for heating an exterior of a bulk conductor, the system comprising:
    a series of individual heating elements arranged on a skin of the bulk conductor;
    a first sensor positioned on the skin in a first location that corresponds with a region of relatively low temperature within a heating pattern produced by the heating elements;
    a second sensor positioned on the skin of the bulk conductor in a second location that corresponds with a region of relatively high temperature within the heating pattern produced by the heating elements; and
    a control system connected to the heating elements, the first sensor, and the second sensor,
    wherein the control system is configured to:
        control power supplied to the heating elements responsive to output from the first sensor;
        detect, based on an output from the second sensor, a temperature of the bulk conductor skin at the second location;
        compare the temperature to a reference temperature for the location; and
        in response to determining that temperature is greater than the reference temperature, reduce power applied to a heating element.

23. The system of claim 12, wherein the control system comprises an impedance monitoring sub-system connected to the coupling strips, the impedance monitoring sub-system configured to:
    monitor an input impedance the heating elements; and
    detect, from the input impedance, a fault in a heating element.

24. The system of claim 23, wherein detecting the fault in the heating element comprises:
    obtaining a first impedance vs frequency pattern of the heating element; and
    detecting the fault by comparing the first impedance vs frequency pattern with a second impedance vs frequency pattern that indicates an expected impedance without any faults.

25. The system of claim 12, wherein the control system comprises an impedance monitoring sub-system connected to the coupling strips, the impedance monitoring sub-system configured to:
    monitor an input impedance of the heating elements; and
    detect, from the input impedance, a mechanical change to the skin of the bulk conductor.

26. The system of claim 12, wherein the control system comprises a Time Domain Reflectometry (TDR) monitoring sub-system connected to the coupling strips, the TDR monitoring sub-system configured to:
    monitor a time domain electrical pulse response of the heating elements; and
    detect, from the time domain electrical pulse response, a fault in a heating element.

27. The system of claim 26, wherein detecting the fault in the heating element comprises:
obtaining a first Time Domain Reflectometry (TDR) pattern of the heating element; and
detecting the fault by comparing the first TDR pattern with a second TDR pattern that indicates an expected TDR pattern for a heating element without any faults.

28. The system of claim 12, wherein the control system comprises Time Domain Reflectometry (TDR) monitoring sub-system connected to the coupling strips, the TDR monitoring sub-system configured to:
monitor a time domain electrical pulse response of the heating elements; and
detect, from the time domain electrical pulse response, a mechanical change to the skin of the bulk conductor.

29. A system for heating an exterior of an aircraft, the system comprising:
a series of individual heating elements arranged on a skin of the aircraft, wherein the heating elements are coupling strips comprising a multi-layer structure extending along a surface of the aircraft skin that forms, in combination with the aircraft skin, an electrical transmission line, the multi-layer structure comprising:
a first dielectric layer over the aircraft skin,
a conductive layer over the first dielectric layer,
a second dielectric layer over the conductive layer, and
a conductive shielding layer over the second dielectric layer, and
wherein the conductive layer of at least one of the coupling strips comprises a sense line and a carrier line, the sense line arranged, within the coupling strip, to sense faults in the carrier line or the coupling strip; and
a control system connected to the heating elements, the control system configured to:
control power supplied to the heating elements; and
detect, based on one or more signals received through the sense line, a fault in one or more of the coupling strips.

30. The system of claim 29, wherein sense line comprises one or capacitors arranged to permit measurement of temperature based on changes in impedance of the sense line.

31. The system of claim 29, wherein the coupling strip comprises one or more self-altering components configured to fail in a predetermined manner indicative of a fault in the coupling strip.

32. The system of claim 1, wherein the control system is configured to detect a status of a de-icing operation by:
measuring a temperature indicated by the sensor over a period of time; and
determining that de-icing is complete in response to determining that a slope of the temperature has remained constant at approximately zero degrees Celsius for a period of time and then begun increasing.

33. The system of claim 1, wherein the control system is configured to measure an impedance frequency response of a coupling strip and estimate a temperature of a coupling strip based on the measured impedance frequency response.

34. The system of claim 29, further comprising a sensor positioned on the skin in a location that corresponds with a region of relatively low temperature within a heating pattern produced by the heating elements,
wherein the control system is configured to control power supplied to the heating elements responsive to output from the sensor.

35. The system of claim 34, wherein the control system is configured to:
detect, based on the output from the sensor, a characteristic of the aircraft skin at the location;
compare a value of the characteristic to a reference characteristic; and
in response to determining that the value of the characteristic is indicative of freezing at the location, trigger an indication of a freezing condition.

36. The system of claim 34, wherein the control system is configured to:
detect, based on the output from the sensor, a characteristic of the aircraft skin at the location;
compare a value of the characteristic to a reference characteristic; and
in response to determining that the value of the characteristic is indicative of freezing at the location, apply power to a heating element.

37. The system of claim 29, wherein each of the heating elements extend from a forward end of a wing towards an aft end of the wing.

38. The system of claim 29, wherein a width of each heating element is less than a spacing between heating elements and a length of each heating element is greater than the spacing between coupling strips.

39. The system of claim 29, wherein the conductive layer has a lower electrical resistance than the aircraft skin.

40. The system of claim 1, wherein each of the heating elements extend from a forward end of a wing towards an aft end of the wing.

41. The system of claim 1, wherein a width of each heating element is less than a spacing between heating elements and a length of each heating element is greater than the spacing between coupling strips.

* * * * *